United States Patent [19]
Noguchi et al.

[11] Patent Number: 6,023,538
[45] Date of Patent: Feb. 8, 2000

[54] IMAGE PROCESSING APPARATUS, METHOD AND COMPUTER PROGRAM PRODUCT

[75] Inventors: Koichi Noguchi, Machida; Hideyuki Takemoto, Yokohama; Shinichiro Wada, Kawasaki, all of Japan

[73] Assignee: Ricoh Company, Ltd., Tokyo, Japan

[21] Appl. No.: 09/306,049

[22] Filed: May 6, 1999

Related U.S. Application Data

[62] Division of application No. 08/698,854, Aug. 16, 1996, Pat. No. 5,949,924.

[30] Foreign Application Priority Data

| Oct. 6, 1995 | [JP] | Japan | 7-260438 |
| Nov. 28, 1995 | [JP] | Japan | 7-309129 |
| Nov. 29, 1995 | [JP] | Japan | 7-311015 |
| Mar. 1, 1996 | [JP] | Japan | 8-044972 |

[51] Int. Cl.[7] .................................................. G06K 9/20
[52] U.S. Cl. ............................................................ 382/312
[58] Field of Search .................................... 382/162, 165, 382/167, 191, 209, 252, 270, 289, 291, 295, 304, 312, 318, 319; 358/430, 443, 445, 448, 453, 456, 459, 471, 488

[56] References Cited

U.S. PATENT DOCUMENTS

| 5,325,448 | 6/1994 | Katayama et al. | 382/270 |
| 5,465,307 | 11/1995 | Azumaya et al. | 382/165 |
| 5,528,387 | 6/1996 | Kelly et al. | 382/289 |
| 5,557,690 | 9/1996 | O'Gorman et al. | 382/289 |
| 5,594,815 | 1/1997 | Fast et al. | 382/289 |
| 5,613,016 | 3/1997 | Saitoh | 382/289 |
| 5,719,968 | 2/1998 | Hashimoto et al. | 382/289 |
| 5,864,634 | 1/1999 | Kurita | 382/167 |
| 5,949,922 | 9/1999 | Wada et al. | 382/295 |
| 5,949,924 | 9/1999 | Noguchi et al. | 382/312 |

*Primary Examiner*—Jose L. Couso
*Attorney, Agent, or Firm*—Oblon, Spivak, McClelland, Maier & Neustadt, P.C.

[57] ABSTRACT

An image reading unit reads an original image, one main scan line by one main scan line, in a sub-scan direction. A window setting unit sets a measuring window in a bit-map formation of image data obtained through the image reading unit, in a manner in which the measuring window moves in a predetermined manner so that the measuring window appropriately includes pixels of an oblique line image which is formed in the bit-map formation of image data as a result of being read through the image reading unit. A position error measuring unit processes image data defined by the measuring window, and, thus, measures an error of the oblique line image formed in the bit-map formation of obtained image data between a predetermined reference state and an actual reading state.

3 Claims, 40 Drawing Sheets

MAIN SCAN DIRECTION

MAIN SCAN DIRECTION

|  | X1 | X2 | X3 | X4 | X5 | X6 | X7 | X8 | X9 |
|---|---|---|---|---|---|---|---|---|---|
| Y1 | 2 | 3 | 1 | 4 | 2 | 18 | 220 | 250 | 248 |
| Y2 | 2 | 1 | 2 | 3 | 13 | 216 | 248 | 250 | 252 |
| Y3 | 3 | 2 | 4 | 8 | 201 | 250 | 252 | 252 | 251 |
| Y4 | 2 | 3 | 4 | 183 | 251 | 254 | 252 | 249 | 32 |
| Y5 | 3 | 5 | 157 | 250 | 251 | 252 | 251 | 50 | 4 |
| Y6 | 2 | 130 | 249 | 250 | 251 | 250 | 62 | 5 | 3 |

|    | X2 | X3 | X4 |
|----|----|----|----|
| Y1 | 0  | 0  | 0  |
| Y2 | 0  | 0  | 0  |
| Y3 | 0  | 0  | 0  |

FIG.36B

|    | X3 | X4 | X5 |
|----|----|----|----|
| Y1 | 0  | 0  | 0  |
| Y2 | 0  | 0  | 0  |
| Y3 | 0  | 0  | 1  |

FIG.36C

|    | X4 | X5 | X6 |
|----|----|----|----|
| Y1 | 0  | 0  | 0  |
| Y2 | 0  | 0  | 1  |
| Y3 | 0  | 1  | 1  |

FIG.36D

|    | X5 | X6 | X7 |
|----|----|----|----|
| Y1 | 0  | 1  | 1  |
| Y2 | 0  | 1  | 1  |
| Y3 | 1  | 1  | 1  |

FIG.36E

|    | X6 | X7 | X8 |
|----|----|----|----|
| Y1 | 0  | 1  | 1  |
| Y2 | 1  | 1  | 1  |
| Y3 | 1  | 1  | 1  |

|     | X0 | X1 | X2 | X3  | X4  | X5  | X6  | X7  | X8 | X9 |
|-----|----|----|----|-----|-----|-----|-----|-----|----|----|
| Y0  | 4  | 4  | 10 | 40  | 150 | 241 | 202 | 120 | 22 | 6  |
| Y1  | 4  | 6  | 42 | 148 | 240 | 200 | 122 | 20  | 10 | 4  |
| Y2  | 10 | 40 | 150| 239 | 200 | 121 | 21  | 10  | 5  | 4  |

18  50  202  427  590  562  345  150  37  14

(BEFORE CORRECTION)

(AFTER CORRECTION)

IMAGE PROCESSING APPARATUS, METHOD AND COMPUTER PROGRAM PRODUCT

This application is a division of application Ser. No. 08/698,854 filed on Aug. 16, 1996 now U.S. Pat No. 5,949,924.

BACKGROUND OF THE INVENTION

1. Field of the Invention

The present invention relates to an image processing apparatus and method wherein reading position errors in a bit-map formation of image data, which has been read or scanned through a reading device such as a light-to-electricity converting device, are detected, or a speed at which an original image is read or scanned is measured, and/or thus-detected reading or scanning position errors or the reading or scanning speed errors, in a sub-scan direction, for example, are compensated for. Such an art may be applied to a copy machine (or a copier), a facsimile machine and so forth, so that reading position errors occurring when reading an original image may be detected and corrected. Thereby, the original image can be precisely read or scanned, or the read image can be appropriately corrected, and thus the read image data is precisely output without image distortion or degradation.

2. Description of the Related Art

As a first example of the related art, Shunsuke Hattori et al. disclose A Development of Image Scanner of High Resolution in the Japan Society of Mechanical Engineers, 71st ordinary general meeting, lecture meeting, lecture paper collection (IV). Therein, an interpolation operation is performed on image data which is obtained as a result of reading a test chart having even-pitch lines arranged therein in a sub-scan direction. That image data is image data which is discrete in those sub-scan direction line intervals. From the interpolation operation result, the central positions of black lines and white lines of the even-pitch lines are obtained. Then, differences between the central positions and the reference pitch of the test chart are read. Thereby, image data reading position errors due to apparatus vibration or the like are detected.

As a second example of the related art, Japanese Laid-Open Patent Application No.6-297758 discloses A Scan-line Pitch Measuring Method. Therein, a pattern of a hard copy having even-pitch pattern data written therein is read. Thereby, unevenness in pitches of scan lines which are used in a hard-copy apparatus is measured.

In the above-described first example of the related art, due to possible spatial differences between the edges of the even-pitch lines and sampling positions, 'moire' may occur wherein a difference occurs between data which has been obtained as a result of reading the same pattern. Due to the moire, thus-obtained read data may not be data which indicates positions corresponding to the edges of the pattern. Thereby, an accuracy in measuring reading position errors may be degraded. Such an adverse effect is very noticeable when the even-pitch line pattern is so fine as to approximate the resolution of the reading apparatus. As a result, the measuring of reading position errors may not be performed. Thus, using this method, it is not possible to measure, with a high accuracy, reading position errors of a pattern which is so fine as to approximate or to be more than the resolution of the reading apparatus.

Further, because an even-pitch line pattern is used, even if the effect of moire is ignored, in a case where the pitch of the pattern is fine for measuring reading position errors of a high-frequency component, due to the limitation of the MTF (Modulation Transfer Ratio) of the image formation system, a difference in a signal indicating image tone is disadvantageously reduced. Thus the measuring accuracy is degraded.

It is considered that, in the case where the pitch of the pattern is finer, the measuring frequency band is widened to a higher frequency. Thereby, it is not possible to provide a high measuring accuracy. Therefore, in order to solve this problem, the sampled data is made to undergo an interpolation operation. In order to improve the effect of the interpolation operation, it is necessary to increase an amount of surrounding data to be processed. As a result, a longer time is required for the operation. Further, the interpolation operation inherently may not provide true data, and thus the measuring accuracy may be degraded. Further, in the first example, image data to be used is obtained as a result of a specific light-reception element of the light-to-electricity converting device being used to scan the pattern in the sub-scan direction. The light-reception element itself may provide noise which may degrade the measuring accuracy.

In the above-described method in the second example of the related art, when measuring, the light-to-electricity converting device is used to read the pattern and thus-obtained data is used. Therefore, in this method, at this time, reading or scanning unevenness when reading or scanning the hard copy is not considered in measuring pitch unevenness in the pattern of the hard copy. Thus, high accuracy measuring may not be achieved. Further, this method also has a 'moire' problem similar to that which occurs in the above-described first example of the related art.

Generally speaking, for example, in a line scanning image reading apparatus wherein a plurality of R, G, B image sensors are arranged so that the R, G, B sensors are separate in the sub-scan direction and are in parallel, there is a time difference between reading of image data read through the respective image sensors when those sensors read the same position in an original image. Therefore, it is necessary to perform correction on the obtained image data such that the respective sensors may provide the image data of the same position in the original image at the same time. Otherwise, color deviation may occur in color image reading, and thus it is not possible to precisely read color. Such color deviation is defined according to the distances between the respective sensors and according to the sensor scanning speed. Possible unevenness in the sensor scanning speed may cause color deviation in the color image reading.

In order to eliminate such a problem, for example, Japanese Laid-Open Patent Application No.6 -22159 discloses an art wherein a microprocessor counts internal clock pulses in an interval between pulses which are generated by a motor which drives a reading carriage. The microprocessor obtains the motor driving speed from the number of the counted clock pulses. The thus-obtained motor driving speed is considered to correspond to an actual scanning speed. Based on the actual scanning speed, timing errors or reading position errors occurring between the respective sensors are compensated for. In this method, the data from upstream sensors is corrected with respect to the data from downstream sensors so that the reading position errors between the data from the respective sensors may be compensated. Thus, color deviation due to the reading position errors may be prevented. In this correction/compensation, for a delay amount which corresponds to a length less than one scan line, the data is obtained as a result of performing a weighting average using the front and rear data.

In this art, the sub-scan direction scanning speed is detected from the rotation speed of the reading carriage driving motor. In a case where the reading apparatus is of a type wherein an image placed on a plane is scanned and is thus read, there should be a power transmission mechanism which converts the rotation motion of the motor into the linear motion for driving the reading carriage. Such a power transmission mechanism may inherently cause unevenness in the transmitted driving speed. There may be difference between possible unevenness in the rotation speed of the driving motor and possible unevenness in the linear speed of the reading carriage. Therefore, it may not be possible to precisely detect the actual scanning speed. As a result, the data, indicating the scanning speed, obtained in this method may not be suitable for compensating for the reading position errors due to the spatial difference between the respective sensors.

Further, in this art, the data from the upstream sensors are corrected with respect to the data from the downstream sensors as mentioned above. Therefore, the data from the downstream sensors are not changed. If the reading scanning speed accidentally varies, the reading position differs from a reading position in a case where the reading scanning speed did not vary. Because the data from the downstream sensors are not changed in the correction/compensation operation as mentioned above, such a reading scanning speed variation causes undesirable expansion/contraction in the read image.

In other words, in this art, only the data from the upstream sensors is corrected when such a reading scanning speed variation occurs. Therefore, it is possible to prevent color deviation from occurring. However, it is not possible to prevent extraction/contraction from occurring in the overall color image due to the reading scanning speed variation. Thus, reading position errors remain. Further, in this art, the correction/compensation operation is performed on the assumption that the distances between the respective sensors are fixed, and this art cannot be applied to a reading apparatus which uses only a single sensor.

Japanese Laid-Open Patent Application No.63-287167 discloses a method for obtaining image data which does not include reading position errors due to reading scanning speed variation. In this method, a position sensor is provided in close proximity to an original image. By using the output of the position sensor, image sensor reading timing is controlled. However, in this method, the reading timing may vary accordingly. Thereby, the CCD charge time varies, and thus the apparent sensitivity thereof varies. Therefore, it is necessary to correct the sensitivity.

Further, in this method, in a case where an image processing operation, such as a filtering operation, a halftone processing operation or the like, is performed on a plurality of scan lines, when intervals between the scan lines differ from each other due to the above-mentioned reading time variation, a problematic situation occurs. That is, such scan line interval differences may not be acompensated for because, ordinarily, a clock synchronization system is used there. In order to compensate for the scan line interval difference, a buffer memory is required for this purpose.

SUMMARY OF THE INVENTION

The present invention has been devised in consideration of the above-described problems occurring in the related art. An object of the present invention is to provide a reading pixel position error measuring apparatus or an image reading apparatus wherein pixel position errors in a bit-map formation of read image data or original image scanning speed errors can be measured with a high accuracy.

Another object of the present invention is to provide such a high-accuracy reading pixel position error measuring apparatus which requires merely a simple computing process.

Another object of the present invention is to provide such a reading pixel position error measuring apparatus wherein an operation load borne by the apparatus can be reduced, and a necessary computing process can be simplified.

Another object of the present invention is to provide such a reading pixel position error measuring apparatus wherein a reading pixel position error measurement for the overall image reading area and also a reading pixel position error measurement for a specific width of image reading area can be performed.

Another object of the present invention is to provide an image reading apparatus wherein image data of an image which is precisely identical to an original image and has a high image quality can be output as a result of correcting/compensating for reading pixel position errors such as those mentioned above.

Another object of the present invention is to provide a reading pixel position error measuring apparatus or an image reading apparatus which has a reference pattern to be used in a reading pixel position error measurement and a sheet member having the reference pattern formed thereon appropriately mounted on the apparatus.

Another object of the present invention is to provide such an image reading apparatus wherein, even if small spots or the like have been undesirably formed in background areas of the reference pattern which is used for the reading pixel position error measurement or scanning speed error measurement, degradation of the reading pixel position error measurement or scanning speed error measurement due to those spots or the like can be prevented.

Another object of the present invention is to provide such an image reading apparatus wherein, even if white objects or the like have been undesirably formed on or in close proximity to oblique lines of the reference pattern which is used for the reading-pixel position error measurement or scanning speed error measurement, degradation of the reading pixel position error measurement or scanning speed error measurement due to those objects or the like can be prevented. Those objects are formed in positions such that an effect of those objects may not be removed only by changing image data corresponding to an object apart from those oblique lines into 0, and those objects may adversely affect image data of an image region having a middle tone level and may thus adversely affect the reading pixel position error measurement or scanning speed error measurement.

Another object of the present invention is to provide such an image reading apparatus wherein, even if tone contrast of read image data of the oblique lines is low, the reading pixel position error measurement or scanning speed error measurement can be performed with a high accuracy.

Another object of the present invention is to enable a further high-accuracy reading pixel position error measurement or scanning speed error measurement by exceeding the limitations of tone resolution of the image reading apparatus.

Another object of the present invention is to enable a further high-accuracy reading pixel position error measurement or scanning speed error measurement by exceeding the limitations of space resolution of the image reading apparatus.

An image reading apparatus, according to the present invention, comprises:

image reading means for reading an original image, one main scan line by one main scan line, in a sub-scan direction;

window setting means for setting a measuring window in a bit-map formation of image data obtained through said image reading means, in a manner in which said measuring window moves along an oblique line image which is formed in said bit-map formation of image data as a result of being read through said image reading means; and position error measuring means for processing image data defined by said measuring window and, thus, measuring an error of said oblique line image formed in said bit-map formation of obtained image data between a predetermined reference state and an actual reading state.

In the above-described apparatus, it is preferable that:

said bit-map formation comprises a plurality of pixels, each pixel having a main scan direction size and a sub-scan direction size, which sizes are the same as one another; and said oblique line image is positioned at an oblique angle 45° from said main scan direction and also from said sub-scan direction.

Thereby, it is possible to perform the reading pixel position error measurement with a high accuracy through a simple calculation without using a fine measuring pattern. Further, it is possible to prevent 'moire' effect from adversely affecting the measurement accuracy, and perform the reading pixel position error measurement with a resolution higher than the pixel size.

In the above-described image reading apparatus, it is preferable that said position error measuring means calculates the center of gravity of image data of pixels defined by said measuring window in said bit-map formation of obtained image data, and also calculates a deviation of the center of gravity when said measuring window is shifted.

Further, it is also preferable that said window setting means sets the measuring window in the bit-map formation of image data obtained through said image reading means, in a manner in which said measuring window moves along a plurality of oblique line images, one oblique line image by one oblique line image, which oblique line images are formed in said bit-map formation of image data as a result of being read through said image reading means. By using the measuring pattern of a plurality of parallel oblique lines such as those shown in FIGS. 8A–8D, it is possible that the reading pixel position error measurement is performed not only on the entire original image object reading area (contact glass) but also a specified thin area thereof. Further, by limiting an area for locating the measuring pattern in the contact glass, it is possible to use the remaining area for locating other kind of images. For example, the remaining area may be used for a test pattern for other kinds of measurements such as a resolution measurement.

Further, it is preferable that:

said plurality of oblique line images are oblique from said main scan direction and also from said sub-scan direction, are arranged in parallel to each other, are arranged in said sub-scan direction, wherein each pair of adjacent oblique line images are so close to one another that a sub-scan direction one of said pair of adjacent oblique line images has a tail end and the other one has a head end which projects further in said sub-scan line direction than said tail end of said sub-scan direction one; and said measuring window moves from a position of said head end of said other oblique line image to a position of said tail end of said sub-scan direction oblique line image.

Another image reading apparatus, according to the present invention, comprises:

image reading means for reading an original image, one main scan line by one main scan line, in a sub-scan direction;

error measuring means for measuring a reading pixel position error included in image data obtained through said image reading means, and providing data concerning said reading pixel position error; and error correcting means for correcting said reading pixel position error using said data provided by said error measuring means.

Thereby, it is possible to provide the image reading apparatus which outputs images which are, with a high accuracy, similar to original images, without a pixel position error.

Further, it is preferable that said error measuring means further comprise:

a measuring pattern comprising even-pitch oblique lines, each of which is oblique from a main scan direction and also from said sub-scan direction;

light-to-electricity converting means for reading said measuring pattern, and providing image data of said measuring pattern;

processing means for processing said image data provided by said light-to-electricity converting means, and obtaining said reading pixel position error.

By using the measuring pattern of the plurality of parallel oblique lines, it is possible to perform the reading pixel position error measurement with a high accuracy and in a wide frequency range. Thereby the reading pixel position error correction can be performed with a high accuracy.

It is preferable that:

said error measuring means measures a reading pixel position error between each pair of adjacent main scan lines; and said error correcting means uses said reading pixel position error measured by said error measuring means, performs a predetermined interpolation operation on image data of a plurality of main scan lines which successively lie in said sub-scan direction, and thus provides corrected image data one main scan line by one main scan line.

By performing interpolation using image data of adjacent main scan lines and position error data therebetween, it is possible to perform position error correction with a high accuracy.

Another image reading apparatus, according to the present invention, comprises:

image reading means for reading an original image, one main scan line by one main scan line, in a sub-scan direction; and position error measuring means for processing image data read through said image reading means, said image data being obtained as a result of a measuring pattern being read by said image reading means, said measuring pattern comprising a white Ibackground and a plurality of even-pitch oblique lines arranged in said white background, each line being oblique from a main scan direction and also from said sub-scan direction;

and wherein said measuring pattern is formed on a sheet material which is long and has a longitudinal-direction end, said sheet material being fixed, so that said measuring pattern can be read through said image reading means, on said image reading apparatus only through said longitudinal-direction end.

By fixing the sheet material of the measuring pattern in a manner in which only a longitudinal-direction end thereof is fixed, it is possible to cause the sheet material to closely lie on the contact glass of the image reading apparatus and thus to prevent the sheet material from bending. As a result, the measuring pattern reading can be performed with a high accuracy, and thus it is possible to perform the reading pixel position error measurement with a high accuracy and in a wide frequency range.

Another image reading apparatus, according to the present invention, comprises:

image reading means for reading an original image, one main scan line by one main scan line, in a sub-scan direction;

position error measuring means for processing image data read through said image reading means, said image data being obtained as a result of a measuring pattern being read by said image reading means, said measuring pattern comprising a white background and a plurality of even-pitch oblique lines arranged in said white background, each line being oblique from a main scan direction and also from said sub-scan direction;

shading correcting means for performing a predetermined shading correcting operation on image data obtained through said image reading means;

a measuring chart having said measuring pattern provided thereon; and a reference tone plate for said shading correcting means to perform said predetermined shading correcting operation on image data obtained as a result of a tone of said reference tone plate being read through said image reading means, wherein said reference tone plate is provided to on said image reading apparatus at a position, relative to a provided position of said measuring chart, such that said predetermined shading correction operation can be performed on image data which is obtained as a result of said measuring pattern being read through said image reading means.

Thereby, the measuring pattern reading can be performed with a high accuracy, and thus it is possible to perform the reading pixel position error measurement with a high accuracy.

Another image reading apparatus, according to the present invention, comprises:

image reading means for reading an original image, one main scan line by one main scan line, in a sub-scan direction;

position error measuring means for processing image data read through said image reading means, said image data being obtained as a result of a measuring pattern being read by said image reading means, said measuring pattern comprising a white background and a plurality of even-pitch oblique lines arranged in said white background, each line being oblique from a main scan direction and also from said sub-scan direction; and noise reduction processing means for performing a predetermined noise reduction operation on said image data of said measuring pattern.

It is preferable that said position error measuring means sets a measuring window in a bit-map formation of said image data, in a manner in which said measuring window moves along each of said oblique lines of said measuring pattern in said bit-map formation of said image data; and obtain the center of gravity of said image data of pixels defined by said measuring window.

It is preferable that said noise reduction processing means comprises means for converting image data of a pixel to be '0', which pixel is apart, more than a predetermined distance, from said oblique line image in said measuring window. By merely the simple operation of converting image data into '0', which image data should be '0' but some noise causes the data not to be '0', accuracy of the reading pixel position error measurement can be effectively improved. In fact, because the center of gravity calculation is performed in the measurement, data of pixels apart from the oblique line image may very adversely affect the accuracy.

It is preferable that said noise reduction processing means comprises means for performing a predetermined smoothing operation on said image data. Thereby, it is possible to effectively reduce noises by effectively using the characteristics of image data of the oblique line image.

It is preferable that said noise reduction processing means comprises means for removing image data representing a separate point (as described with reference to FIG. 26). Thereby, for example, when a black particle, forming a separate point image, is undesirably adhered in proximity of an edge of an oblique line image of the measuring pattern (which point image cannot be removed by converting into '0' image data of a pixel apart from the oblique line image as in the above-mentioned method), or when a white small particle, forming a separate point image, is undesirably adhered inside an oblique line image of the measuring pattern (such noises may affect obtained image data of a middle-tone-level region and thus may adversely affect measurement accuracy), such possible adverse affection can be removed.

It is preferable that said noise reduction processing means comprises means for enlarging a contrast of said image data. Thereby, the measurement accuracy can be improved.

It is preferable that said noise reduction processing means comprises means for increasing a number of possible tone levels of said image data and, also, means for performing a predetermined smoothing operation on image data of an increased number of possible tone levels.

It is preferable that said noise reduction processing means comprises means for improving a resolution of said image data and, also, means for performing a predetermined smoothing operation on image data of an improved resolution.

It is preferable that said noise reduction processing means comprises means for increasing a number of possible tone levels of said image data, means for improving a resolution of said image data, and, also, means for performing a predetermined smoothing operation on image data of an increased number of possible tone levels and an improved resolution.

Thereby, it is possible to effectively remove measurement noises and thus high-accuracy measurement can be performed.

Another image reading apparatus, according to the present invention, comprises:

image reading means for reading an original image, one main scan line by one main scan line, in a sub-scan direction;

window setting means for setting a measuring window in a bit-map formation of image data obtained through said image reading means, in a manner in which said measuring window moves along an oblique line image which is formed in said bit-map formation of image data as a result of being read through said image reading means; and center of gravity calculating means for calculating the center of gravity of image data of pixels defined by said measuring window in said bit-map formation of said image data;

window shifting control means for determining whether or not said measuring window is shifted according to a center of gravity calculation result of said center gravity calculating means; and position error measuring means for measuring a reading pixel position error from said center of gravity calculated by said center of gravity calculating means.

Thereby, it is not necessary to use a measuring window of a large size, reading pixel position error in the sub-scan direction can be measured with a high accuracy, and the measurement with a wide dynamic range can be performed. Further, because it is possible to use a measuring window of a small size, it is possible to reduce a required capacity of a memory, and to reduce a processing time.

It is preferable that a size in a main scan direction of said measuring window is larger than a width in said main scan direction of said oblique line image. In this arrangement, it is not necessary to use very fine oblique lines. By using bold oblique lines, it is possible to perform the measurement without considering MTF (Modulation Transfer Ratio) of the optical system of the image reading apparatus.

Another image reading apparatus, according to the present invention, comprises:

a reading carriage which moves in a sub-scan direction and thus reads an original image;

reading pixel position detecting means using image data read through said reading carriage for detecting a reading pixel position error and thus detecting an actual reading pixel position in said sub-scan direction;

correction factor calculating means for calculating a correction factor using a predetermined weighting function based on said actual reading pixel position calculated by said reading pixel position detecting means;

interpolating means, using said correction factor and said image data, and thus estimating, by interpolation, correct image data which should be obtained when no reading pixel position error occurs.

Thereby, if a scanning speed variation of the reading carriage occurs, it can thus be detected by the reading pixel position error measurement, and, thus, image data which does not include a reading pixel position error can be obtained.

It is preferable that cubic function convolution is used as said weighting function. Thereby, high-accuracy image data interpolation correction can be performed.

It is preferable that a calculation of said correction factor and a calculation of addition of a plurality of correction factors, for said interpolation, are performed only once when performing said interpolation for each main scan line. Thereby, the interpolation calculation can be simplified, and thus a processing time can be shortened.

Other objects and further features of the present invention will become more apparent from the following detailed description when read in conjunction with the accompanying drawings.

BRIEF DESCRIPTION OF THE DRAWINGS

FIGS. 35A, 35B, 35C, 35D and 35E illustrate obtained image data values of pixels defined by a determining window used in an oblique line determining operation in a method performed in the image reading apparatus in the twelfth embodiment of the present invention;

FIGS. 36A, 36B, 36C, 36D and 36E illustrate obtained image data values of pixels defined by a determining window used in an oblique line determining operation in another method performed in the image reading apparatus in the twelfth embodiment of the present invention;

DESCRIPTION OF PREFERRED EMBODIMENTS

Figure 1:
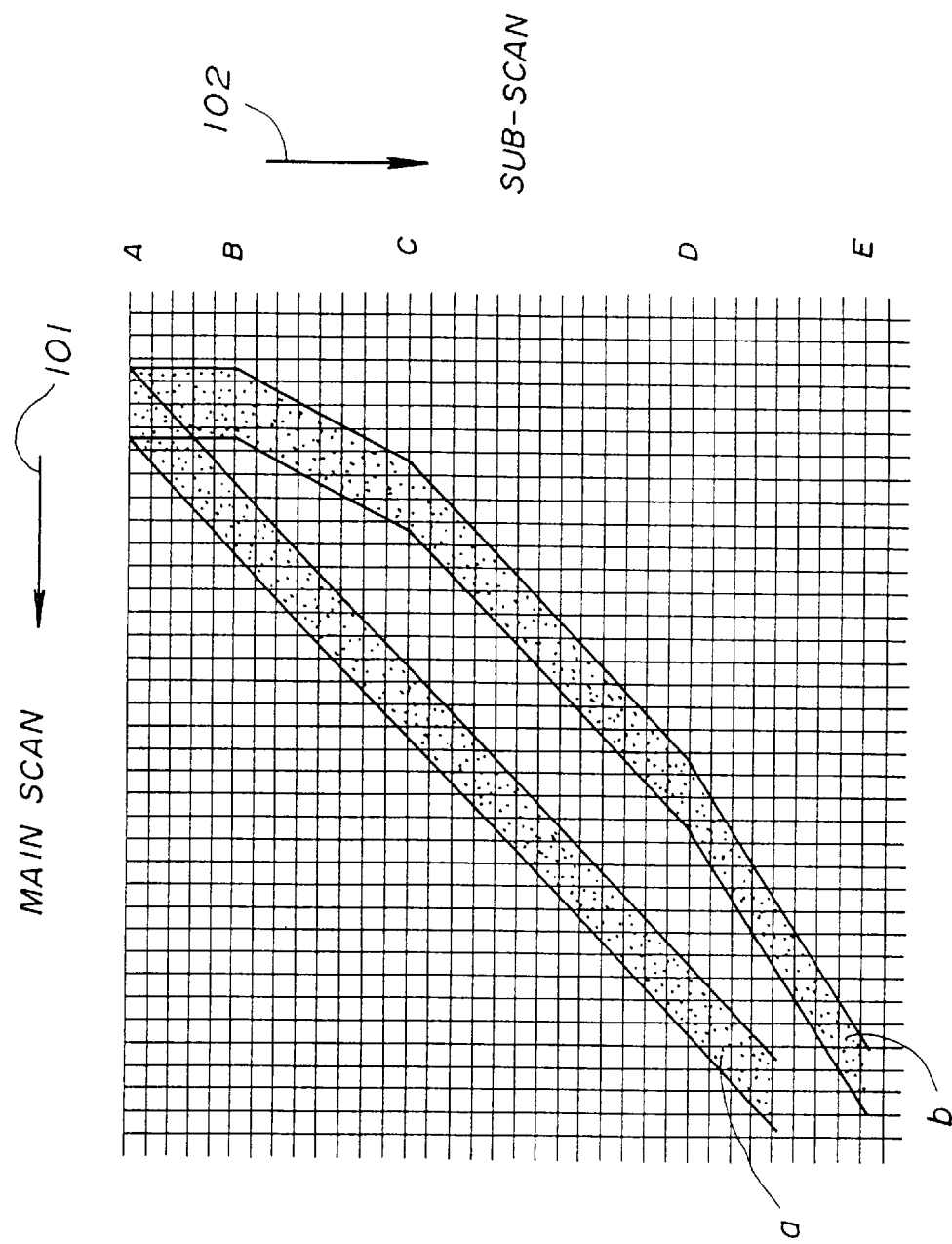
FIG. 1 illustrates a reading pixel position error measurement principle of a first embodiment of the present invention.

With reference to the drawings, preferred embodiments of the present invention will be described. In the following descriptions of the embodiments, the same reference numerals may be given to parts/components/units which can be treated equivalent to each other, and duplicated descriptions will be appropriately omitted.

1. First Embodiment 1.1 Measurement Principle

FIG. 1 illustrates a measurement principle of a reading pixel position error measurement system used in an image reading apparatus in a first embodiment of the present invention, using an example. An arrow 101 indicates a main scan direction. An arrow 102 indicates a sub-scan direction. An original image may be read, scan line by scan line, and thus each scan line of image may be read at the same time. Thus, pixels forming a scan line are read in parallel. The thus-read scan line of pixels may be output in series according to the order of the arrow 101. After the thus-read scan line of pixels is thus processed, a reading area is moved to the subsequent scan line of the original image in a direction indicated by the arrow 102, the scan line of the image is read, and the thus-read scan line of pixels is processed. Thus, a sequence of scan lines of the original image are read, and thus-read sequence of scan lines of pixels are processed. That movement of the reading area may be achieved by movement of a mirror for projecting the original image onto a light-to-electricity converting component and an illumination lamp, by movement of the original image, by movement of a unit of a light-to-electricity converting component and its image formation system, or the like. In this case, each square, shown in the figure, which is defined by lines in the main scan direction and lines in the sub-scan direction, is treated as a respective pixel. An area consisting of those pixels is also treated as a mapped image or as a bit-map which is obtained as a result of arranging image data carried by an electric signal which is obtained from the original image as a result of light-to-electricity converting. In a case where an image reading apparatus outputs thus-read pixels in a real-time manner, the main scan direction 101 and sub-scan direction 102 indicate the pixel order on the time axis. However, after the pixel data is stored in a memory, any pixel can be accessed, and thus it is possible to treat those pixels without regard to the main scan direction and sub-scan direction order in time axis.

FIG. 1 shows a case where each pixel is such that the size thereof in the main scan direction is equal to the size thereof in the sub-scan direction. A line image 'a' shown in the figure is obtained as a result of reading a 45° oblique line in a condition where a scanning speed in the sub-scan direction is fixed to be a predetermined speed. That is, the scanning speed in the sub-scan direction precisely corresponds to clock pulses which are provided for controlling sub-scan direction reading timing. A line image 'b' shown in the figure is obtained as a result of reading a 45° oblique line in a condition where the scanning speed in the sub-scan direction varies. Each of the line images 'a' and 'b' is thus formed in the bit-map which is obtained as a result of arranging image data carried by the electric signal which is obtained from the original 45° oblique line, as shown in the figure. As shown in the figure, in the case where the original 45° oblique line image is read in the condition where the scanning speed in the sub-scan direction is fixed, the identical 45° oblique line image 'a' is formed in the bit-map. In contrast to this, in the case where the original 45° oblique line is read in the condition where the scanning speed in the sub-scan direction varies, the line image 'b' thus formed in the bit-map has different inclinations according to the thus-varied scanning speeds.

In detail, with regard to the line image 'b', a portion between A-B in the sub-scan direction 102 is formed in a condition where the scanning speed in the sub-scan direction is 0. In that condition, although a bit-map address in the sub-scan direction advances according to the above-mentioned clock pulses for controlling the sub-scan direction reading timing, the reading area on the original image does not shift. Thereby, that portion of the line 'b' extends in the sub-scan direction as shown in the figure.

A portion between B-C in the sub-scan direction 102 is formed in a condition where the scanning speed in the sub-scan direction is ½ the predetermined speed. In this condition, as the bit-map address advances according to the clock pulses, the reading area on the original image shifts ½ a predetermined distance. Thereby, the angle Θ between this position of the line 'b' and the sub-scan direction is approximately 26.57° because tan Θ=0.5.

A portion between C-D in the sub-scan direction 102 is formed in a condition where the scanning speed in the sub-scan direction is fixed to be the predetermined speed. Thereby, the angle of this portion of the line 'b' between the sub-scan direction 102 is 45°.

A portion between D-E in the sub-scan direction 102 is formed in a condition where the scanning speed in the sub-scan direction is 1.5 times the predetermined speed. In this condition, as the bit-map address advances according to the clock pulses, the reading area on the original image shifts 1.5 times the predetermined distance. Thereby, the angle Θ between this position of the line 'b' and the sub-scan direction is approximately 56.31° because tan Θ=1.5.

Thus, the inclination of the read line image 'b' varies depending on the scanning speed in the sub-scan direction. In other words, the moving speed of a portion of the original 45° oblique line image in the main scan direction, which portion is being currently read, depends on the scanning speed in the sub-scan direction. By detecting such a phenomenon, reading pixel position errors in a bit-map image due to unevenness of the sub-scan direction scanning speed, vibrations of mirrors (such as mirrors 23, 24, 25 shown in FIG. 9), a lens (such as a lens 26 shown in FIG. 9) and so forth of the image formation system, light-to-electricity converting device (CCD) (such as a device 27 shown in FIG. 9) and so forth of the image reading apparatus are measured.

The above descriptions are based on the assumption that each pixel has a square shape and the 45° oblique line is used. However, it is not necessary to be limited to such an assumption. For example, it is not necessary that each pixel has a square shape. Further, it is not necessary that such an 45° oblique line is used. For example, it is possible to apply this measurement principle to image data obtained in an image reading apparatus having a main scan direction resolution of 400 dpi and a sub-scan direction resolution of 600 dpi. The relationship that a moving speed of a portion of an oblique line image in the main scan direction, which portion is being currently read, depends on a scanning speed in the sub-scan direction is applied even if the oblique line to be used is not an oblique line having the 45° angle from the sub-scan direction. Therefore, the reading pixel position errors can be measured by using the same measurement principle.

1.2 System configuration

Figure 2:
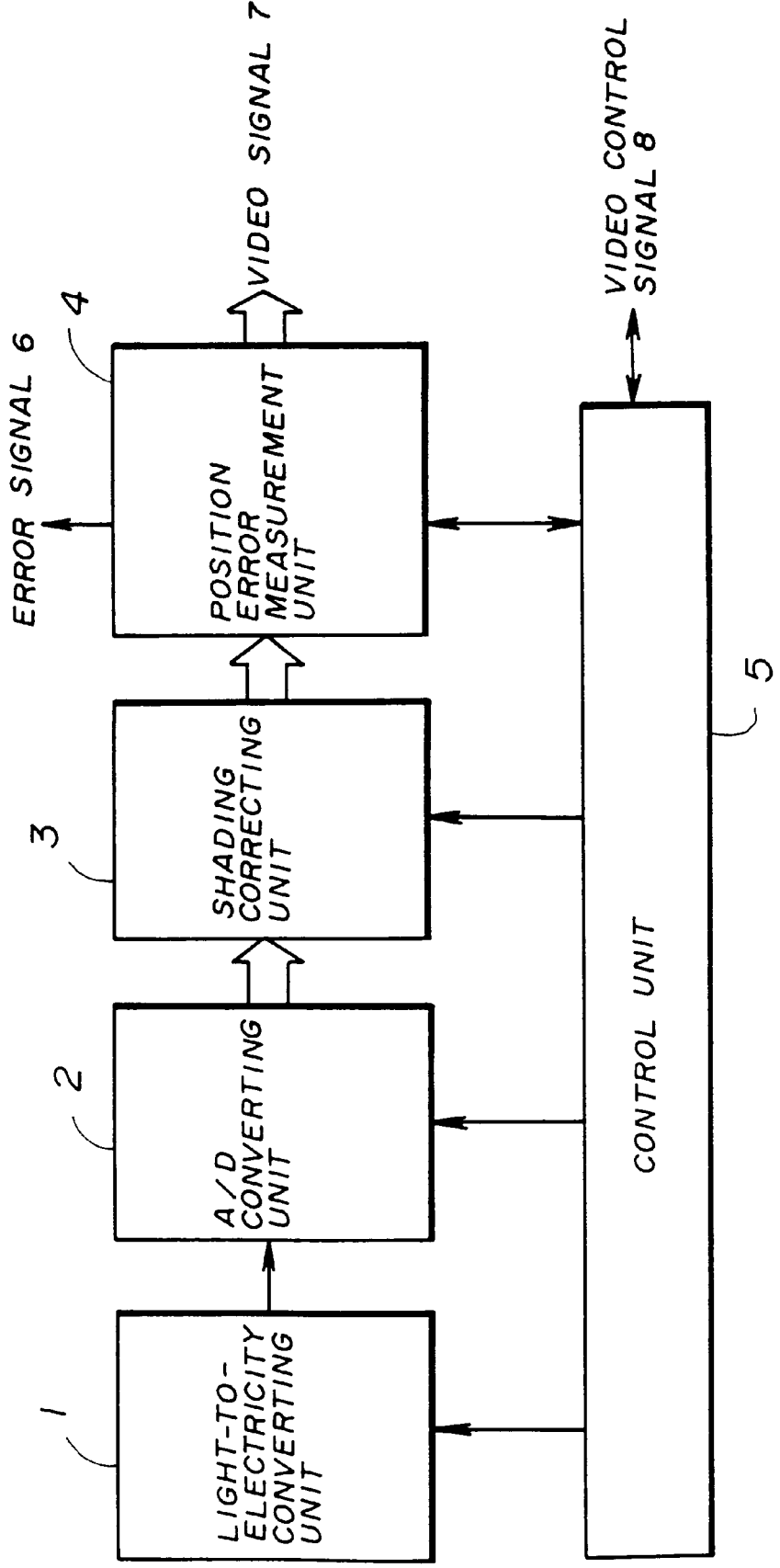
FIG. 2 shows a block diagram of a system configuration of an image reading apparatus in the first embodiment of the present invention.

FIG. 2 shows a block diagram of a basic system configuration of an image reading apparatus in the first embodiment of the present invention. This image reading apparatus incorporates therein the above-mentioned reading pixel position error measurement system. The reading pixel position error measurement system measures reading pixel position errors in a real-time manner in the image reading apparatus. Basically, this image reading apparatus includes a light-to-electricity converting unit 1, an A/D converting unit (or A/D converter) 2, a shading correcting unit 3, a position error measurement unit (or circuit) 4, and a control unit 5.

The light-to-electricity converting unit 1 includes, for example, a line of light-to-electricity converting components, such as a line CCD (Charged-Coupled Device). Thereby, an original image is read and is converted into an electric signal. The thus-obtained electric signal representing the original image is converted into digital, multilevel image data through the A/D converting unit 2. The thus-obtained image data undergoes a shading correction performed by the shading correcting unit 3. Specifically, shading errors, included in the image data, due to illumination unevenness, lens outskirts light intensity reduction, unevenness in sensitivity of the line of the light-to-electricity converting components among respective pixels, are compensated for. The thus-obtained image data is input to the position error measurement unit 4 which outputs an error signal 6 representing measurement results. Simultaneously, the position error measurement unit 4 outputs a video signal 7 representing the read original image. Those respective function blocks operate under control by the control unit 5. Specifically, the control unit 5 controls timings according to which those function blocks operate, and sets operation conditions of those function blocks. Thereby, those function blocks operate in a manner in which the operations of those blocks have appropriate relationship therebetween. The control unit 5 externally sends/receives an appropriate video control signal 8. The video control signal includes a well-known synchronization signal for taking synchronization of a video signal which carries image data, and a well-known gate signal which indicates effective portions of the image data. For example, the image reading apparatus is a digital copying machine, the video control signal includes a clock signal, a main-scan direction synchronization signal, a main-scan direction gate signal and a sub-scan direction gate signal.

The reading pixel position error measurement system according to the present invention operates as follows. An oblique line image such as the 45° oblique line image mentioned above is read and appropriately processed through the light-to-electricity converting unit 1, A/D converting unit 2 and shading correcting unit 3. Thus-obtained image data of the oblique line image is then processed by the position error measurement unit 4, and thus reading pixel position errors such as those described above are measured based on the measurement principle described above. Thus-obtained measurement results are output therefrom as the above-mentioned error signal 6.

In a case where unity magnification sensors are used, there are no problems of lens outskirts light intensity reduction due to lens characteristics. Therefore, the shading correcting unit such as the shading correcting unit 3 may be omitted. Even in such a case, the present invention can be applied.

Figure 3A:
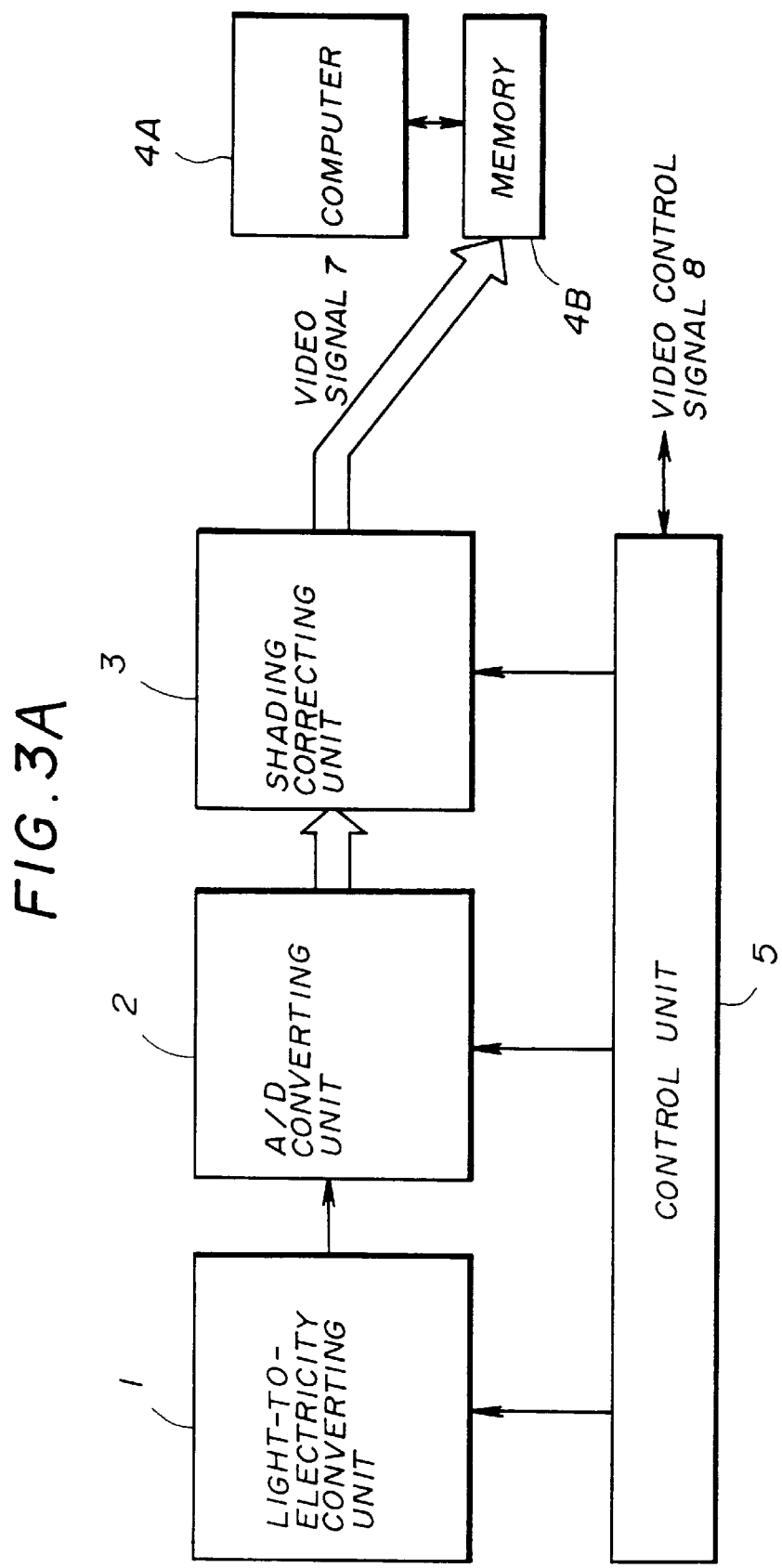
FIGS. 3A and 3B show a block diagram of a system configuration of a variant embodiment of the first embodiment of the present invention.
Figure 3B:
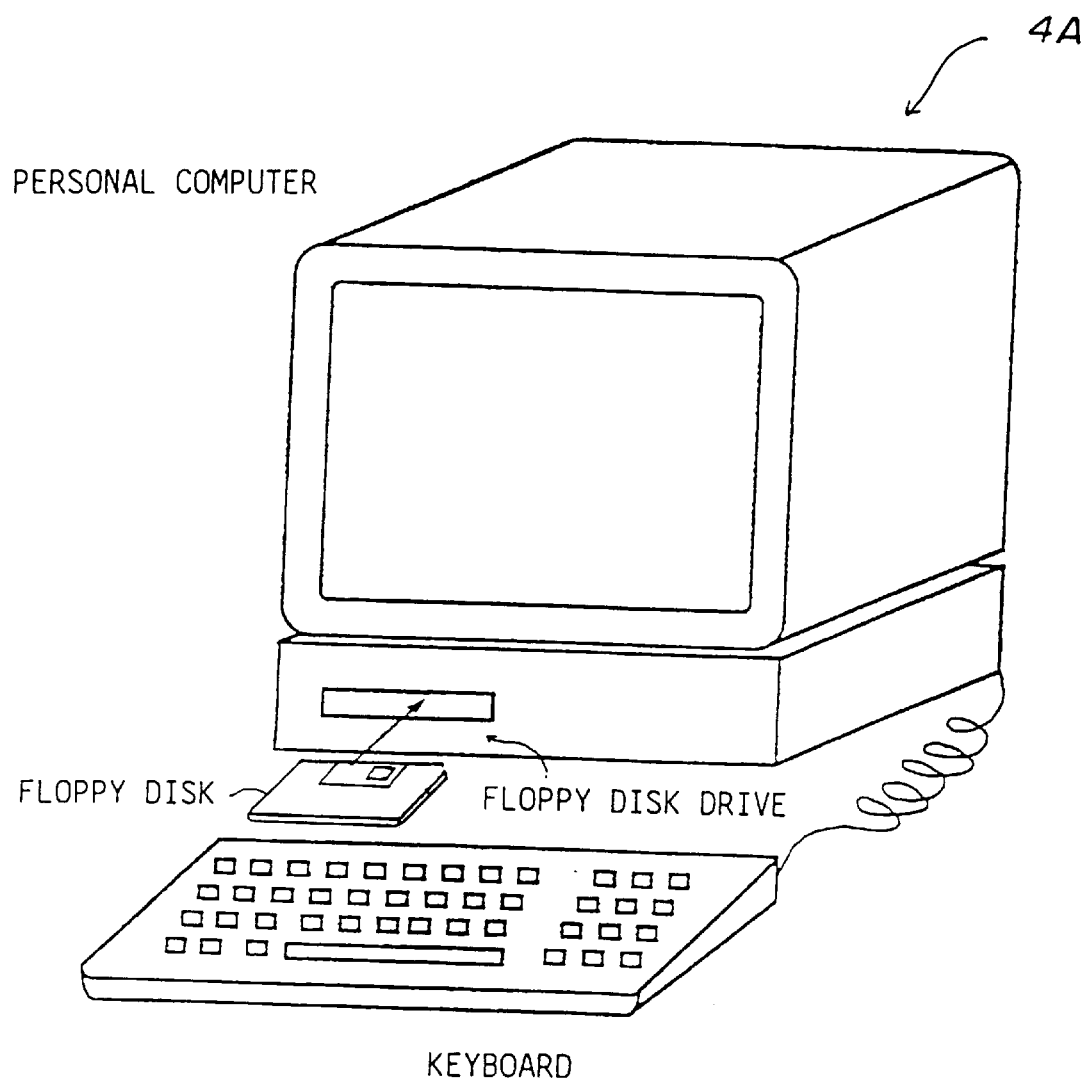

FIG. 3A shows a block diagram of a basic system configuration of a variant embodiment of the image reading apparatus in the first embodiment of the present invention. In this variant embodiment, the position error measurement unit such as the position error measurement unit 4 shown in FIG. 2 is not included. The variant embodiment shown in FIG. 2 includes the light-to-electricity converting unit 1, A/D converting unit 2, shading correcting unit 3 and control unit 5. In this variant embodiment, an oblique line image such as the 45° oblique line image mentioned above is read and appropriately processed through the light-to-electricity converting unit 1, A/D converting unit 2 and shading correcting unit 3. Thus-obtained image data of the oblique line image is then stored in a memory 4B, and processed by a computer 4A, shown in FIG. 3A. Thus, reading pixel position errors such as those described above are measured based on the measurement principle described above through the computer 4A. The computer 4A may comprise a general-purpose computer such as a personal computer shown in FIG. 3B. The general-purpose computer is specifically configured by software (stored in any information storage medium such as a floppy disk shown in FIG. 3B) executed thereby to carry out the above-mentioned reading pixel position error measurement. In this method, it is possible that the image data is temporarily stored in a magneto-optical disc or the like, and is read out therefrom when it is necessary. Further, it is also possible to permanently store the image data in such an information storage medium.

1.3 Position Error Measuring Process

Figure 4:
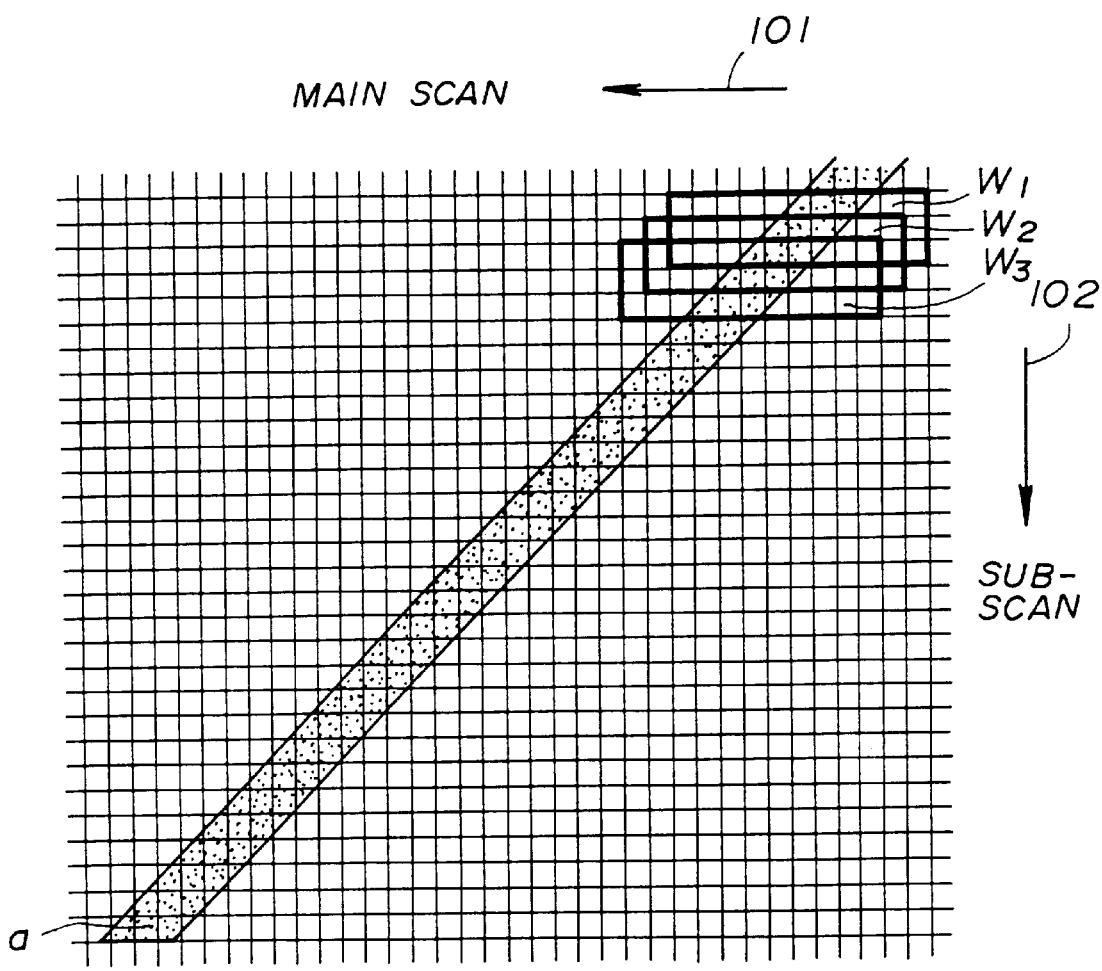
FIG. 4 illustrates a reading pixel position error measurement operation when an oblique line image is formed in a bit-map formation of obtained image data in the first embodiment.

FIG. 4 illustrates a position error measuring process using a line image 'a' in bit-map format image data which has been obtained through the light-to-electricity converting unit 1, A/D converting unit 2 and shading correcting unit 3 shown in FIGS. 2 and 3. The bit-map shown in FIG. 4 is similar to the bit-map shown in FIG. 1. A measuring window $W_1$ has a size of 11 pixels by 3 pixels as shown in the figure. A position of a portion of the line image 'a' within the measuring window $W_1$ in the main scan direction with respect to the measuring window $W_1$ is obtained. For this purpose, the center of gravity of the image data of the pixels defined by the measuring window $W_1$ in the main scan direction is calculated as will be described later. The thus-calculated center of gravity in the main scan direction may indicate the center of the portion of the line image 'a' defined by the measuring window $W_1$. This center-of-gravity calculation is performed repeatedly after the position of the measuring window $W_1$ is moved to the position $W_2$, the position $W_3$, . . . , as shown in the figure, respectively. As shown in FIG. 4, the measuring window moves in a direction which is 45° from the main scan direction 101 and also 45° from the sub-scan direction 102 in the condition where each pixel has a square shape, because the measuring window moves one pixel by one pixel in the main scan direction, and simultaneously, one pixel by one pixel in the sub-scan direction. Therefore, the position of the center of gravity of the image data in the measuring window in the main scan direction shifts one pixel by one pixel in the main scan direction as the measuring window moves as mentioned above unless the positions of pixels of the line image 'a' shifts due to undesirable causes. If the center of gravity of the pixels in the measuring window does not shift one pixel by one pixel in the main scan direction as the measuring window moves one pixel by one pixel in each of the main scan direction and sub-scan direction simultaneously, there should be some undesirable causes therefor. Such a difference is a reading pixel position error which should be measured in the reading pixel position error measuring process according to the present invention. In other words, by determining whether or not the center of gravity of the pixels in the measuring window shifts one pixel by one pixel in the main scan direction as the measuring window moves one pixel by one pixel in each of the main scan direction and sub-scan direction simultaneously, it can be determined whether the line image formed in the bit-map from the read image data is such as the line image 'a' shown in FIG. 1 or is such as the line image 'b' shown in FIG. 1. In the case where the line image 'a' is formed from the read image data, the center of gravity of the pixels in the measuring window shifts one pixel by one pixel in the main scan direction as the measuring window moves one pixel by one pixel in each of the main scan direction and sub-scan direction simultaneously. Then, it can be determined that there is no reading pixel position errors. Otherwise, it can be determined that there are some reading pixel position errors. How far apart the calculated center of gravity is from a reference position of the center of gravity in the case where the center of gravity of the pixels in the measuring window shifts one pixel by one pixel in the main scan direction as the measuring window moves one pixel by one pixel in each of the main scan direction and sub-scan direction simultaneously indicates the degree of the reading pixel position errors. The above-mentioned reference position of the center gravity is moved one pixel in the main scan direction each time the measuring window moves one pixel in the main scan direction and one pixel in the sub-scan direction simultaneously. In a case where it is determined that a main cause of the reading pixel position error is unevenness of the sub-scan direction scanning speed, it is easy to appropriately convert the data of the reading pixel position error into data of sub-scan direction scanning speed error. Thereby, it is possible to correct the sub-scan direction scanning speed error.

When the center of gravity of the image data in the measuring window is calculated, image data of many pixels including pixels surrounding the line image 'a' is also used. That image data may include various noises such as noises inherent in the CCD and so forth. The center of the portion of the line image 'a' is obtained by calculating the center of gravity of the image data in the measuring window according to the present invention as mentioned above. By this method, in the process of calculating the center of gravity of the image data in the measuring window, effect of such noises can be reduced, because the image data of many pixels including pixels surrounding the oblique line image is used, and those noises generally appear at random throughout the entire area of the measuring window, and may thus be canceled out by each other. Thus, the center of the portion of the line image 'a' can be obtained in a high S/N (signal to noise) ratio condition. Ordinarily, when the number of pixels defined by the measuring window is increased, the S/N ratio is higher. It is preferable that the measuring window is larger in the main direction because the data to be used is the center of gravity of the image data in the measuring window in the main scan direction. It is possible to perform the reading pixel position error measurement using a measuring window having a length in the sub-scan direction of one pixel.

Figure 5:
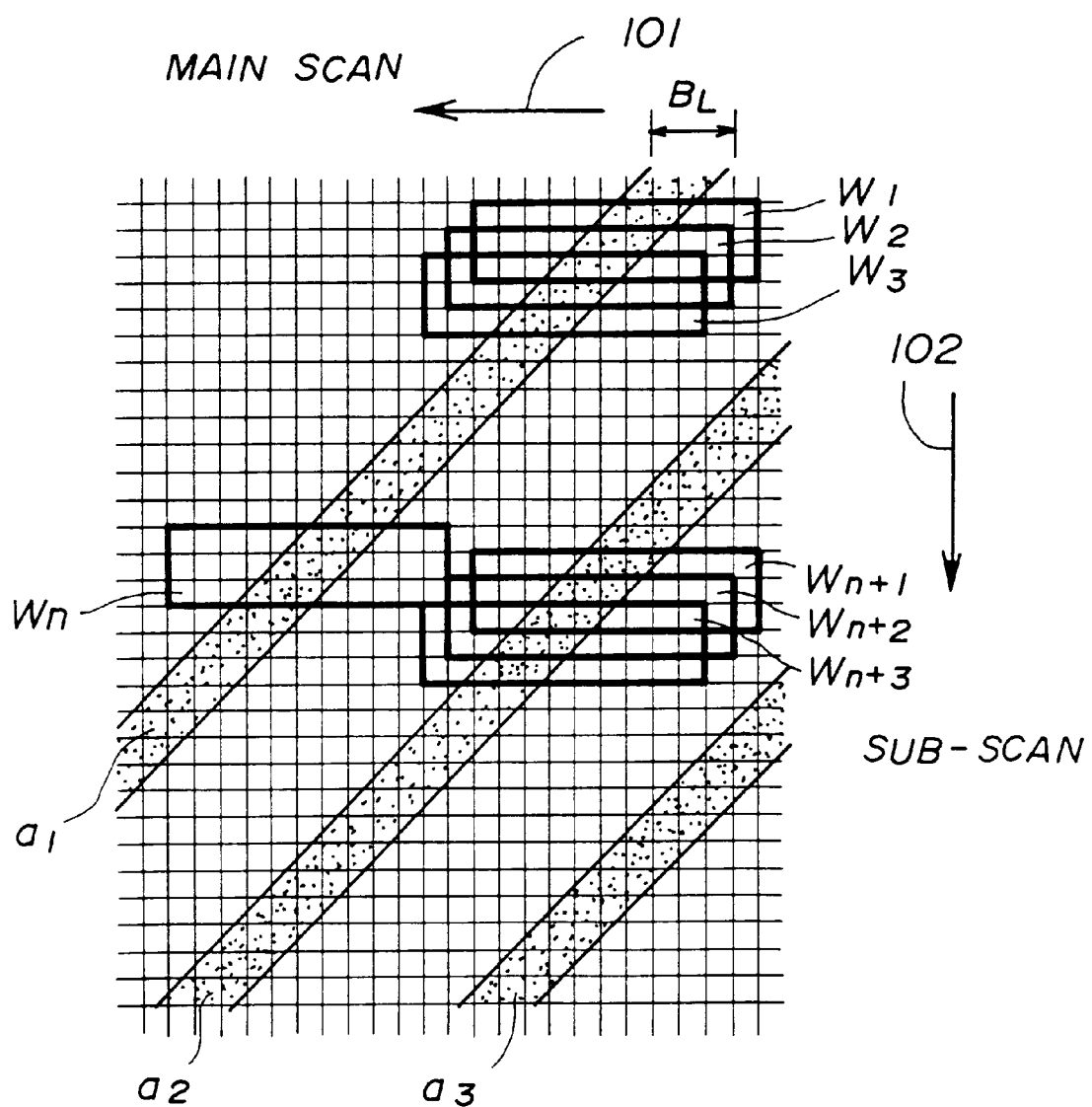
FIG. 5 illustrates a measuring window shifting operation in the reading pixel position error measurement in the first embodiment when a plurality of oblique line images are formed in a bit-map formation of obtained image.

FIG. 5 illustrates a position error measuring process in which a plurality of parallel oblique line images $a_1$, $a_2$ and $a_3$, . . . , such as the oblique line image 'a' shown in FIG. 4, are used for measuring reading pixel position errors such as those described above. In this case, similar to the example shown in FIG. 4, the measuring window is moved, repeatedly, one pixel by one pixel in the main scan direction, and simultaneously one pixel by one pixel in the sub-scan direction, into the positions $W_1$, $W_2$, $W_3$, . . . , as shown in FIG. 5. Then, after the number of the moving operations reaches n−1, and thus the measuring window is positioned at the measuring window $W_n$, the measuring window is moved into the position of the measuring window $W_{n+1}$ shown in FIG. 5. The distance, in the main scan direction, between each adjacent pair of the oblique line images $a_1$, $a_2$, $a_3$, . . . is predetermined when the measuring chart or test chart (having those plurality of oblique line images drawn thereon) is produced. This distance is a distance which the measuring window moves in the direction reverse of the main scan direction, after moving, one pixel by one pixel in each of the main scan direction and sub-scan direction simultaneously, n–1 times. After moving that distance in the direction reverse of the main direction and simultaneously one pixel in the sub-scan direction, into the measuring window $W_{n+1}$, the measuring window is moved, one pixel by one pixel in each of the main scan direction and sub-scan direction simultaneously, into the positions $W_{n+2}$, $W_{n+3}$, . . . . By predetermining the above-mentioned distance in the main direction between each adjacent pair of the oblique line images to be an integer number of times of the size of each pixel, it is easy to set the above-mentioned reference position of the center of gravity for the oblique line image after the measuring window moves in the direction reverse to the main scan direction. After each time the measuring window moves, one pixel by one pixel in each of the main scan direction and sub-scan direction simultaneously, the center of gravity of the pixels in the measuring window is calculated and thus reading pixel position errors are detected as described above. Each time the measuring window is moved in the direction reverse to the main scan direction, the above-mentioned reference position of the center of gravity, which is compared with the calculated center of gravity in the reading pixel position error measurement, should be corrected for the above-mentioned distance between each adjacent pair of the parallel oblique line images. By predetermining the distance to be an integer number of times of the size of each pixel, that correction of the reference position of the center of gravity can be easily performed, and also inputting of the reference position correction amount to the measurement system can be easily performed.

In the above-described examples, the measuring window is moved one pixel by one pixel. However, in a case where a frequency band of causes of reading pixel position errors such as apparatus vibration is low, for example, it is possible that the measuring window is moved two (or more) pixels by two (or more) pixels in each of the main scan direction and sub-scan direction simultaneously. Thereby, it is possible to shorten a time required for the reading pixel position error measurement.

By using a plurality of parallel oblique line images such as those shown in FIG. 5 in the reading pixel position error measurement according to the present invention, it is possible to perform the measurement throughout an original image reading area of the image reading apparatus even if the original image reading area is long in the sub-scan direction and short in the main scan direction. Further, by using the plurality of parallel oblique line images in the measurement, it is possible to use in the measurement the measuring chart or pattern which is long in the sub-scan direction and short in the main scan direction. By positioning such a long and narrow measuring chart along the sub-scan direction at various different positions in the main scan direction, it is possible to perform the reading pixel position error measurement for various positions separately.

In the above-described measuring method, it is not necessary to make those oblique line images of the measuring chart be finer in order to improve the 1resolution of the reading pixel position error measurement. In fact, for example, the system disclosed in the above-mentioned Japanese Laid-Open Patent Application No.6-297758, even-pitch pattern is used as a reference measuring pattern. In such case, some main scan lines do not scan the pattern because the pattern includes parallel lines which are in parallel to the main scan direction, and apart from each other in the sub-scan direction. In particular, in a case where a spatial frequency of the measuring pattern differs from a spatial frequency of rain scan lines, the frequency deviation may cause 'moire' which may degrade the accuracy of the reading pixel position error measurement. In order to prevent such a problem, it is necessary to make the pattern finer in comparison to the main scan line resolution. Such a problem can be solved by using the above-described oblique line measuring pattern in the present invention. In fact, by using the measuring pattern such as that shown in FIG. 5, each of all the main scan lines scans a portion of the measuring pattern. Therefore, it is possible to use those oblique line images, each of which is wide, such that those line images may not be adversely affected by the MTF of the apparatus. By thus using the wide line pattern, the 1measuring window should be enlarged. Thereby, it is possible to improve accuracy of the reading pixel position error measurement. In a case where the measurement is performed in a real-time manner, the width of each line of the oblique line pattern of the measuring chart may be determined in consideration of a balance between the data processing rate, the data storage size of buffers, and the circuit scale of the measurement system.

In the above-described examples, the center of an oblique line image is obtained by calculating the center of gravity of the pixels in the measuring window. However, it is also possible to use a wider line image and the position of an edge of the line image is obtained in some well-known manner. Also in such a method, the reading pixel position error measurement can be performed similarly.

Further, in the above-described methods in the present invention using one or a plurality of parallel oblique line images, a portion(s) of the oblique line images scanned by each main scan line is (are) identical among the successive main scan lines when ignoring position shift along the main scan direction. Therefore, the state of the portion of the oblique line image defined by the measuring window is always approximately fixed as shown in FIGS. 4 and 5. Thereby, the above-mentioned 'moire' problem, which cannot be avoided in the method using the test chart of the even-pitch lines arranged in the sub-scan direction in the related art described above, can be avoided in the present invention. Thus, it is possible to perform a high-accuracy reading pixel position error measurement.

1.4 Calculation of the Center of Gravity from Image Data in the Window

Figure 6:
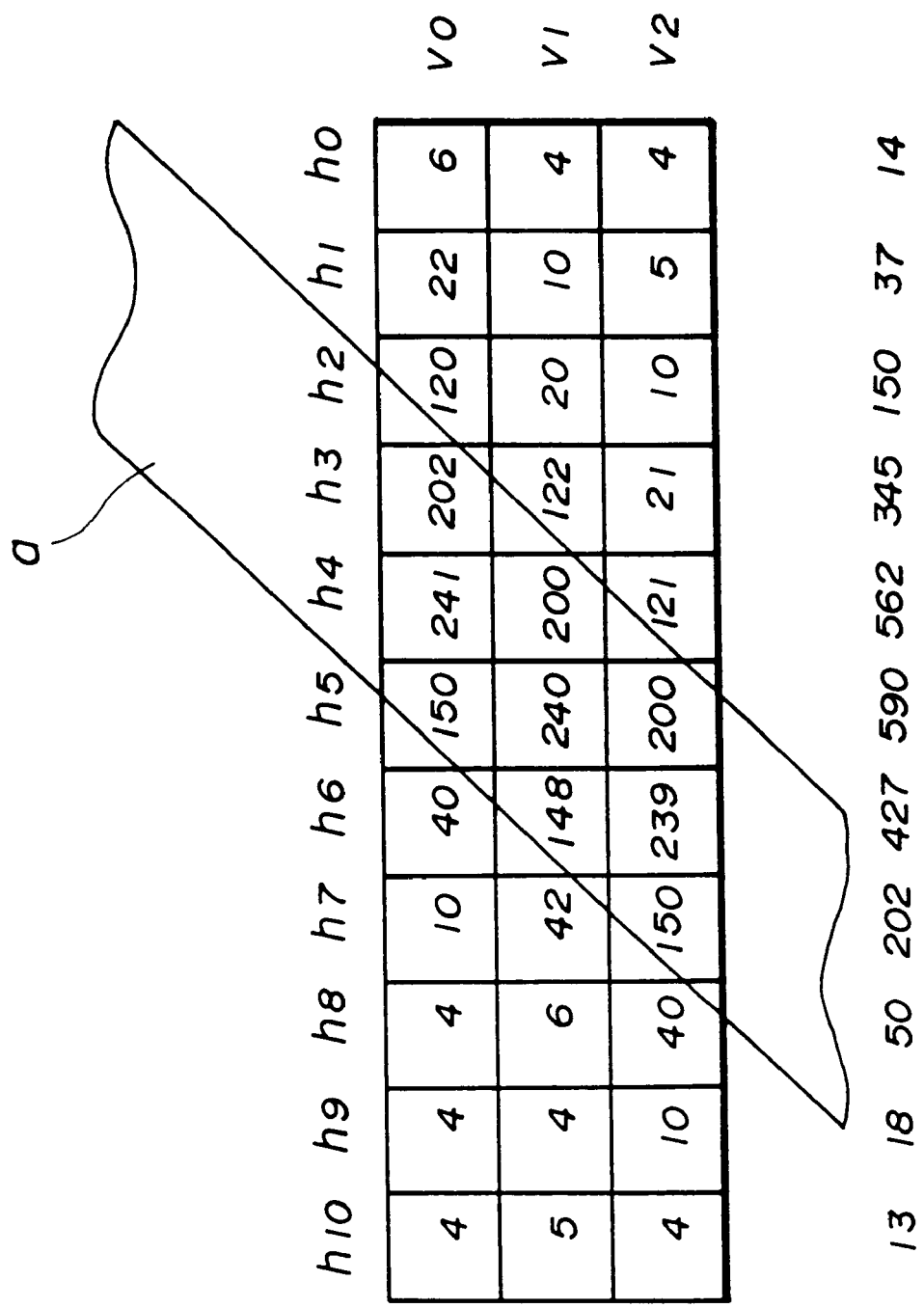
FIG. 6 illustrates image data of pixels defined by the measuring window including pixels of an oblique line image in the first embodiment.

FIG. 6 shows a positional relationship between the pixels defined by the measuring window and the oblique line image 'a'. In the figure, the image data of the pixel is indicated in each pixel. The image data is the image data obtained as a result of reading the oblique line image 'a'. The image data of each pixel is 8-bit digital data, and may be represented by a decimal-system value of 0 to 255. The image data of each pixel shown in the figure is indicated by the decimal-system value.

When calculating the center of gravity of the pixels in the measuring window, the totals of the image data of pixels is obtained for each column. The totals of the image data of pixels obtained for those columns, from the right-hand, $h_0$, $h_1$, $h_2$, . . . , $h_{10}$ shown in FIG. 6 are referred to as $c_0$, $c_1$, $c_2$, . . . , $c_{10}$, respectively. Those totals are 14, 37, 150, 345, 562, 590, 427, 202, 50, 18 and 13, respectively, as shown in the figure. Assuming that the main scan direction coordinate values of the centers of those pixels are, leftwardly in FIG. 6, 0 to 10, respectively, $$c_0(m-0)+c_1(m-1)+c_2(m-2)+ \ldots +c_{10}(m-10)=0 \qquad (1),$$

where the coordinate value of the center of gravity in the main scan direction is 'm', because the overall moment about the center of gravity 'm' is 0. Thus, the center of gravity in the main scan direction of (the image data of) the pixels in the measuring window is calculated. After applying the above-mentioned specific values of the image data column totals $c_0, c_1, c_2, \ldots, c_{10}$ and solving the above-mentioned equation (1), the center of gravity:

$$m=4.667.$$

is obtained.

When obtaining the center of gravity, a preceding calculation such as an interpolation operation is not needed. Therefore, this method is advantageous for simplifying the calculation process, and achieving a high-speed calculation. Instead, it is also possible to obtain the position of the oblique line image in another manner. That is, an interpolation operation is performed on the series of the image data column totals $c_0, c_1, c_2, \ldots, c_{10}$, and thus a data series in a predetermined resolution is obtained. From the thus-obtained data series, the position at which the peak value is present may be obtained.

1.5 Relationship between Shift of the Portion of the Oblique Line Image in the Measuring Window and Sub-Scan Direction Reading Pixel Position Error In the above-described methods in the first embodiment of the present invention, a sub-scan direction reading pixel position error is measured by measuring shift of the portion of the oblique line image of the read image data of the pixels in the main scan direction in the measuring window. In the case described above where the pixel size is the same in the main scan direction and in the sub-scan direction, and the 45° oblique line image is used as the measuring chart, as is obvious from the above descriptions, a measured shift of the portion of the oblique line image of the read image data of the pixels in the main scan direction in the measuring window represents a sub-scan direction reading pixel position error. In another case where the pixel size is not the same in the main scan direction and in the sub-scan direction, and/or the oblique line image of the measuring chart is not a 45° oblique line image, an appropriate conversion is performed for obtaining the sub-scan direction reading pixel position error.

1.6 Measuring Operation Procedure

Figure 7:
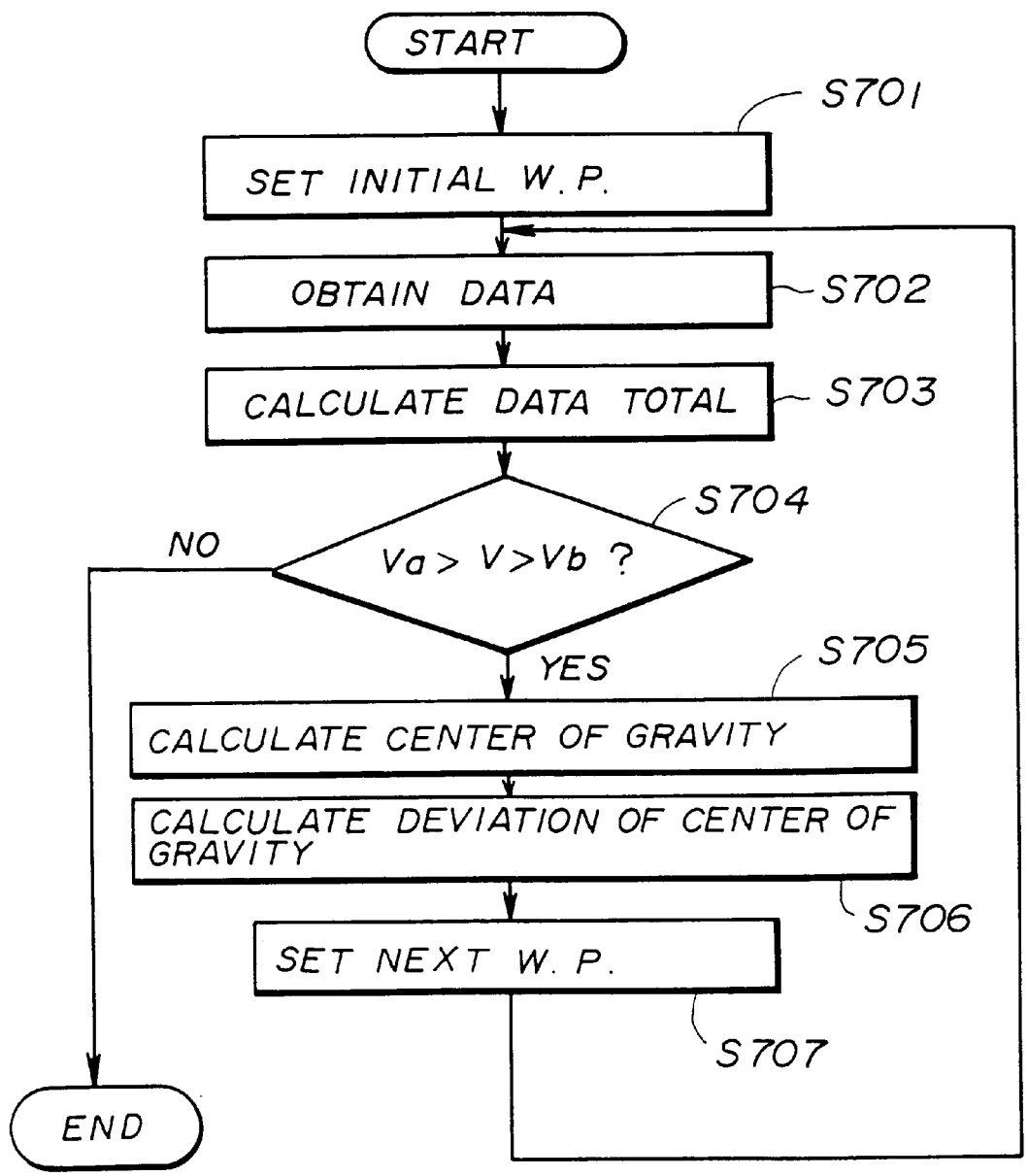
FIG. 7 shows an operation flow chart of the reading pixel position error measurement in the first embodiment.

FIG. 7 shows an operation flowchart of the reading pixel position error measurement in the first embodiment of the present invention. First, a window pointer (W. P.) which indicates the position of the measuring window is set in a step S701 (hereinafter, the term 'step' being omitted). Then, in S702, the image data of the pixels in the measuring window at the position indicated by W. P. is obtained. In 703, the total V of the obtained image data is calculated. In 704, it is determined whether or not Va>V>Vb, where Va and Vb are predetermined threshold values, respectively. When it is determined that the value V is a value between the predetermined values Va and Vb in S704, the above-described calculation of the center of gravity using that image data is performed in S705. In S706, the main scan direction positional deviation between the calculated center of gravity and the above-mentioned reference position of the center of gravity is calculated. Then, a next W. P. is set in S707, and the operation returns to S702. Then, the above-described operation is repeated.

If it is determined in S704 that the image data total V is not between Va and Vb, the current operation is terminated. The reason therefor will now be described. There may be a case where there are no pixels in the current measuring window representing any portion of the oblique line image due to an erroneous setting of the W. P. or other causes. In such a case, it is useless to further process that image data. Therefore, the current operation is terminated in that case. There may be a case where the measuring window has completed passing through all of those oblique lines provided on the measuring chart. In such a case, by performing such a determination as S704, it is possible to automatically terminate the measuring operation.

1.7. Measuring Chart

Figure 8A:
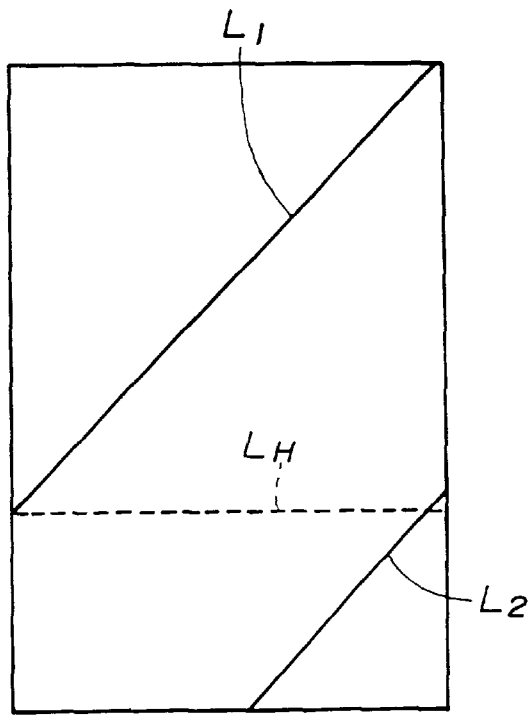
FIGS. 8A, 8B, 8C and 8D show examples of measuring charts which can be used in the reading pixel position error measurement in the first embodiment.

FIGS. 8A, 8B, 8C and 8D show examples of the above-mentioned measuring chart. In each figure, the outline rectangle indicates the outline of the measuring chart, and also, when the measuring chart is set on the image reading apparatus, indicates the outline of the entirety of the original image reading area (such as a contact glass or platen glass on which a paper sheet, on which an original image is provided, is placed and the apparatus reads the original image through the glass) of the image reading apparatus. In the example of FIG. 8A, two parallel oblique line images $L_1$ and $L_2$ are provided on the measuring chart. A broken line $L_H$ is not actually provided on the measuring chart and indicates that, in the figure, the bottom of the line $L_1$ is lower than the top of the line $L_2$. Thereby in an original image scanning operation of the image reading apparatus using the above-mentioned line CCD as the reading carriage which extends horizontally (in the main scan direction) in the figure and moves vertically (sub-scan direction) in parallel, first the line CCD scans the line $L_1$, then scans both the line $L_1$ and $L_2$ at the same time, and then scans the line $L_2$. Unless the bottom end of the line $L_1$ is lower than the top end of the line $L_2$, when the measuring window moves from a portion in proximity of but not the exact edge of the bottom end, of the line $L_1$, to a portion in proximity of but not the exact edge of the top end of the line $L_2$, it is possible that the measuring window includes neither pixels of the bottom exact edge of the line $L_1$ nor pixels of the top exact edge of the line $L_2$. If the measuring window includes such pixels forming line exact edges in the longitudinal axis of the oblique lines, the calculation of the center of gravity may not be performed correctly for obtaining the position of the line image, because those pixels of line exact edges may adversely affect the calculation. In order to prevent such a problem, it is needed that the measuring window moves from one oblique line when the measuring window is located in a middle portion of the oblique line, and, the thus-moving measuring window reaches to a middle portion of a subsequent oblique line, as shown in FIG. 5. When using the measuring chart shown in FIG. 8A, because the top of the line $L_1$ is positioned at the top of the original image reading area of the image reading apparatus, the bottom of the line $L_2$ is positioned at the bottom of that original image reading area, the right-hand ends of the lines $L_1$ and $L_2$ are positioned at the right-hand end of that original image reading area and the left-hand end of the line $L_1$ is positioned at the left-hand end of that original image reading area, the reading pixel position error measurement can be performed throughout the original image reading area.

Figure 8B:
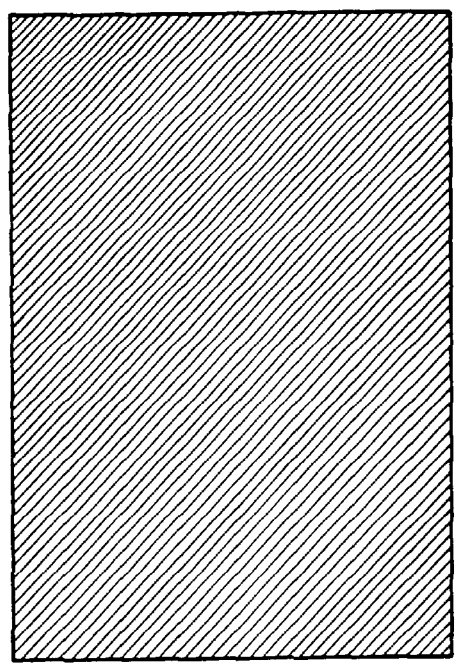

In the example of FIG. 8B, as shown in the figure, finer parallel oblique line images L are provided throughout the measuring chart. By using this measuring chart, the reading pixel position error measurement can be performed for any position in the original image reading area of the image reading apparatus. In this case, by causing the measuring window to move so as to define only one oblique line image of those parallel oblique line images, it is possible that the reading pixel position error measurement is performed similar to that using the measuring chart shown in FIG. 8A. In the method using the chart shown in FIG. 8B, because those fine line images are provided throughout the measuring chart, it may not be possible to insert other patterns therein for performing other kinds of reading image evaluation. In contrast to this, in the method using the measuring chart shown in FIG. 8A, it is possible to insert other patterns therein for performing other kinds of reading image evaluation.

Figure 8C:
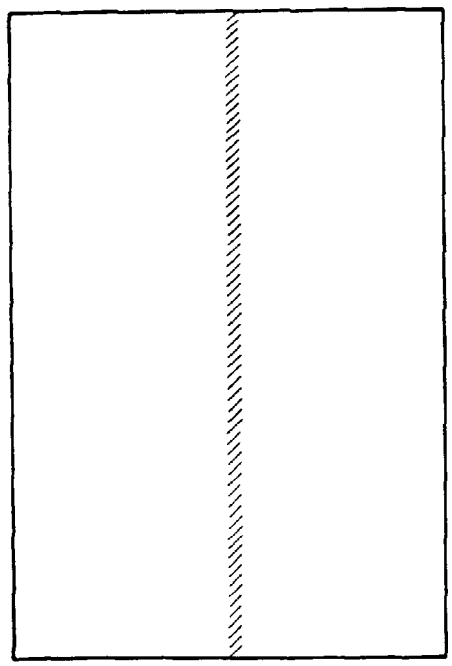
Figure 8D:
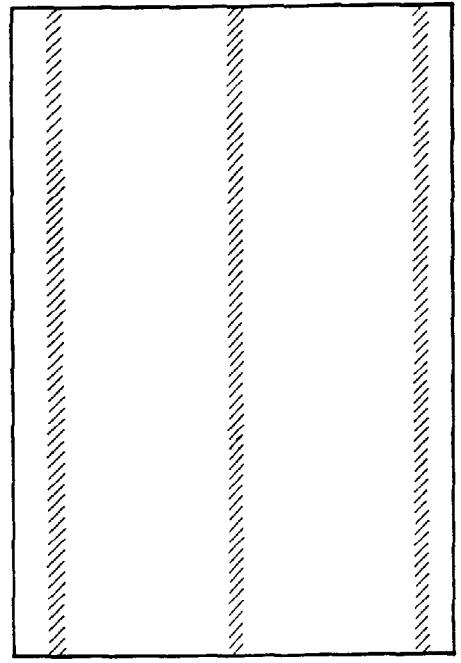

The example shown in FIG. 8C is used for the reading pixel position error measurement performed only for the center of the original image reading area of the image reading apparatus. The example shown in FIG. 8D is used for the reading pixel position error measurement performed only for the center and the right and left sides of the original image reading area of the image reading apparatus. In the latter two examples, shown in FIGS. 8C–8D, the fine parallel oblique line images are very short in comparison to the example shown in FIG. 8B. Those examples may be achieved, not only by producing the charts as shown in the figures, but also by producing a strip (strips) by cutting out only a portion on which the line images are provided from the original chart, and adhering the strip (strips) onto another chart in the related art. It is also possible to treat the strip (strips) itself (themselves) as the measuring chart (charts).

2. Second Embodiment 2.1 General Configuration of the Apparatus

Figure 9:
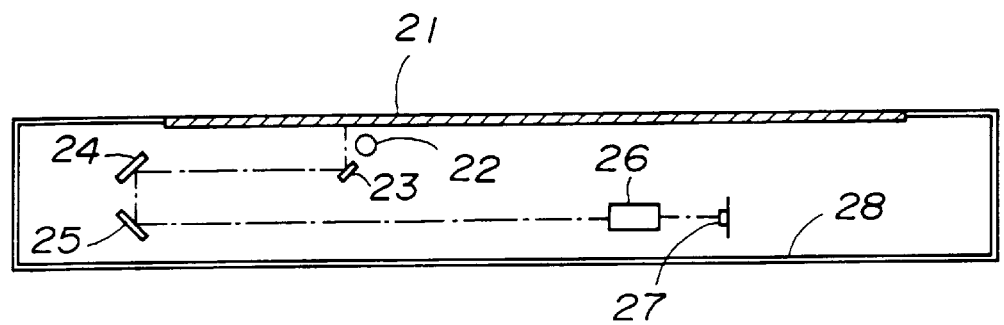
FIG. 9 shows an elevational sectional view of a general spatial configuration of an image reading apparatus in a second embodiment of the present invention.

FIG. 9 shows an elevational sectional view of a general configuration of an image reading apparatus in a second embodiment of the present invention. On the top of an enclosure 28, a contact glass 21 is provided, which contact glass 21 will have a paper sheet, on which an original image is provided (hereinafter, such an object as that paper sheet being referred to as an 'original image object'), placed thereon. The contact glass 21 is supported by the enclosure 28. The original image object is placed on the contact glass 21 in a position where the original image provided thereon faces the contact glass 21. An illumination light source 22 emits light onto the original image through the contact glass 21, and light reflected by the original image is projected onto the light reception surface of the light-to-electricity converting component of the light-to-electricity converting device 27 having the line of light-to-electricity components, through a first mirror 23, a second mirror 24, a third mirror 25 and an image forming lens 26. Thus the original image of the original image object is converted into an electric signal, which undergoes predetermined processing and is output from the image reading apparatus.

The illumination light source 22 and first mirror 23 are mounted on a first carriage (not shown in the figure) which moves, as a result of being driven by a driving device (not shown in the figure), in a condition where the distance from the contact glass 21 is fixed, for reading the original image one main scan line by one main scan line. The second mirror 24 and third mirror 25 are mounted on a second carriage (not shown in the figure) which moves similarly to the movement of the first carriage, but at a speed half the speed at which the first carriage moves. Thus, the original image on the contact glass 21 is scanned and is read one main scan line by one main scan line.

Figure 10:
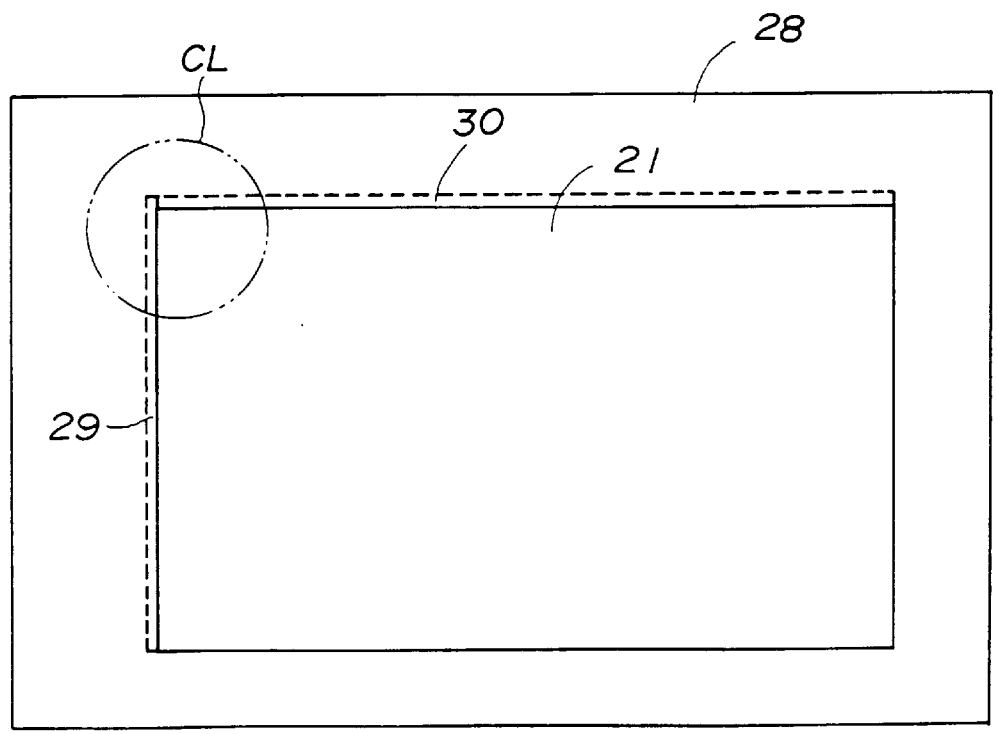
FIG. 10 shows a plan view of the general spatial configuration of the image reading apparatus in the second embodiment of the present invention.

FIG. 10 shows a plan view of the image reading apparatus shown in FIG. 9. As shown in the figure, the contact glass 21 is provided at the top of the enclosure 28. A reference tone plate 29 is provided at a side of the contact glass 21. The reference tone plate 29 is used for providing reference data which is read through the light-to-electricity converting unit, and then is used for shading correction, such as that mentioned above, which shading correction is performed in the image reading apparatus. Further, a measuring chart 30, having a measuring pattern provided thereon, such as that described above, being used for the read image data pixel position error measurement such as that described above performed in the image reading apparatus, is provided at a side of the contact glass 21. The reference tone plate 29 and measuring chart are provided in a manner such that they can be adequately read by the light-to-electricity converting device 27 which is provided inside the enclosure 28. Especially, because the measuring chart 30 is read through the light-to-electricity converting device 27 together with an original image object which may be placed on the middle of the contact glass 21, it is necessary that those images corresponding to the measuring chart as well as the original image object are adequately formed on the light-to-electricity element components. For this purpose, the measuring chart 30 is provided on the surface of the contact glass 21, which surface is the top surface thereof, and the original image object will also be placed thereon.

Figure 11:
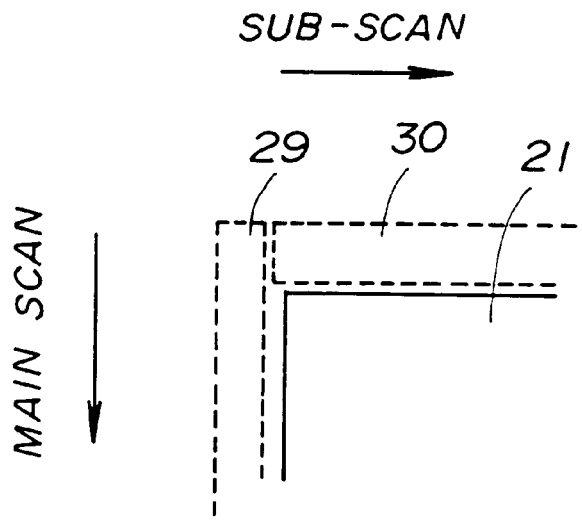
FIG. 11 shows a magnified view of a portion encircled by a circle CL in FIG. 10.

FIG. 11 shows magnified details of the portion shown in FIG. 10 and encircled by the circle CL. As shown in the figure, the reference tone plate 29 is extended so long in the direction reverse of the main scan direction that those pixels of the light-to-electricity converting component (such as the line CCD as mentioned above, extending in the main scan direction throughout the contact glass 21) which are used for reading the measuring chart can also be used for reading the reference tone plate 29. Thereby, the shading correction can be performed also on the image data obtained from the measuring chart 30.

Figure 12:
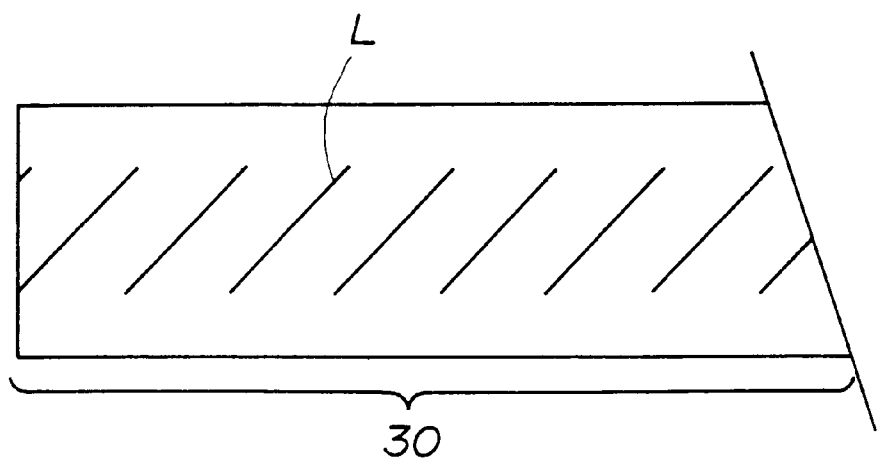
FIG. 12 shows a magnified view of a portion of a measuring pattern shown in FIG. 10.

FIG. 12 shows a partial magnified bottom view of the measuring chart 30. As shown in the figure, the measuring chart 30 has black oblique lines L and a white background. The pattern shown in FIG. 12 is similar to that described in the above descriptions of the first embodiment of the present invention. This measuring pattern is such that many oblique lines, in parallel to each other, are arranged in the sub-scan direction (horizontal direction in FIG. 12). A distance between each pair of adjacent oblique lines is even, and each oblique line is oblique by 45о from the sub-scan direction, as shown in the figure. In the second embodiment of the present invention, different from those shown in FIGS. 8A to 8D, the measuring chart 30 is provided at the side of the contact glass 21, and thus is read, simultaneously with the original image object being read, and used for the reading pixel position error measurement.

2.2 System Configuration

Figure 13:
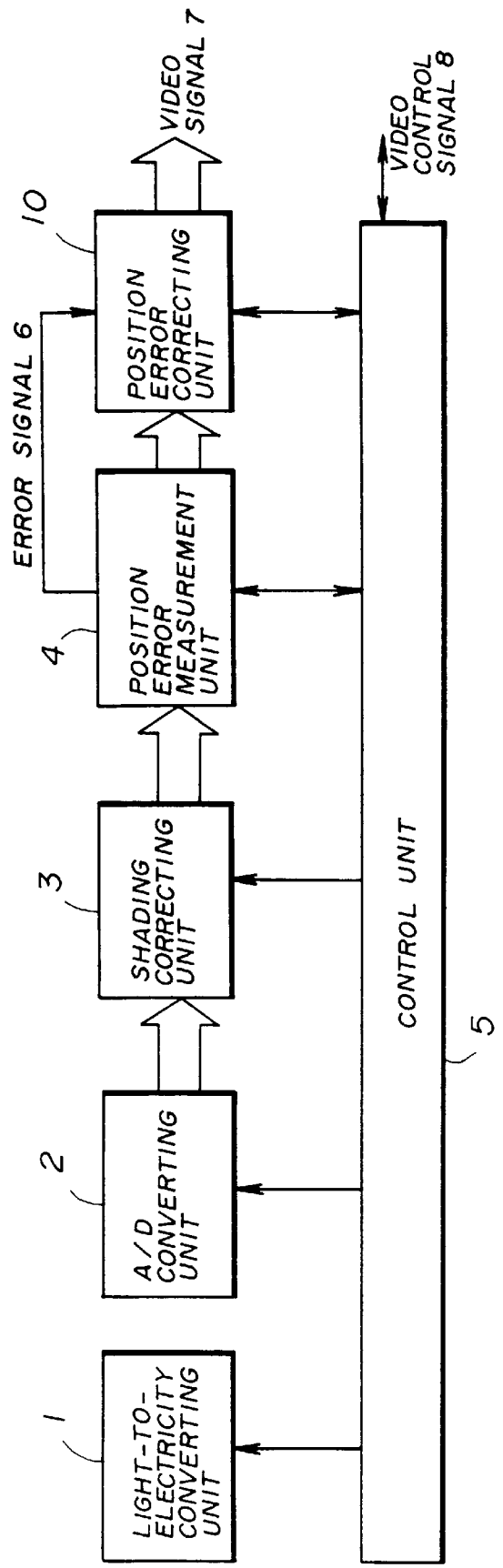
FIG. 13 shows a block diagram of a system configuration of the image reading apparatus in the second embodiment of the present invention.

FIG. 13 shows a block diagram of the system configuration of the image reading apparatus in the second embodiment of the present invention. The image reading apparatus in the second embodiment additionally includes a position error correcting unit in comparison to the system configuration of the first embodiment shown in FIG. 1. Also in this second embodiment, it is also possible that the system configuration shown in FIG. 3A, which is the variant embodiment of the first embodiment and was described above, is used instead of the system configuration shown in FIG. 13. In this case, the general-purpose computer 4A (such as the personal computer shown in FIG. 3B) is specifically configured by software (stored in an any information storage medium such as a floppy disk shown in FIG. 3B) executed thereby to carry out not only the above-mentioned reading pixel position error measurement but also the position error correction operation performed by the position error correcting unit 10 when using the system configuration shown in FIG. 13, which processing will be described later. In the second embodiment, the error signal 6 from the position error measurement unit 4 is provided to the position error correcting unit 10. In the system configuration of the second embodiment, image data, which has undergone shading correction through the shading correcting unit 3, is provided to the position error measurement unit 4. The position error measurement unit 4 measures reading pixel position errors, one main scan line by one main scan line, arranged in the sub-scan line direction. The reading pixel position errors are measured as errors between an erroneous main scan line of image data and adjacent main scan lines of image data. The thus-measured errors are, as the error signal 6, provided to the position error correcting unit 10. The position error correcting unit 10 receives the error signal 6 together with the image data (video signal) According to the error signal 6, the position error correcting unit 10 determines a predetermined number of main scan lines of image data which are used for performing reading pixel position error correction, and stores that number of main scan lines of image data in a memory included in the position error correcting unit 10. That number of main scan lines of image data include those train scan lines of image data which are adjacent to the erroneous main scan line of image data. Further, the position error correcting unit 10 also stores the error signals 6 which indicates the reading pixel position errors between the erroneous main scan line of image data and those adjacent main scan lines of image data. The position error correcting unit 10 uses the thus-stored data, and thus uses those adjacent main scan lines of image data and the error data indicated by that error signal. Thereby, the position error correcting unit calculates correct image data values of the erroneous main scan line of image data through an interpolation method using actually read image values. The video data, including the thus-corrected image data, is output from the position error correcting unit 10, one main scan line by one main scan line. After performing the reading pixel position error correction on that erroneous main scan line of image data, main scan lines of image data necessary for another erroneous main scan line of image data are then stored and the image data which has been used may thus be overwritten by the new image data in the above-mentioned memory. The above-mentioned operation is repeated for the main scan lines of image data, respectively, in the sub-scan direction. Thereby, the entirety of the page of the original image object is processed, and is output from the position error correcting unit 10. Each function block shown in FIG. 13 is controlled by the control unit 5 so that operation timings are controlled and operation conditions are set, appropriately. Thereby, those function blocks operate with an appropriate mutual operation relationship.

2.3 Position Error Measuring Process

The position error measuring process performed by the position error measurement unit 4 in the second embodiment is substantially identical to that of the position error measurement unit 4 in the first embodiment.

2.4 Read Image Data Position Deviation due to Reading Pixel Position Error

Figure 14:
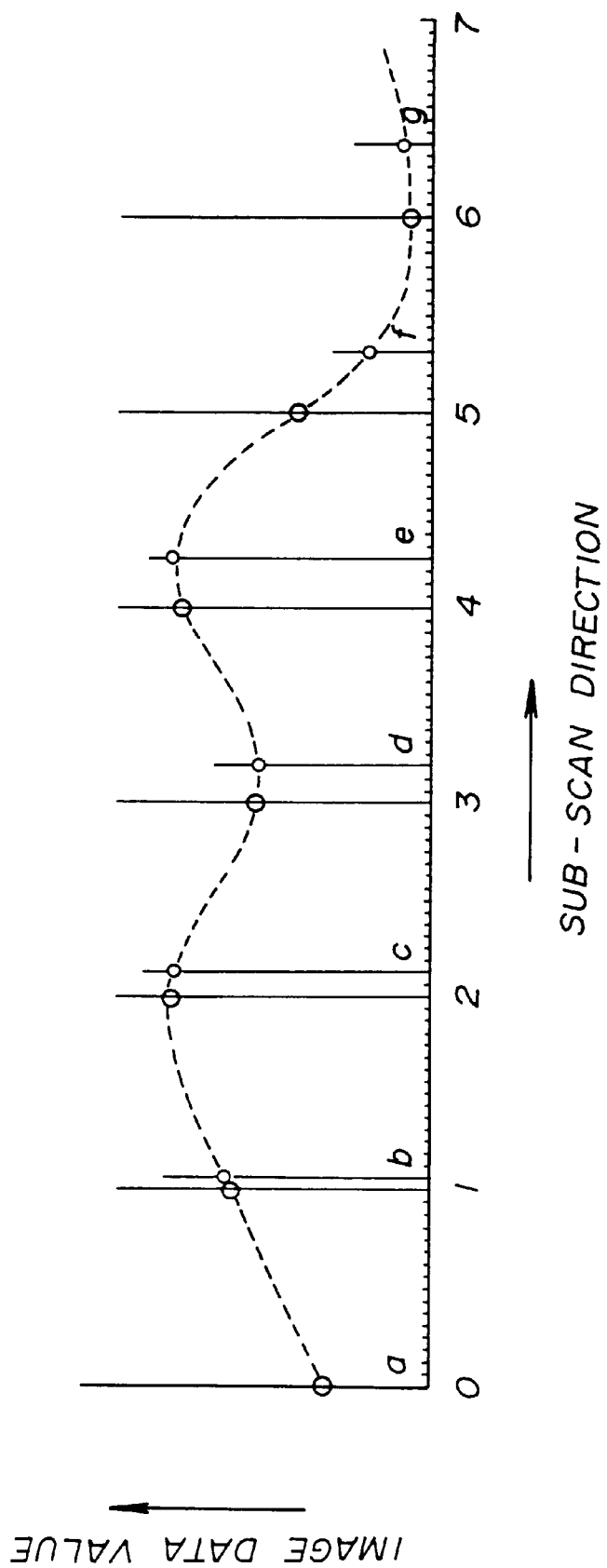
FIG. 14 illustrates a reading pixel position error correcting method in the second embodiment.

FIG. 14 illustrates the reading pixel position error correction operation. The vertical axis of the graph shown in FIG. 14 represents image data values of image data which underwent the shading correction by the shading correcting unit 3 shown in FIG. 13. The image data values are 8-bit digital values, and thus have decimal-system values of 0 to 255. The horizontal axis of this graph represents sub-scan direction position or main scan lines which are arranged in the sub-scan direction. Those positions along the horizontal axis, to which positive integers are allocated, represent main scan lines which correspond to line reading timing signals produced from dividing an oscillation frequency of a crystal oscillator included in the above-mentioned control unit 5. Because stability of the oscillation frequency from the crystal oscillator is very high, those positions to which the integers are allocated, represent correct positions of main scan lines. Further, the distance between each pair of adjacent positions of those positions corresponds to a distance between adjacent dots of 400 dpi which is the reading resolution of the image reading apparatus.

In order to reduce a required memory storage capacity to a minimum one, reading pixel position errors are corrected in a real-time manner in this example. Further, it is preferable that a circuit scale required for this operation be miniaturized and thus that cost reduction be performed. For those purposes, it is effective to simplify a calculation required for the reading pixel position error correcting operation. Therefore, a resolution of this operation is set to be $1/16$ dots. Thus, a memory is provided in which image data values can be stored for sub-scan direction positions (represented by the horizontal axis of the graph shown in FIG. 14) which are obtained as a result of dividing by 16 a space between each pair of adjacent positions to which integers are allocated.

The example shown in FIG. 14 is based on an assumption that, at the horizontal axis position of tot, the position defined by the control unit 5 is coincident with the position of the actually reading pixel position. There are various possible causes of reading pixel position errors. Among them, reading carriage (such as the above-mentioned first carriage) speed variation is a likely cause. The example shown in FIG. 14 is based on an assumption that the speed of the above-mentioned first carriage is $1/16$ faster, that is, approximately 6% faster, than a predetermined speed. In a case where the first carriage moves at the predetermined speed, a pixel at the position of '1' at the horizontal axis of FIG. 14 is read. However, because the first carriage moves faster than the predetermined speed, as mentioned above, actually, a pixel at a position 'b' ahead by $1/16$ dot from the position of '1' is actually read. In FIG. 14, image data values of pixels when those pixels are read at correct positions which are defined by the control unit 5 are represented by larger circles while image data values of pixels when those pixels are read at erroneous positions due to the above-mentioned first carriage speed error are represented by smaller circles. The reading pixel position error measurement is performed in a manner in which a read position at a preceding reading operation is used as a reference, and thereby a deviation of a read position at a current reading operation is measured, for each main scan line reading operation. Therefore, at the reading operation of the sub-scan line direction position '1', the value '$1/16$' (dot) is measured as a reading pixel position error. This error data is output from the position error measurement unit 4 shown in FIG. 13 together with the image data value of a currently read pixel, to the position error correcting unit 10. The above-described calculation of the center of gravity in the reading pixel position error measurement has an accuracy higher than the value $1/16$. However, in this example, the calculation result is rounded to have the resolution of $1/16$ in the position error correcting unit 10.

The first carriage speed is fixed to be one which is faster by $1/16$ than the predetermined speed. Thereby, a subsequent reading pixel position error, which is measured from a reading pixel position at the preceding reading operation as a reference, is the same '$1/16$'. However, the overall reading pixel position error at this time, when the sub-scan direction position '2' is used as a reference, is '$2/16$' because the reading pixel position error of '$1/16$' is already present in the preceding reading operation as mentioned above. The reading pixel position in the second reading operation is 'c' which is ahead by $2/16$ from the correct position '2' as shown in FIG. 14. Similarly, in the subsequent third reading operation, the overall reading pixel position error is '$3/16$' which is a difference between the correct position '3' and the actual erroneous position of 'd'. Similarly, subsequently, the pixels at the positions 'e', 'f', 'g', . . . are actually read, respectively. Thus, a position of each pixel actually read is defined by accumulating respective reading pixel position errors, the error in each main scan line reading operation being '$1/16$' as mentioned above. The thus actually read pixel image data values are stored at addresses corresponding to the actually read positions in the resolution of $1/16$, respectively, in the above-mentioned memory. Those actually read pixel image data values are represented by the small circles at those positions, 'a', 'b', 'c', 'd', 'e', 'f' and 'g', shown in FIG. 14.

2.5 Read Pixel Image Data Correction

From those stored actually read pixel image values, which include reading pixel position errors, the correct pixel image values, which are represented by the larger circles at the positions, '0', '1', '2', '3', '4', '5', '6' and '7', are estimated (calculated) by performing an interpolation operation. For example, when the correct image data at the position '2' is estimated, 'a cubic function convolution method' may be applied using the two preceding read pixel image data values at the positions of 'a' and 'b', and also the two subsequent read pixel image data values at the positions of 'c' and 'd'. (With regard to the cubic function convolution method, see U.S. Pat. No. 4,827,433 of Kouich Kamon, column 5, lines 11–30, for example.) According to this method, each of the correct pixel image data values is estimated using the two preceding read pixel image data values and also the two subsequent read pixel image data values. The interpolation method to be used in the read pixel data correction is not limited to the cubic function convolution method. Other various interpolations can be used for this purpose. Furthermore, the number of read pixel image data values to be used for the interpolation operation can be changed appropriately.

2.6 Others

In this second embodiment, the reading pixel position error measuring means, which is used in the first embodiment, is used. However, the reading pixel position error measuring means to be used in the second embodiment is not limited thereto. Another means, such as that described above in the Description of the Related Art, can also be used for this purpose. Further, in a case where the image reading apparatus is an image reading apparatus in which the cause of reading pixel position errors is specified to be undesirable variation of a reading carriage (such as the above-mentioned first carriage) moving speed, such as that mentioned above, reading pixel position errors can be obtained from using a linear encoder or the like to be provided to the reading carriage for measuring a moving speed and/or a position of the reading carriage. Thereby, such undesirable variation of the reading carriage moving speed can be obtained, which variation represents reading pixel position error in this case. Alternatively, it is also possible to provide an acceleration pickup to the reading carriage, and use an acceleration output therefrom for measuring a moving speed and/or a position of the reading carriage. Thereby, such undesirable variation of the reading carriage moving speed can be obtained, which variation represents reading pixel position error in this case. Further, in a case where the image reading apparatus is an image reading apparatus wherein optical components for reading an original image are fixed and instead an original image object is moved for reading the original image, one main scan line by one main scan line, in the sub-scan direction, and two rollers are provided for having the original image object therebetween and thus driving the original image object, a rotary encoder or the like is provided to a driving axis of one of the two rollers. Thereby, a moving speed and/or a position of the original image object can be measured. Thereby, a moving speed and/or a position of the reading optical components, relative to the original image, can be obtained, and thus reading pixel position errors can be obtained.

In the descriptions of the second embodiment of the present invention, the read pixel image data correction is performed in real time using the memory (buffer memory). Alternatively, It is also possible to use a page memory and store a page of read pixel image data values of an original image and reading pixel position error data. Then, a similar operation is performed on the thus-stored values/data, and thus corrected image data values are output. Further, it is possible to configure the image reading apparatus so that the apparatus can output obtained reading pixel position error data which may be used for operation maintenance and/or default diagnosis of the apparatus.

3. Third Embodiment 3.1 Apparatus Configuration, and So Forth

An image reading apparatus in a third embodiment of the present invention has a general mechanical configuration, a system configuration, a position error measuring system and a read pixel error correcting system which are equivalent to those described above for the second embodiment in items 2.1, 2.2, 2.3, 2.4 and 2.5. Therefore, descriptions thereof will be omitted.

3.2 Measuring Pattern

The measuring pattern 30P which is the pattern provided on the measuring chart 30, described in the above-mentioned item 2.1, shown in FIG. 12, is used for example. In this example, the measuring pattern 30P is provided to extend in the sub-scan direction.

3.2.1 Scale Ruler of General Copying Machine

Figure 15:
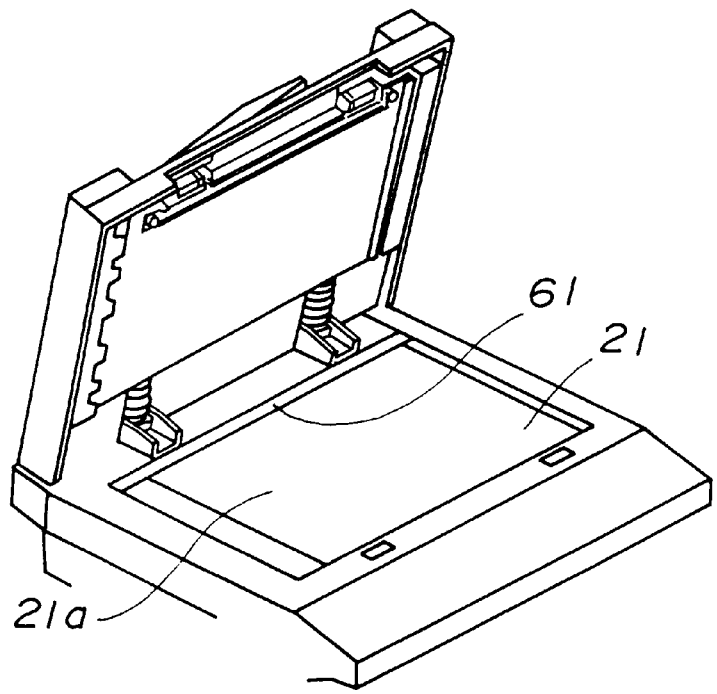
FIG. 15 shows a perspective view of an image reading apparatus in a third embodiment of the present invention.

In a general copying machine, which is one example of the image reading apparatus according to the present invention, a scale ruler 61 is provided at a side of the contact glass 21, as shown in FIG. 15. The scale ruler 61 extends in the sub-scan direction, and is used for a user to determine a position at which an original paper sheet (original image object) 21a is placed on the contact glass 21. The measuring pattern 30P is provided beneath the scale ruler 61.

3.2.1.1 First Method of Providing Measuring Pattern

Figure 16:
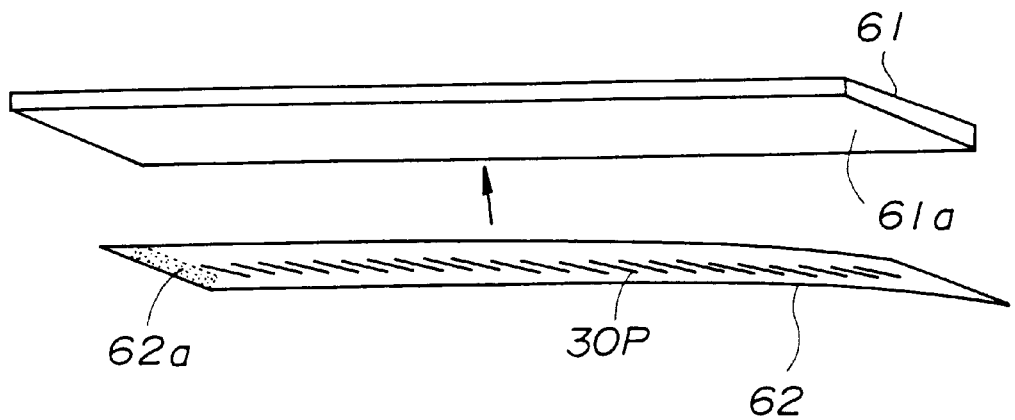
FIGS. 16, 17, 18, 19, 20, 21 and 22 show various examples of a measuring pattern, which are used in the third embodiment, respectively.

A first method, as an example, of providing the measuring pattern 30P will now be described. In this example, the measuring pattern 30P such as an even-pitch oblique line pattern such as that shown in FIG. 12 is used. As shown in FIG. 16, a sheet member 62 is used for providing the measuring pattern 30P thereon. The measuring pattern 30P such as the even-pitch oblique line pattern is provided on a surface of the sheet member 62. The even-pitch oblique line pattern is such that each line of a plurality of in-parallel and even-pitch arranged lines is oblique to the main scan direction and also oblique to the sub-scan direction after being provided to the image reading apparatus. This pattern includes a white background and those plurality of black oblique lines as shown in FIG. 16. Only one end region in a longitudinal direction, such as an end region (dotted area) 62a shown in FIG. 16, of the sheet member 62 is adhered or fixed using another method directly onto the top surface 21*a* of the contact glass 21, on which surface an original image object is directly placed, or onto the bottom surface 61*a* of the scale ruler 61, which surface comes into contact with the contact glass 21. The scale ruler 61 is fixed to the image reading apparatus and thus the measuring pattern comes into contact with the top surface 21*a* of the contact glass 21. The scale ruler 61 is also used for pressing down and holding the contact glass 21 onto the image reading apparatus. The region of the sheet member 62 other than the end region 62*a* comes into contact with the contact glass 21 as a result of being pressed down by the scale ruler 61. Thereby, the measuring pattern such as the even-pitch oblique line pattern of the sheet member 62 is placed in parallel with the top surface 21*a* of the contact glass 21, and at the side area of the contact glass 21 beneath the scale ruler 61.

Figure 17:
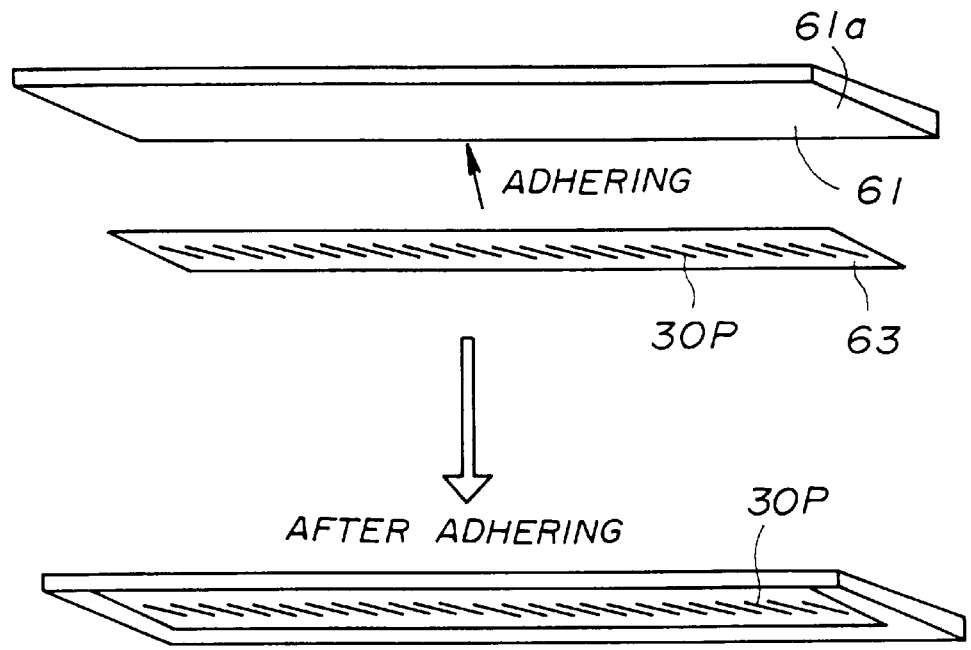

By such an arrangement, because only the end region 62*a* of the sheet member 62 is fixed onto the contact glass or the scale ruler 61, it is possible A that the other region of the sheet member 62 can lie on the top surface 21*a* of the contact glass 21 and thus have a shape identical to the shape of the top surface 21*a* (which can be treated as a plane surface) of the contact glass 21. Thereby, it is possible to cause the sheet member 62 to be shaped to be an identical plane surface. Thereby, even if a flexible material such as a paper sheet is used as the sheet member 62, the surface of the sheet member 62 can be prevented from becoming uneven, rugged or partially bent. Thus, it is possible to perform a high-accuracy, wide-frequency-range reading pixel position error measurement, and thereby to perform high-accuracy pixel image data correction. As a result, it is possible to obtain an image having less distortion due to pixel position errors. When the measuring pattern such as the even-pitch oblique line pattern provided on the sheet member 62 is degraded as a result of being used for a long time, only the sheet member 62 is replaced with a new one. Thus, measuring-pattern renewal can be simply performed. 3.2.1.2 Second Method of Providing Measuring Pattern A second method, as an example, of providing the measuring pattern 30P will now be described. In this example, an even-pitch oblique line pattern such as that shown in FIG. 12 is used as the measuring pattern 30P. As shown in FIG. 17, a hard-material member 63 is used for providing the measuring pattern 30P thereon. The measuring pattern 30P such as the even-pitch oblique line pattern is provided on a surface of the hard-material member 63. The even-pitch oblique line pattern is such that each line of a plurality of in-parallel and even-pitch arranged lines is oblique to the main scan direction and also oblique to the sub-scan direction after being provided to the image reading apparatus. This pattern also includes a white background and those plurality of black oblique lines as shown in FIG. 17. The hard-material member 63 is adhered or fixed using another method onto the bottom surface 61*a* of the scale ruler 61, which surface comes into contact with the contact glass 21. Then, the scale ruler 61 is fixed to the image reading apparatus and thus the measuring pattern, provided on the bottom surface of the hard-material member 63, comes into contact with the top surface 21*a* of the contact glass 21. The scale ruler 61 is also used for pressing down and holding the contact glass 21 onto the image reading apparatus. Thereby, the measuring pattern such as the even-pitch oblique line pattern of the hard-material member 63 is placed in parallel with the top surface 21*a* of the contact glass 21, and at the side area of the contact glass 21 beneath the scale ruler 61.

By such an arrangement, because the measuring pattern 30P is provided on the hard-material member 63, it is possible to prevent the surface of the hard-material member 63 on which the measuring pattern such as the even-pitch oblique line pattern is provided from becoming uneven, rugged or partially bent, when the hard-material member 63 is fixed onto the scale ruler 61. Thereby, the advantages the same as those of the first method described in the above-mentioned item 3.2.1.1 can be provided.

3.2.1.3 Third Method of Providing Measuring Pattern

Figure 18:
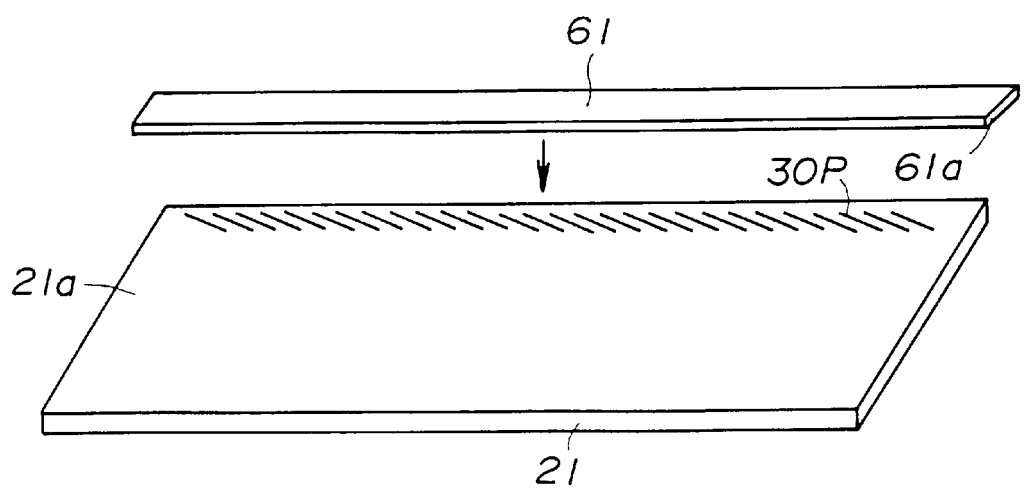

A third method, as an example, of providing the measuring pattern 30P will now be described. In this example, a measuring pattern such as an even-pitch oblique line pattern such as that shown in FIG. 12 is used as the measuring pattern 30P. As shown in FIG. 18, the measuring pattern such as the even-pitch oblique line pattern is directly provided (through printing or the like) on the top surface 21*a* of the contact glass 21 at the side area. Further, the bottom surface 61*a* of the scale ruler 61, which surface is pressed onto the thus-provided measuring pattern on the contact glass 21, is coated to be white, and, thus, the thus-provided white surface of the bottom surface 61*a* of the scale ruler 61 acts as a white background of the above-mentioned measuring pattern such as the even-pitch oblique line pattern after the scale ruler 61 has been fixed to the image reading apparatus. Thus, the white surface of the bottom surface 61*a* of the scale ruler 61 comes into contact with the above-mentioned side area of the contact glass 21, in which area the measuring pattern is provided. The measuring pattern 30P directly provided on the contact glass 21 is combined with the white surface of the scale ruler 61. The above-mentioned even-pitch oblique line pattern is such that each line of a plurality of in-parallel and even-pitch arranged lines is oblique to the main scan direction and also oblique to the sub-scan direction after being provided to the image reading apparatus. Thereby, the measuring pattern such as the even-pitch oblique line pattern is placed in parallel with the top surface 21*a* of the contact glass 21, and at the side area of the contact glass 21 beneath the scale ruler 61.

By such an arrangement, because the measuring pattern such as the even-pitch oblique line pattern is directly provided on the contact glass, focusing to the measuring pattern through optical components of the image reading apparatus can be precisely performed. Thereby, it is possible for the image reading apparatus to read the measuring pattern with a high accuracy. As a result, it is possible to perform the reading pixel position error measurement with a high accuracy. When the measuring pattern provided on the contact glass 21 or the white surface 61*a* of the scale ruler 61 is degraded due to staining, being worn off or the like, necessary one of the contact glass 21 and the scale ruler 61 is renewed.

3.2.1.4 Fourth Method of Providing Measuring Pattern

Figure 19:
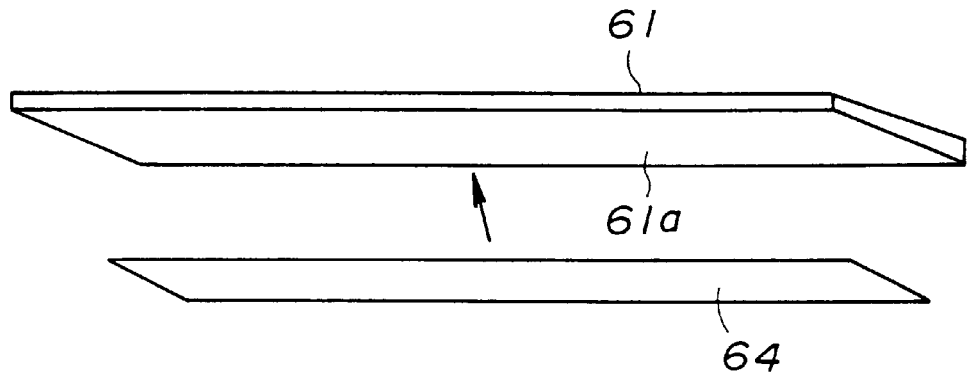

A fourth method, as an example, of providing the measuring pattern 30P will now be described. In this example, a measuring pattern such as an even-pitch oblique line pattern such as that shown in FIG. 12 is used as the measuring pattern 30P. The same as in the third method shown in FIG. 18, the measuring pattern 30P such as the even-pitch oblique line pattern is provided on the top surface 21*a* of the contact glass 21 at the side area. Further, the bottom surface 61*a* of the scale ruler 61, which surface is pressed onto the thus-provided measuring pattern on the contact glass 21, has a white member 64 adhered thereonto, as shown in FIG. 19, and, thus, a white surface of the thus-provided white member 64 on the bottom surface 61*a* of the scale ruler 61 acts as a white background of the above-mentioned measuring pattern such as the even-pitch oblique line pattern after the scale ruler 61 has been fixed to the image reading apparatus. Thus, the white surface of the white member 64 of the scale ruler 61 comes into contact with the above-mentioned side area of the contact glass 21, in which area the measuring pattern is provided. The measuring pattern directly provided on the contact glass 21 is combined with the white surface of the scale ruler 61. The above-mentioned even-pitch oblique line pattern is such that each line of a plurality of in-parallel and even-pitch arranged lines is oblique to the main scan direction and also oblique to the sub-scan direction after being provided to the image reading apparatus. Thereby, the measuring pattern such as the even-pitch oblique line pattern is placed in parallel with the top surface 21a of the contact glass 21, and at the side area of the contact glass 21 beneath the scale ruler 61.

By such an arrangement, because the measuring pattern such as the even-pitch oblique line pattern is directly provided on the contact glass, focusing on the measuring pattern through optical components of the image reading apparatus can be precisely performed. Thereby, it is possible for the image reading apparatus to read the measuring pattern with a high accuracy. As a result, it is possible to perform the reading pixel position error measurement with a high accuracy. When the measuring pattern provided on the contact glass 21 is degraded due to staining, being worn off or the like, the contact glass 21 is renewed. However, when the white surface of the white member 64 on the scale ruler 61 is degraded due to staining, being worn off or the like, only the white member 64 needs to be renewed. When fixing a new one of the white member 64 to the scale ruler 61, it is not necessary to perform the fixing operation with a high accuracy. Therefore, the renewal operation can be easily performed.

3.2.1.5 Fifth Method of Providing Measuring Pattern

Figure 20:
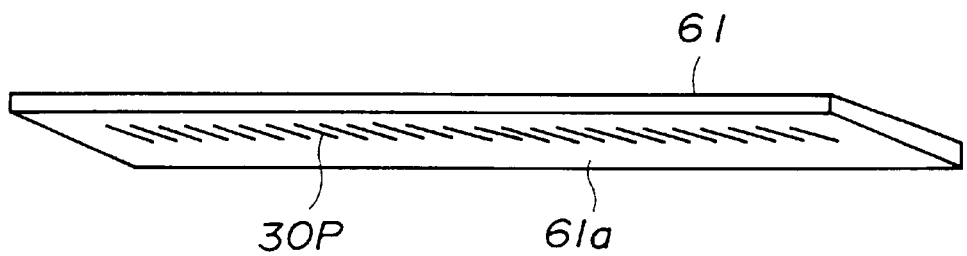

A fifth method, as an example, of providing the measuring pattern 30P will now be described. In this example, a measuring pattern such as an even-pitch oblique line pattern such as that shown in FIG. 12, is used as the measuring pattern 30P. As shown in FIG. 20, the measuring pattern such as the even-pitch oblique line pattern of the measuring pattern 30P is provided directly (through printing or the like) on the bottom surface 61a of the scale ruler 61. The bottom surface 61a of the scale ruler 61 is thus used for providing the measuring pattern 30P thereon. The even-pitch oblique line pattern is such that each line of a plurality of in-parallel and even-pitch arranged lines is oblique to the main scan direction and also oblique to the sub-scan direction after being provided to the image reading apparatus. This pattern includes a white background and those plurality of black oblique lines as shown in FIG. 20. The scale ruler 61 is fixed to the image reading apparatus and thus the measuring pattern comes into contact with the top surface 21a of the contact glass 21. The scale ruler 61 is also used for pressing down and holding the contact glass 21 onto the image reading apparatus. Thereby, the measuring pattern such as the even-pitch oblique line pattern of the scale ruler 61 is placed in parallel with the top surface 21a of the contact glass 21, and at the side area of the contact glass 21 beneath the scale ruler 61.

In such an arrangement, by providing the measuring pattern 30P on the bottom surface 61a of the scale ruler 61 with high-accuracy positioning, it is possible to provide a high-accuracy measuring pattern 30P. Thus, it is possible to perform a high-accuracy, wide-frequency-range reading pixel position error measurement, and thereby to perform high-accuracy pixel image data correction. As a result, it is possible to obtain an image having less distortion due to reading pixel position errors. Further, because the measuring pattern 30P is formed integrally with the scale ruler 61, when the measuring pattern is degraded due to staining, being worn off or the like, the scale ruler 61 is renewed. Thus, renewal of the measuring pattern can be easily performed.

3.2.1.6 Sixth Method of Providing Measuring Pattern

A sixth method, as an example, of providing the measuring pattern 30P will now be described. In this example, a measuring pattern such as an even-pitch oblique line pattern such as that shown in FIG. 12 is used as the measuring pattern 30P. The same as in the third method shown in FIG. 18, the measuring pattern 30P such as the even-pitch oblique line pattern is directly provided on the top surface 21a of the contact glass 21. In this example, it is not necessary to provided the pattern 30P beneath the scale ruler 61. Then, a white paint is coated on the contact glass 21 at the area at which the pattern 30P has been provided so as to cover the pattern 30P. Thus, the thus-coated white paint acts as a white band and thus acts as a white background of the measuring pattern 30P provided on the contact glass 21 beneath the white band. The measuring pattern 30P directly provided on the contact glass 21 is combined with the white paint coated thereon. The above-mentioned even-pitch oblique line pattern is such that each line of a plurality of in-parallel and even-pitch arranged lines is oblique to the main scan direction and also oblique to the sub-scan direction after being provided to the image reading apparatus.

3.2.1.7 Seventh Method of Providing Measuring Pattern

Figure 21:
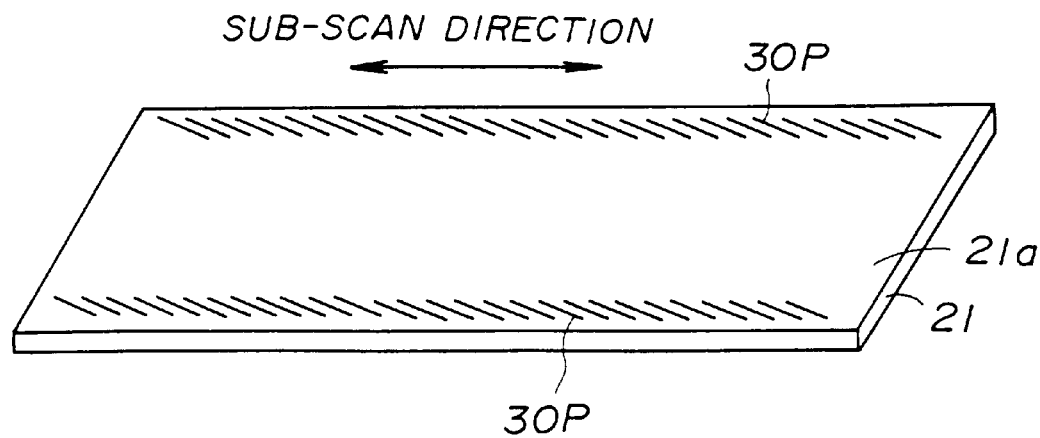

A seventh method, as an example, of providing the measuring pattern 30P will now be described. In this example, a measuring pattern such as an even-pitch oblique line pattern such as that shown in FIG. 12 is used as the measuring pattern 30P. Similar to the third method described above with reference to FIG. 18, the measuring pattern 30P such as the even-pitch oblique line pattern is directly provided (through printing or the like) on the top surface 21a of the contact glass 21. However, two of the measuring patterns 30P are provided at the two side areas on the contact glass 21, as shown in FIG. 21. All of the oblique lines of the two measuring patterns 30P are in parallel with each other, as shown in FIG. 21. As a result, when the contact glass 21 is rotated by 180°, the two measuring patterns 30P are coincident. Further, the bottom surface 61a of the scale ruler 61, which surface is pressed onto one of the measuring patterns 30P on the contact glass 21, is coated to be white, and, thus, the thus-provided white surface of the bottom surface 61a of the scale ruler 61 acts as a white background of the above-mentioned measuring pattern 30P after the scale ruler 61 has been appropriately fixed to the image reading apparatus. Thus, the white surface of the bottom surface 61a of the scale ruler 61 comes into contact with one of the above-mentioned side areas of the contact glass 21, in which area the above-mentioned measuring pattern 30P is provided. That measuring pattern 30P directly provided on the contact glass 21 is combined with the white surface of the scale ruler 61. The above-mentioned even-pitch oblique line pattern is such that each line of a plurality of in-parallel and even-pitch arranged lines is oblique to the main scan direction and also oblique to the sub-scan direction after being provided to the image reading apparatus. Thereby, the measuring pattern such as the even-pitch oblique line pattern is placed in parallel with the top surface 21a of the contact glass 21, and at the side area of the contact glass 21 beneath the scale ruler 61.

By such an arrangement, when that measuring pattern 30P provided on the contact glass 21 is degraded due to staining, being worn off or the like, as a result of the bottom surface 61a of the scale ruler 61 being rubbing against the measuring pattern 30P, the contact glass 21 is rotated by 180°, and thus the other measuring pattern 30P is then used similarly together with the white coated bottom surface 61a of the scale ruler 61, instead of measuring pattern 30p which was being used.

In each of the first to seventh methods described above, it is preferable that a protective coating be provided on the measuring pattern 30P. Thereby, it is possible to prevent the pattern 30P from being degraded due to the contact glass 21 and the scale ruler 61 rubbing against one another. Thereby, it is possible to elongate a renewal cycle of the measuring pattern 30P.

3.2.1.8 Eighth Method of Providing Measuring Pattern

Figure 22:
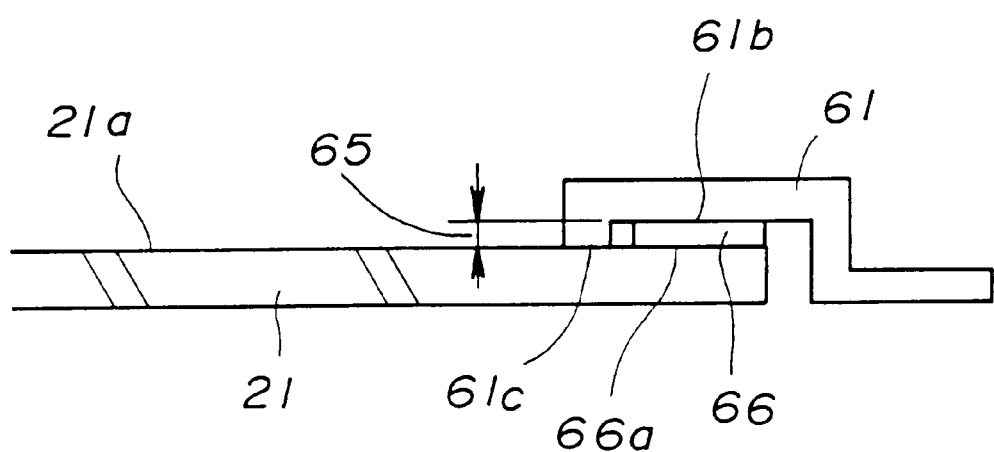

An eighth method, as an example, of providing the measuring pattern 30P will now be described. In this example, a spatial arrangement of the contact glass 21 and scale ruler 61 is considered. As shown in FIG. 22, the scale ruler 61 presses a member 66 onto the top surface 21a of the contact glass 21 where the scale ruler 61 is appropriately fixed onto the image reading apparatus. The member 66 can be any one of the sheet member 62 shown in FIG. 16, the hard-material member 63 shown in FIG. 17 and the white member 64 shown in FIG. 19. As shown in FIG. 22, a step 65 is provided on the bottom surface of the scale ruler 61 between a middle portion 61b and an edge portion 61c. The middle portion 61b presses the member 66 onto the contact glass 21 while the edge portion 61c directly comes into contact with the contact glass 21. The height of the step 65 is equal to the thickness of the member 66 so that the edge portion 61c of the scale ruler 61 surely comes into contact with the top surface 21a of the contact glass 21 while the middle portion 61b of the scale ruler 61 surely presses the member 66 onto the top surface 21a of the contact glass 21.

By this arrangement, it is possible to prevent a gap from being created between the extending edge of the bottom surface 61a of the scale ruler 61 and the top surface 21a of the contact glass 21. If such a gap is present, an original image object (such as a paper sheet) may be inserted, by accident, into the gap when being set on the contact glass 21. If the original image object is inserted into the gap, the original image object may be torn when the set object is rapidly removed.

The member 66 shown in FIG. 22 may also be the measuring pattern 30P itself. Although the thickness of the pattern itself is very small in a case where the pattern 30P is formed by printing, it may be effective to provide the above-mentioned step 65 for prevent a gap from being created between the extending edge of the bottom surface 61a of the scale ruler 61 and the top surface 21a of the contact glass 21.

4. Fourth Embodiment

A measurement principle of an image reading apparatus in a fourth embodiment of the present invention is the same as the measurement principle of the first embodiment described above in the item 1.1. Therefore, duplicated descriptions will be omitted.

4.1 System Configuration

Figure 23:
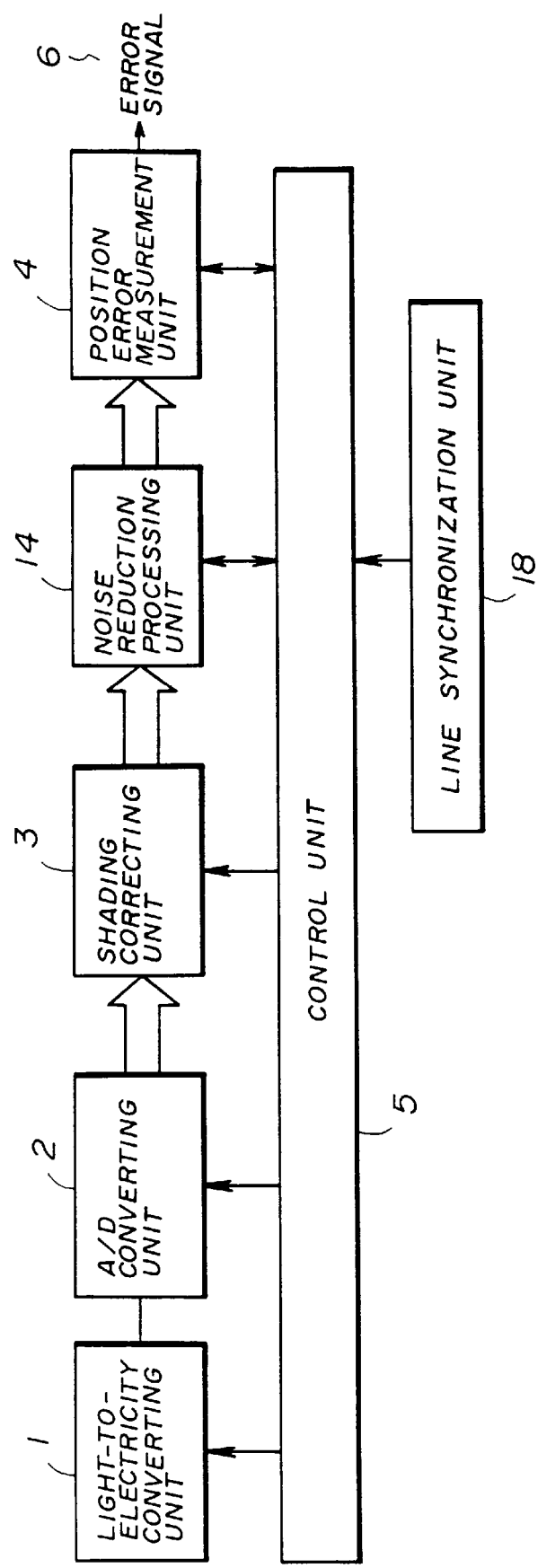
FIG. 23 shows a block diagram of a system configuration of an image reading apparatus in a fourth embodiment of the present invention.

FIG. 23 shows a block diagram of a basic system configuration of the image reading apparatus in the fourth embodiment of the present invention. This system configuration is substantially identical to the system configuration of the first embodiment shown in FIG. 2, except that a noise reduction processing unit 14 is inserted between the shading correcting unit 3 and the position error measurement unit 4, as shown in FIG. 23. A line synchronization signal is provided to the control unit 5 from a line synchronization unit 18. Thereby, the control unit 5 can determine timing at which each main scan line pixel reading operation is performed.

Because the configurations and functions of the light-to-electricity converting unit 1, A/D converting unit 2, shading correcting unit 3, position error measurement unit 4 and control unit 5 are substantially identical to those in the first embodiment shown in FIG. 1, descriptions thereof will be omitted. Image data, which underwent the shading correction by the shading correcting unit 3, is input to the noise reduction processing unit 14 which performs noise reduction processing on the image data and then provides thus-processed image data to the position error measurement unit 4. Each function block, including the noise reduction processing unit 14, shown in FIG. 23 is controlled by the control unit so that operation timings are controlled and operation conditions are set, appropriately. Thereby, those function blocks operate with an appropriate mutual operation relationship. Also in this fourth embodiment, it is also possible that the system configuration shown in FIG. 3A, which is the variant embodiment of the first embodiment and was described above, is used instead of the system configuration shown in FIG. 23. In this case, the general-purpose computer 4A (such as the personal computer shown in FIG. 3B) is specifically configured by software (stored in an any information storage medium such as a floppy disk shown in FIG. 3B) executed thereby to carry out not only the above-mentioned reading pixel position error measurement but also the noise reduction processing performed by the noise reduction processing unit 14 when using the system configuration shown in FIG. 23, which processing will be described later. However, there are many cases where the system configuration shown in FIG. 23 is advantageous if the reading pixel position error measurement is simply performed.

In the system configuration shown in FIG. 23, the image data which underwent the noise reduction processing by the noise reduction processing unit 14 is input to the position error measurement unit 4 which set a measuring window on bit-map-formation image data, calculates the center of gravity of the image data within the measuring window and thus measures reading pixel position errors, as described above. However, it is also possible that the image data which has not undergone the noise reduction processing is input to the position error measurement unit 4, then, after setting the measuring window as mentioned above, but prior to calculating the center of gravity as mentioned above, the noise reduction processing is performed on only the image data within the set measuring window. In this method, a similar effect of noise reduction can be obtained. In this case, it is also possible that not only the image data of pixels within the measuring window but also image data of pixels outside the measuring window is used for the noise reduction performed for the image data within the measuring window.

Figure 24:
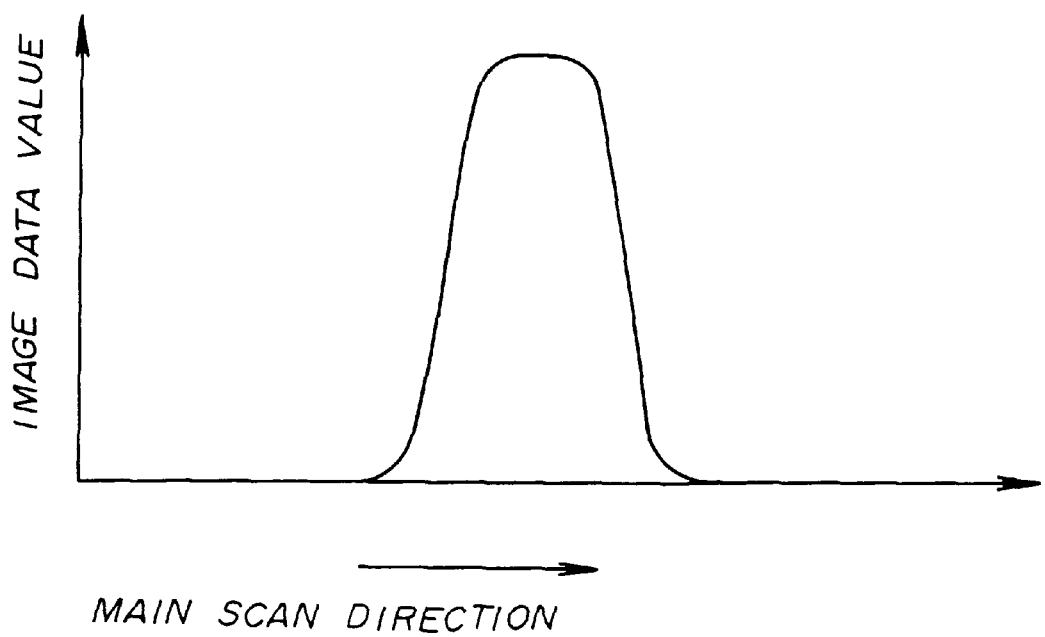
FIG. 24 shows characteristics of image data along a main scan line obtained from reading an oblique line image of a measuring pattern.

When a measuring pattern such as that shown in FIG. 5 of a plurality of parallel oblique lines is used for the reading pixel position error measurement, because the pattern includes sufficiently dark lines in the sufficiently light, white background, image data obtained from reading the pattern has a very simple structure. In fact, this image data can be represented by two-level (black and white) values, and each oblique line is represented by image data values of the black level for a predetermined line width. Therefore, when one main scan line of image data is extracted from the main scan lines of image data obtained from reading the pattern, the extracted image data is shown in FIG. 24. In a graph shown in FIG. 24, the horizontal axis represents main scan line addresses (or addresses in the main scan line direction) while the vertical axis represents image data values which are represented by 8-bit digital values, for example. By functions of MTF (Modulation Transfer Ratio) characteristics of a reading optical system in the image reading apparatus, high-frequency components of the read image data are removed. Thereby, a curve shown in FIG. 24 is obtained. With reference to FIG. 24, an image data value is higher for the read oblique line of the measuring pattern at a position closer to the center thereof, while an image data value is lower for the same read oblique line at a position closer to each of the two edges (left and right edges of the oblique line al. shown in FIG. 5, for example) thereof. (Although the oblique line $a_1$, shown in FIG. 5, for example, is indicated in the figure as a line having dots provided thereinside, each oblique line used in such a measuring pattern as that mentioned above is actually a black solid line, that is, the entire area inside of the line is completely black without any space.) For the entirety of an oblique line of the measuring pattern, the image data obtained from reading the oblique line is such that image data for respective main scan lines, each of which is such as that shown in FIG. 24, smoothly continues in the sub-scan direction along the longitudinal direction of the oblique line, in a condition where no noise is included in the image data. Such features of the image data obtained from reading the measuring pattern is used in the above-mentioned noise reduction processing performed by the noise reduction processing unit 14 for reducing noises which may be actually included in the image data.

4.2 General Spatial Configuration

A general spatial configuration of the image reading apparatus in the fourth embodiment is substantially identical to the general spatial configuration of the image reading apparatus in the second embodiment described above in the item 2.1 with reference to FIGS. 9, 10, 11 and 12. Thus, the general spatial configuration of the fourth embodiment is such as that shown in FIGS. 9, 10, 11 and 12. Therefore, descriptions thereof will be omitted.

4.3. Position Error Measuring Process

A position error measuring process performed by the position error measuring unit 4, calculation of the center of gravity of image data of pixels within a measuring window, a width of each oblique line of the measuring pattern, a relationship between shift of the portion of the oblique line image in the measuring window and sub-scan direction reading pixel position error, a position error measurement procedure, and standard measuring charts to be used for the position error measurement are substantially identical to the position error measuring process (1.3), calculation of the center of gravity of image data of pixels within a measuring window (1.4), relationship between shift of the portion of the oblique line image in the measuring window and sub-scan direction reading pixel position error (1.5), position error measurement procedure (1.6), and standard measuring charts to be used for the position error measurement (1.7) in the first embodiment, described above in those items 1.3, 1.4, 1.5, 1.6 and 1.7, with reference to FIGS. 4, 5, 6, 7, 8A, 8B, 8C and 8D. Therefore, descriptions thereof will be omitted.

5. Fifth Embodiment

An image reading apparatus in a fifth embodiment of the present invention will now be described. A configuration and a performance of the image reading apparatus in the fifth embodiment are substantially identical to those of the image reading apparatus in the fourth embodiment described above, except that the noise reduction processing unit 14 further performs processing which will now be described.

Figure 25:
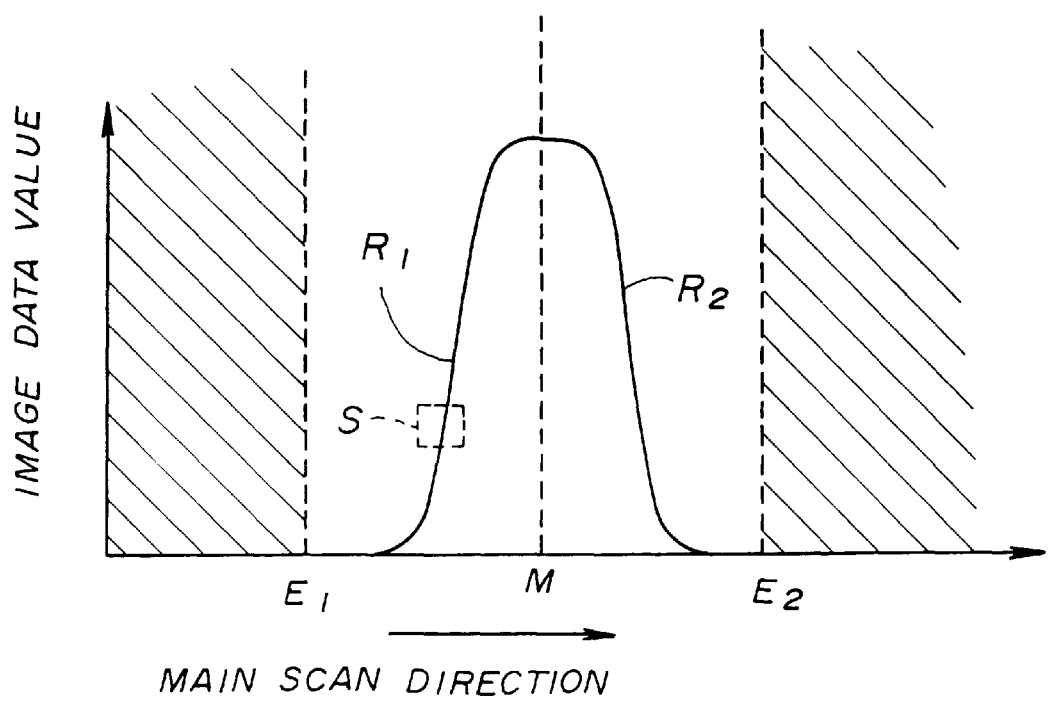
FIG. 25 illustrates a noise reduction processing operation in an image reading apparatus in a fifth embodiment of the present invention.

As described with reference to FIG. 24, in the image data of a main scan line obtained from reading an oblique line of the measuring pattern, an image data value simply increases in a position for an edge of the oblique line while an image data value simply decreases in a position for the other (opposite) edge of the oblique line. By using those features, the noise reduction processing unit 14 obtains a central position in the main scan direction in the image data such as that shown in FIG. 24 for the center of the oblique line. Then, image data values in positions in the main scan line direction apart by a predetermined distance from the thus-obtained central position are made to be '0'. For example, as show in FIG. 25, the central position M in the main scan direction is obtained, and, then, two positions $E_2$ and $E_1$. each being apart from the central position by the predetermined distance in the main scan direction and the direction reverse to the main scan direction, are obtained. Then, for the hatched regions shown in FIG. 25, which are outside the position $E_1$ and $E_2$, the image data values are made to be '0'. The central position may be obtained as a result of detecting the simple increase portion $R_1$ and the simple decrease portion $R_2$ of the curve of the image data, shown in FIG. 25. Those portions $R_1$ and $R_2$ may be detected by detecting the slopes of the curve in the main scan direction. The center of those portions $R_1$ and $R_2$ is the above-mentioned central position M. The above-mentioned predetermined distance can be determined to be a suitable value, from the line width of each oblique line of the measuring pattern and the MTF characteristics of the reading optical system.

By this processing, it is possible to make image data be '0', which image data is image data in positions where the image data should be '0' when the shading correction is correctly performed, the measuring pattern does not have any problem such as being stained or the like, and the image data processing system in the image reading apparatus does not have substantial noise factors. Thus, noises included in the image data can be effectively reduced. In particular, when the condition that the total of moments about a center of gravity is '0', as was described above in the item 1.4, is used for calculating the center of gravity, noise image data at positions apart farther from the center of gravity may act as larger factors for preventing the calculation of the center of gravity from being accurately performed. Therefore, by removing such noise image data by making the image data values be '0', as described above with reference to FIG. 25, noise factors for the reading pixel position error measurement can be effectively reduced.

In the fifth embodiment, noise image data is removed as a result of image data values being made to be '0'. However, alternatively, it is also possible to ignore image data for positions apart farther than the predetermined distance in the above-mentioned calculation of the center of gravity. Thereby, a similar effect can be obtained.

6. Sixth Embodiment

An image reading apparatus in a sixth embodiment of the present invention will now be described. A configuration and a performance of the image reading apparatus in the sixth embodiment are substantially identical to those of the image reading apparatus in the fourth embodiment described above, except that the noise reduction processing unit 14 further performs processing which will now be described.

In this embodiment, because it is predetermined that each oblique line of the measuring pattern is an oblique line which is oblique by 45° in the same direction as shown in FIGS. 5 and 6, image data of a plurality of pixels arranged in the longitudinal direction of each oblique line of the measuring pattern is averaged, and thus is smoothed, using a smoothing filter by the following matrix equation (2), for example:

$$Av = 1/3 \begin{pmatrix} 0 & 0 & 1 \\ 0 & 1 & 0 \\ 1 & 0 & 0 \end{pmatrix}. \quad (2)$$

This matrix is applied to each 3-by-3 pixel group of the pixels of a bit-map formation of read image data. Thereby, the image data of each three pixels arranged adjacent in the direction which is the same as the longitudinal direction of an oblique line image of the measuring pattern is averaged, and thus smoothed. A thus-calculated value is used as a new image data value of the central pixel of the 3-by-3 pixel group. Thereby, edge lines of the read oblique line image can be smoothed. The number of pixels in each of the horizontal and vertical directions of that matrix, such as three in the example of the above-mentioned equation (2), to be applied, can be arbitrarily determined to be more than 1. However, when too large a number is applied thereto, the spatial frequency band in the measurement may be undesirably narrowed. This is because, when the larger size of matrix is used as the filter, the image data is more averaged in the oblique line longitudinal direction, and, thereby, although noises may be reduced, the accuracy in the reading pixel position error measurement may be degraded. The number to be applied as the number of pixels in each of the horizontal and vertical directions of that matrix may be determined to be a suitable one, appropriately from properties of noises possibly included in image data and objects of the measurement. In a case where each oblique line of the measuring pattern is an oblique line which is oblique by 45° in the reverse direction, a matrix such as that mentioned above to be applied has '1' arranged in a diagonal direction corresponding to the longitudinal direction of the oblique line.

As such a smoothing filter for smoothing image data obtained from reading such a measuring pattern, a low-pass filter can also be used, instead of the above-described filter. Spatial frequency components included in image data obtained from reading oblique lines of the measuring pattern are those within a limited frequency band which is limited due to the MTF characteristics of the reading optical system in the image reading apparatus. Therefore, it can be determined that high-frequency components of frequencies higher than the limited frequency band correspond to noises. Therefore, it is effective to use a low-pass filter for removing such high-frequency components from the image data.

7. Seventh Embodiment

An image reading apparatus in a seventh embodiment of the present invention will now be described. A configuration and a performance of the image reading apparatus in the seventh embodiment are substantially identical to those of the image reading apparatus in the fourth embodiment described above, except that the noise reduction processing unit 14 further performs processing which will now be described.

Image data obtained from reading oblique lines of the above-described measuring pattern for each main scan line is such as that shown in FIG. 24, as described above. In such image data, an image data value simply increases in a position for an edge of the oblique line while an image data value simply decreases in a position for the other (opposite) edge of the oblique line, as described above for the sixth embodiment. Thus, the image data forms a projection as shown in the figure. The sub-scan direction width $B_R$ of the projection which starts at the simple increase and ends at the simple decrease, shown in FIG. 26, depends on the width of the read oblique line image, such as the horizontal width $B_L$ of the oblique line image $a_1$ shown in FIG. 5. Therefore, because the width such as the width $B_L$ of the read oblique line has a predetermined value, the width $B_R$ has a predetermined value. Using this feature, the noise reduction processing unit 14 detects, from such image data obtained from reading a oblique line of the measuring pattern for each main scan line, image data variation regions, each of which has a sub-scan direction width of a projection, starting at such a simple increase and ending at such a simple decrease, or a depression, starting at such a simple decrease and ending at such a simple increase, that the sub-scan direction width is shorter than the above-mentioned reference width $B_R$. Then, the image data values of each of those image data variation regions are converted into a value which is an average value of the image values of image data of pixels antecedent and subsequent to that region, or those image data values of that region are removed therefrom and then interpolated using those image values of image data of pixels antecedent and subsequent to that region. Thereby, image data of separate point images which form small projections or small depressions are removed from the image data obtained from reading the measuring pattern.

Figure 26:
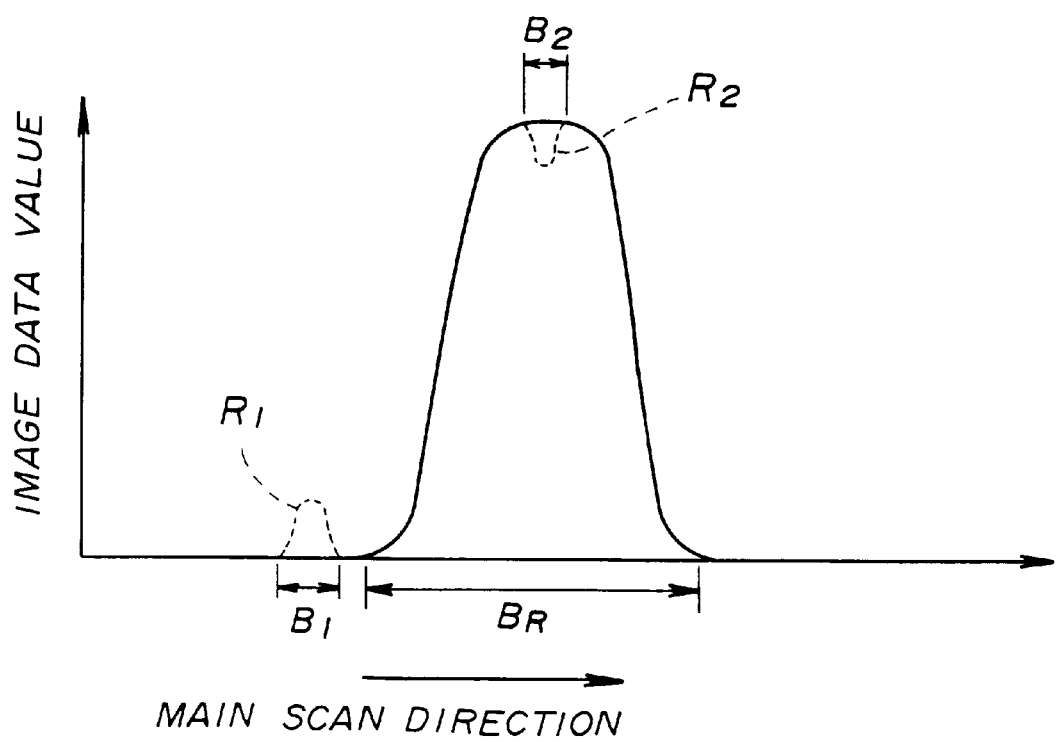
FIG. 26 illustrates a noise reduction processing operation in an image reading apparatus in a seventh embodiment of the present invention.

For example, when a black particle, forming a separate point image, is undesirably adhered in proximity of an edge of an oblique line image of the measuring pattern, a small projection such as $R_1$ may be formed in the resulting image data as shown in FIG. 26. Otherwise, when a white small particle, forming a separate point image, is undesirably adhered inside an oblique line image of the measuring pattern, a small depression such as $R_2$ may be formed in the resulting image data as shown in FIG. 26. Such image data variation regions, from those separate point images, may adversely affect the image data from the oblique line image, and thus may prevent the reading pixel position error measurement from being correctly performed. Those image data variation regions, each having the width $B_1$ or $B_2$ smaller than the reference width $B_R$, thereby can be removed by the noise reduction processing unit 14 in the seventh embodiment which performs the processing described above. Thereby, the above-mentioned problems can be eliminated. Further, when such a separate point image is located apart from an oblique line image, the image variation region from this separate point image can also be removed in the same processing performed by the noise reduction processing unit 14 in the seventh embodiment.

There may be a case where, although no foreign bodies such as black or white particles are adhered onto the measuring pattern, a region of obtained image data where an image value should simply increase has an image value which does not actually simply increase due to noises from the image reading apparatus. For example, in a case where the image reading apparatus has a capability that image tones are represented by 8-bit data, and a noise, having characteristics by which the noise cannot be represented by the 8-bit resolution, occurs, the noise may cause a tone variation to be reversed. In such a case, a region of obtained image data where an image value should simply increase may have an image value which does not actually simply increase. Such reversal of a tone variation may form a small-width irregular image data variation in an increasing or decreasing edge of the image data region obtained from an oblique line of the measuring pattern. Such a small-width irregular image data variation can also be detected by the same processing performed by the noise reduction unit 14 in the seventh embodiment, and thus such a noise can be effectively removed.

8. Eighth Embodiment

An image reading apparatus in an eighth embodiment of the present invention will now be described. A configuration and a performance of the image reading apparatus in the eighth embodiment are substantially identical to those of the image reading apparatus in the fourth embodiment described above, except that the noise reduction processing unit 14 further performs processing which will now be described.

There may be a case where a tone level of the background of the measuring pattern is high, that is, the background is rather dark, or a tone level of an oblique line of the measuring pattern is low, that is, the oblique line is rather light. In such a case, sufficient contrast cannot be obtained in image data obtained from that measuring pattern. Otherwise, there may be a case where sensitivity adjustment of the image reading apparatus has not been appropriately performed, and, thereby, sufficient contrast cannot be obtained in image data obtained from the measuring pattern. In those cases, an image data value magnitude of the image data such as that shown in FIG. 24 may not be sufficiently large. Thereby, the S/N (Signal to Noise) ratio may not be sufficiently high. Thereby, the reading pixel position error measurement may not be performed with a high accuracy. The noise reduction processing unit 14 in the eighth embodiment enlarges the contrast of obtained image data such as the image data shown in FIG. 24, thereby, the SIN ratio is improved.

Figure 27:
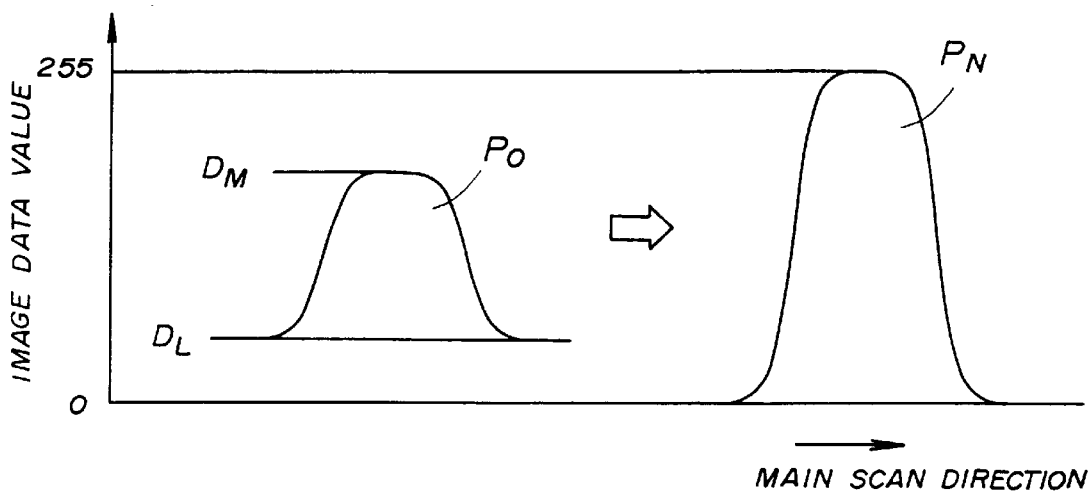
FIG. 27 illustrates a noise reduction processing operation in an image reading apparatus in an eighth embodiment of the present invention.

The contrast enlargement processing performed by the noise reduction processing unit 14 in the eighth embodiment uses the following equation (3):

$$D_N = 255(D-D_L)/(D_H-D_L) \quad (3),$$

where D represents the original image data value of each pixel, $D_N$ represents a new image data value of the pixel, $D_L$ is the image data value of a pixel which is sufficiently apart outside from an edge of an image data projection, such as an image data projection $P_O$ shown in FIG. 27, and $D_H$ is the image data value of a pixel which is the highest position of that image data projection. The value '255' is a value which is the largest decimal-system value of the values which can be represented by 8 bits. By this processing, an image data projection obtained from reading an oblique line of the measuring pattern is magnified in the image data value direction. Thus, as shown in FIG. 27, the original difference between the lowest image data level $D_L$ and the highest image data level $D_H$ of the image data variation of the projection $P_O$ for a main scan line is converted into the image data variation of the projection $P_N$ which has the lowest image data level of 0 and the highest image data level of 255.

In this processing, at the beginning of the reading pixel position error measurement, those $D_L$ and $D_H$ are obtained from image data of a first read portion of an oblique line of the measuring pattern. Then, the thus-obtained $D_L$ and $D_H$ are used for subsequently read portions of oblique lines of the measuring pattern. Thereby, it is possible to prevent undesirable errors from occurring due to a change in processing from a change of $D_L$ and $D_H$. Further, it is also possible to reduce a required overall processing time. In this example, a contrast is enlarged into the maximum contrast from 0 to 255. However, because $D_L$ and $D_H$ are first obtained and are used for subsequent processing as mentioned above, there may be a case where image data is undesirably clipped at 0 or 255 after performing the processing using the above-mentioned equation (3). In order to prevent such a situation, it is possible to use another equation by which a contrast is enlarged into a range which has a margin or margins to the maximum range from 0 to 255. However, when calculating the center of gravity in the reading pixel position error measurement as described above, a little amount of image data clipping may not substantially adversely affect the result of the measurement.

Alternatively, it is also possible that, first, all the oblique line images of the measuring pattern are read and stored in a memory, thus-stored image data being used for obtaining optimum values of $D_H$ and $D_L$ for effectively improving contrast of the image data. Further, it is also possible that the noise reduction processing unit 14 first performs the contrast improvement process described above, and then, at least one of the other noise reduction processing described above for the fourth, fifth, sixth and seventh embodiments is performed on the image data. Thereby, it is possible to further improve an accuracy of the reading pixel position error measurement.

9. Ninth Embodiment

An image reading apparatus in a ninth embodiment of the present invention will now be described. A configuration and a performance of the image reading apparatus in the ninth embodiment are substantially identical to those of the image reading apparatus in the fourth embodiment described above, except that the noise reduction processing unit 14 further performs processing which will now be described.

Figure 28:
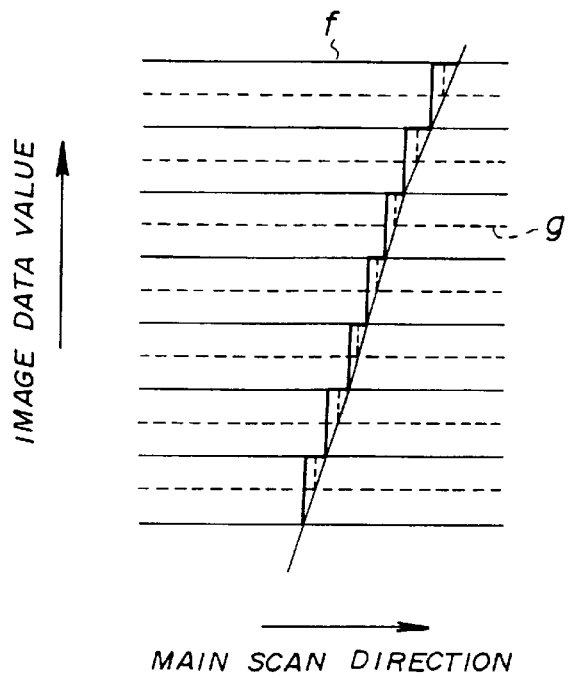
FIG. 28 illustrates a noise reduction processing operation in an image reading apparatus in a ninth embodiment of the present invention.

FIG. 28 shows an image-data-value simply increasing portion of image data for a main scan line obtained from reading a starting edge of an oblique line image of the measuring pattern. That is, FIG. 28 shows a magnified view of a portion, enclosed by a broken-line square S, of the image data shown in FIG. 25, for example. In FIG. 28, a solid step-shaped line indicates the image data when the image data is represented by 8-bit digital values, while a broken finer-step-shaped line indicates the image data when the image data is represented by 9-bit digital values, thus, with an increased resolution. Further, in FIG. 28, solid horizontal lines represent possible image tone levels of the 8-bit digital image data, while broken horizontal lines and the solid horizontal lines represent possible image tone levels of the 9-bit digital image data which are finer than those of the 8-bit digital image data.

Figure 29A:
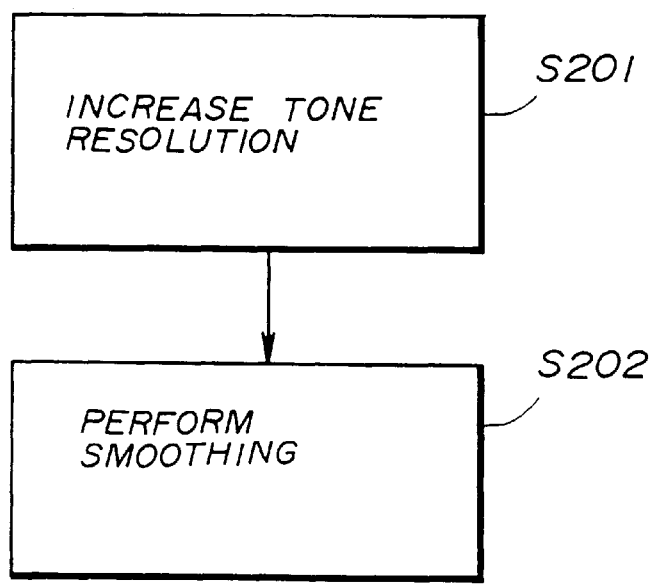
FIGS. 29A, 29B and 29C show operation flowcharts of operations performed by noise reduction units in the ninth, tenth and eleventh embodiments of the present invention.

FIG. 29A shows an operation performed by the noise reduction processing unit 14 in the ninth embodiment. In the ninth embodiment, the noise reduction processing unit 14 adds one bit of '0', as the LSB (Least Significant Bit), to 8-bit digital image data which is obtained from reading an oblique line image of the measuring pattern. Thus, the image data becomes 9-bit digital data. When 8-bit digital data is expressed by a decimal-system value, possible decimal-system values are from 0 to 255, while when 9-bit digital data is expressed by a decimal-system value, possible decimal-system values are from 0 to 511. Thus, the resolution can be improved by increasing the number of bits of the image data, in S201 of FIG. 29A. Then, after thus increasing the number of bits of the image data in S201, the smoothing processing which is described above in the sixth embodiment is performed on the thus-obtained image data, in S202.

Thereby, 9-bit digital image data, similar to the 9-bit digital image data indicated by the broken finer-step-shaped line shown in FIG. 28, which is obtained from digitizing image data from reading an oblique line image of the measuring pattern with the 9-bit digitizing resolution, can be obtained from the 8-bit digital image data indicated by the solid step-shaped line, which is obtained from digitizing image data from reading the same oblique line image with the 8-bit digitizing resolution. As a result, although the digitizing resolution is the lower 8-bit resolution, it is possible to effectively reduce quantization noises, light-to-electricity converting component noises, and other noises occurring when image reading, which inevitably occur in the case of using 8-bit resolution. Thereby, accuracy in the reading pixel position error measurement can be improved.

The increase of the number of bits of image data is not limited to the increase of 8 bits to 9 bits which is applied in this embodiment. It is also possible to further increase the number of bits of image data appropriately.

10. Tenth Embodiment

An image reading apparatus in a tenth embodiment of the present invention will now be described. A configuration and a performance of the image reading apparatus in the tenth embodiment are substantially identical to those of the image reading apparatus in the fourth embodiment described above, except that the noise reduction processing unit 14 further performs processing which will now be described.

Figure 29B:
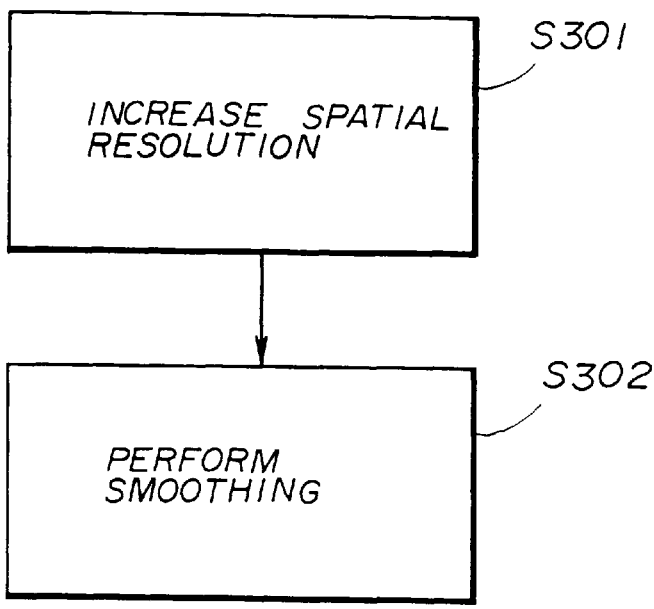

FIG. 29B shows an operation performed by the noise reduction processing unit 14 in the tenth embodiment. In the tenth embodiment, in S301 of FIG. 29B, the noise reduction processing unit 14 increases, that is, doubles in this embodiment, the spatial resolution of the given image data, from 400 dpi to 800 dpi, by adding pixels having image values the same as those of the predetermined adjacent pixels. Then, after thus increasing the spatial resolution of the image data in S301, the smoothing processing which is described above in the sixth embodiment is performed on the thus-obtained image data, in S302 . Thereby, it is possible to obtain image data which more precisely corresponds to the original image. As a result, it is possible to effectively reduce quantization noises, light-to-electricity converting component noises, and other noises occurring when image reading, which noises inevitably occur in the case of using 400 dpi spatial resolution. Thereby, accuracy in the reading pixel position error measurement can be improved.

The increase of the spatial resolution of image data is not limited to the increase from 400 dpi to 800 dpi which is applied in this embodiment. It is also possible to further increase the spatial resolution of the image data appropriately.

11. Eleventh Embodiment

An image reading apparatus in an eleventh embodiment of the present invention will now be described. A configuration and a performance of the image reading apparatus in the eleventh embodiment are substantially identical to those of the image reading apparatus in the fourth embodiment described above, except that the noise reduction processing unit 14 further performs processing which will now be described.

Figure 29C:
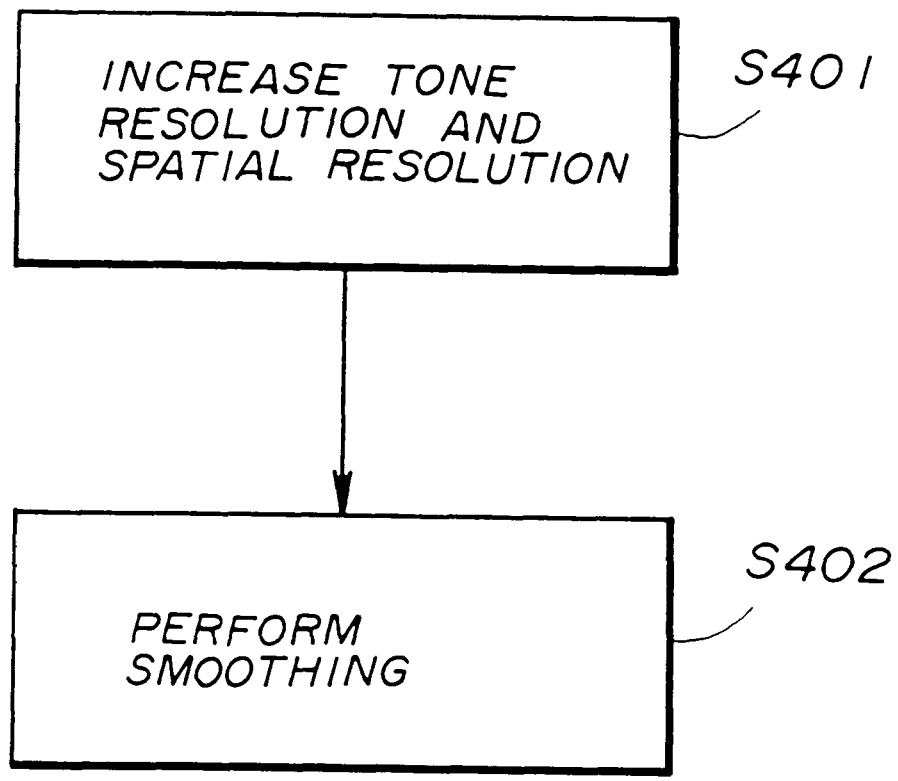

FIG. 29C shows an operation performed by the noise reduction processing unit 14 in the eleventh embodiment. In this embodiment, the noise reduction processing unit 14 performs on given image data both the increase of the number of bits (that is, the number of possible tone levels) of the given image data which is performed in the above-described ninth embodiment and increase of the spatial resolution of the given image data which is performed in the above-described tenth embodiment, in S401. Then, after thus increasing the number of possible tone levels and also increasing the spatial resolution of the given image data in S401, the smoothing processing which is described above in the sixth embodiment is performed on the thus-obtained image data, S402. Thereby, it is possible to obtain the image data which even more precisely corresponds to the original image. As a result, it is possible to effectively reduce quantization noises, light-to-electricity converting components noises, and other noises occurring when image reading, which noises inevitably occur in the case of using 8-bit tone-level resolution and 400-dpi spatial resolution. Thereby, accuracy in the reading pixel position error measurement can be further improved.

It is also possible to appropriately combine the above-described fourth, fifth, sixth, seventh, eighth, ninth, tenth and eleventh embodiments. Thus, it is possible that the noise reduction processing unit 14 has appropriate functions described for those embodiments. Thus, it is possible to effectively combine those functions and to further improve accuracy in the reading pixel position error measurement.

12. Twelfth Embodiment

As described above, in the above-described embodiments of the present invention, a measuring pattern consisting of oblique line images is read, a measuring window is set on a bit-map formation of thus-obtained image data, it is determined whether or not pixels of an oblique line image are included in the measuring window, the measuring window is shifted in a direction of the oblique line image if it is determined that pixels of the oblique line image are included in the measuring window, and a reading pixel position error measurement is performed based on a positional deviation of those pixels of the oblique line image in the measuring window, as shown in FIG. 7.

Figure 30A:
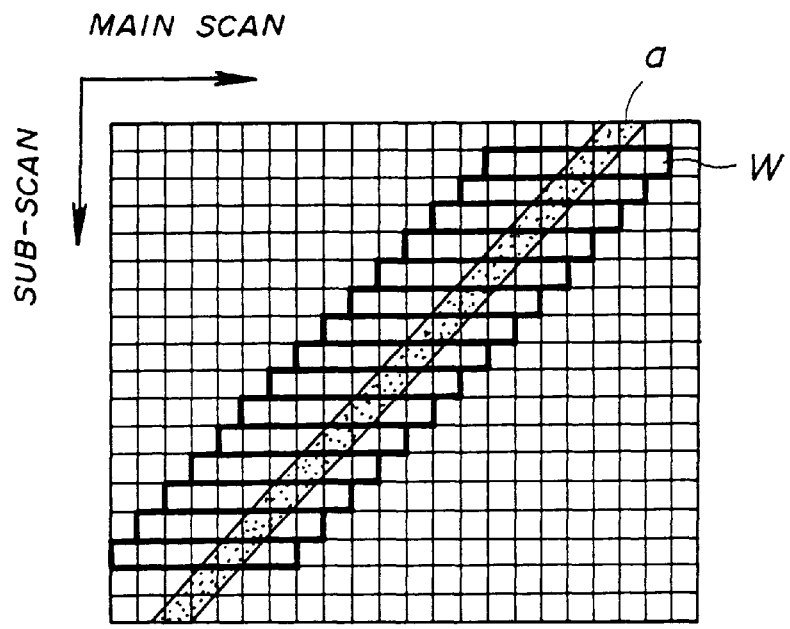
FIGS. 30A and 30B illustrate spatial relationship between an oblique line image formed in a bit-map formation of obtained image data and a measuring window set therefor in the present invention.
Figure 30B:
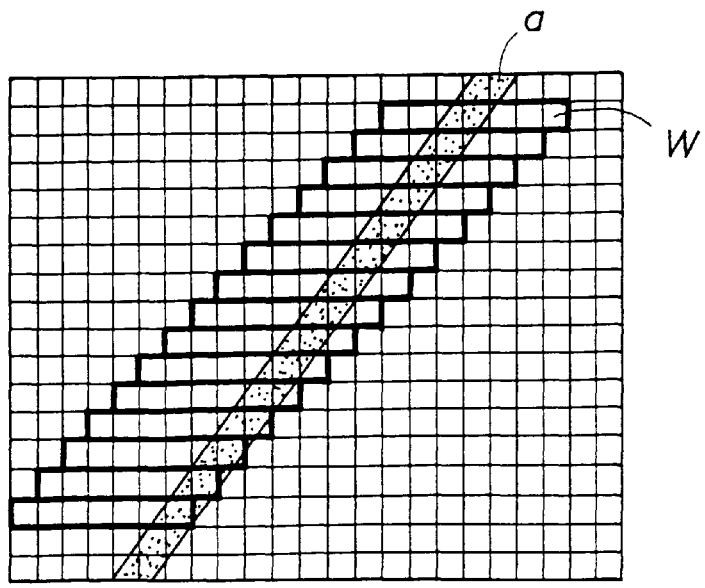

In this operation, the measuring window is moved by an integer number of pixels, repeatedly, and, then, the center of gravity of the image data of pixels within the measuring window is calculated. For example, in a case where a 45° oblique line image is read with a unity magnification, the measuring window is moved in the main scan direction by one pixel and also in the sub-scan direction by one pixel, and then the center of gravity of the image data of pixels within the measuring window is calculated. In this operation, as long as an amount of a reading pixel position error is small enough that the oblique line image 'a' may always pass through a middle point of the measuring window W as the measuring window moves repeatedly, as shown in FIG. 30A, the reading pixel position error measurement can be properly performed based on that calculation of the center of gravity. However, if an amount of reading pixel position error is so large that the oblique line image 'a' may not always pass through a middle point of the measuring window W as the measuring window moves repeatedly, as shown in FIG. 30B, the reading pixel position error measurement can be properly performed. In the example shown in FIG. 30B, when the measuring window W is located at the bottom-left position in the figure, the oblique line image 'a' is located at the right end of the window W, and a right-end part of the oblique line image 'a' extends externally from the right end of the window W at that position, as shown in the figure. in order to prevent such a problem from occurring, one method is that a size of the measuring window W is elongated in the main scan direction. However, if this method is applied, a capacity of a memory for storing the image data of pixels within the measuring window needs to be increased. Further, thereby, a time required for the calculation using the image data stored in the memory of the increased capacity is elongated.

An image reading apparatus in a twelfth embodiment of the present invention can solve this problem without enlarging the size of the measuring window W. As a result, it is not necessary to increase the capacity of the memory for storing the image data of pixels within the measuring window, and, thus, it is not necessary to elongate the time required for the calculation using the image data stored in the memory.

The measurement principle of the twelfth embodiment is substantially identical to the measurement principle of the above-described first embodiment described with reference to FIG. 1 in the item 1.1. In the twelfth embodiment, FIG. 31, similar to FIG. 1, is used for describing the measurement principle. However, the descriptions thereof are the same as those in the item 1.1. Therefore, duplicated descriptions will be omitted.

12.1 System Configuration

Figure 32:
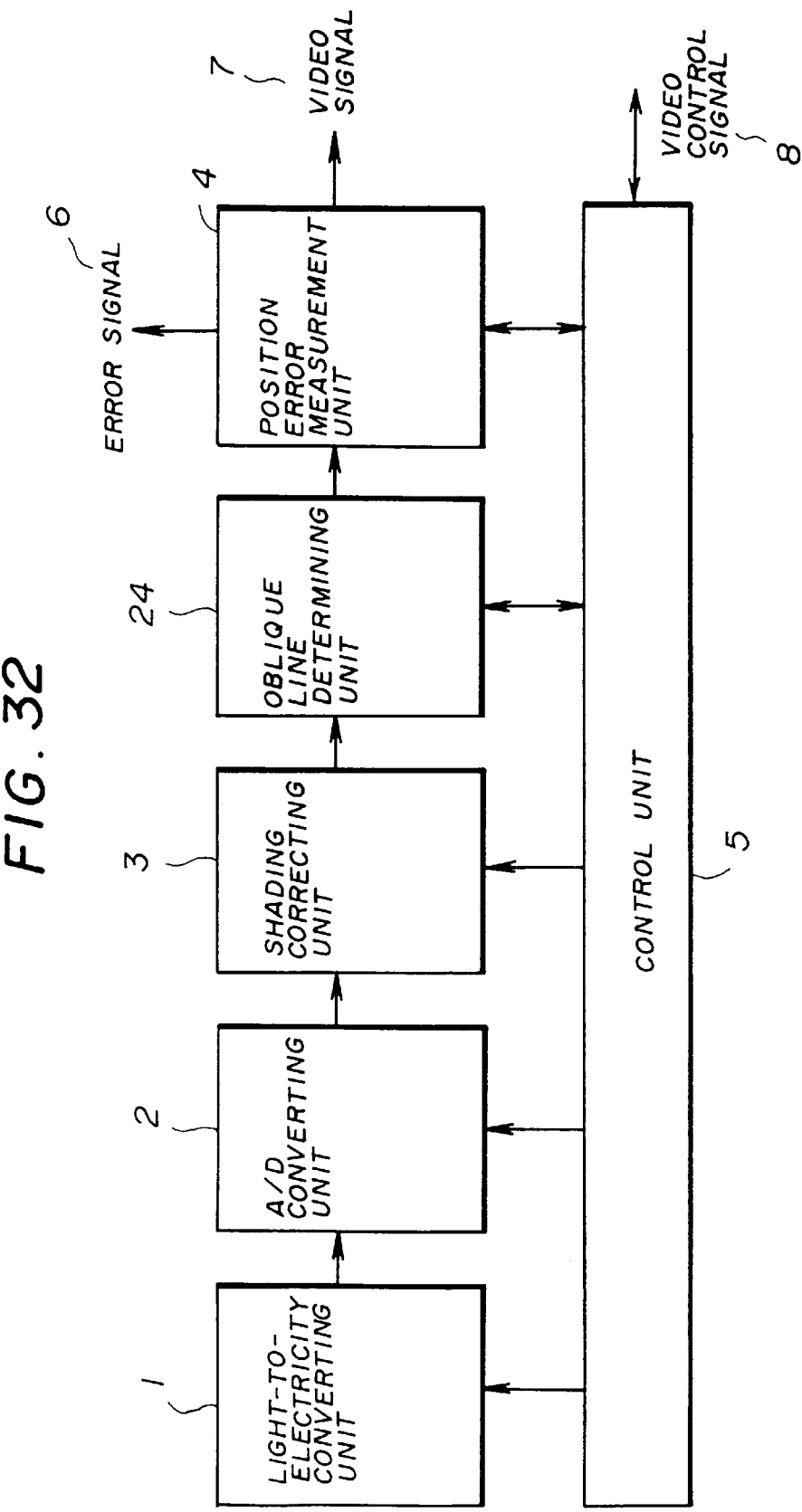
FIG. 32 shows a block diagram of a system configuration of the image reading apparatus in the twelfth embodiment of the present invention.

FIG. 32 shows a block diagram of a basic system configuration of the image reading apparatus in the twelfth embodiment of the present invention. This system configuration is substantially identical to the system configuration of the image reading apparatus in the first embodiment described above, except that an oblique line determining unit 24 is inserted between the shading correcting unit 3 and the position error measurement unit 4. Therefore, duplicated descriptions will be omitted.

In this system, image data which underwent shading correction by the shading correcting unit 3 is input to the oblique line determining unit 24, which performs a determination operation for oblique line images of the measuring pattern on the input image data. The determination result is provided to the control unit 5. Further, the image data is input to the position error measurement unit 4, which performs the above-described reading pixel position error measurement on the input image data, and outputs the measurement result as the error signal 6. The position error measurement unit 4 also outputs the image data as the video signal 7. Each function block, including the oblique line determining unit 24, shown in FIG. 32 is controlled by the control unit 5 so that operation timings are controlled and operation conditions are set, appropriately. Thereby, those function blocks operate with an appropriate mutual operation relationship. Also in this twelfth embodiment, it is also possible that the system configuration shown in FIG. 3A, which is the variant embodiment of the first embodiment and was described above, is used instead of the system configuration shown in FIG. 32. In this case, the general-purpose computer 4A (such as the personal computer shown in FIG. 3B) is specifically configured by software (stored in any information storage medium such as a floppy disk shown in FIG. 3B) executed thereby to carry out not only the above-mentioned reading pixel position error measurement but also the oblique line determination operation performed by the oblique line determining unit 24 when using the system configuration shown in FIG. 32, which operation will be described later.

12.2 General Spatial Configuration

A general spatial configuration of the image reading apparatus in the twelfth embodiment is substantially identical to the general spatial configuration of the image reading apparatus in the second embodiment described above in the item 2.1 with reference to FIGS. 9, 10, 11 and 12. Thus, the general spatial configuration of the fourth embodiment is such as that shown in FIGS. 9, 10, 11 and 12. Therefore, descriptions thereof will be omitted.

12.3 Oblique Line Determination Operation

An oblique line determination operation performed by the oblique determining unit 24 will now be described.

Figure 31:
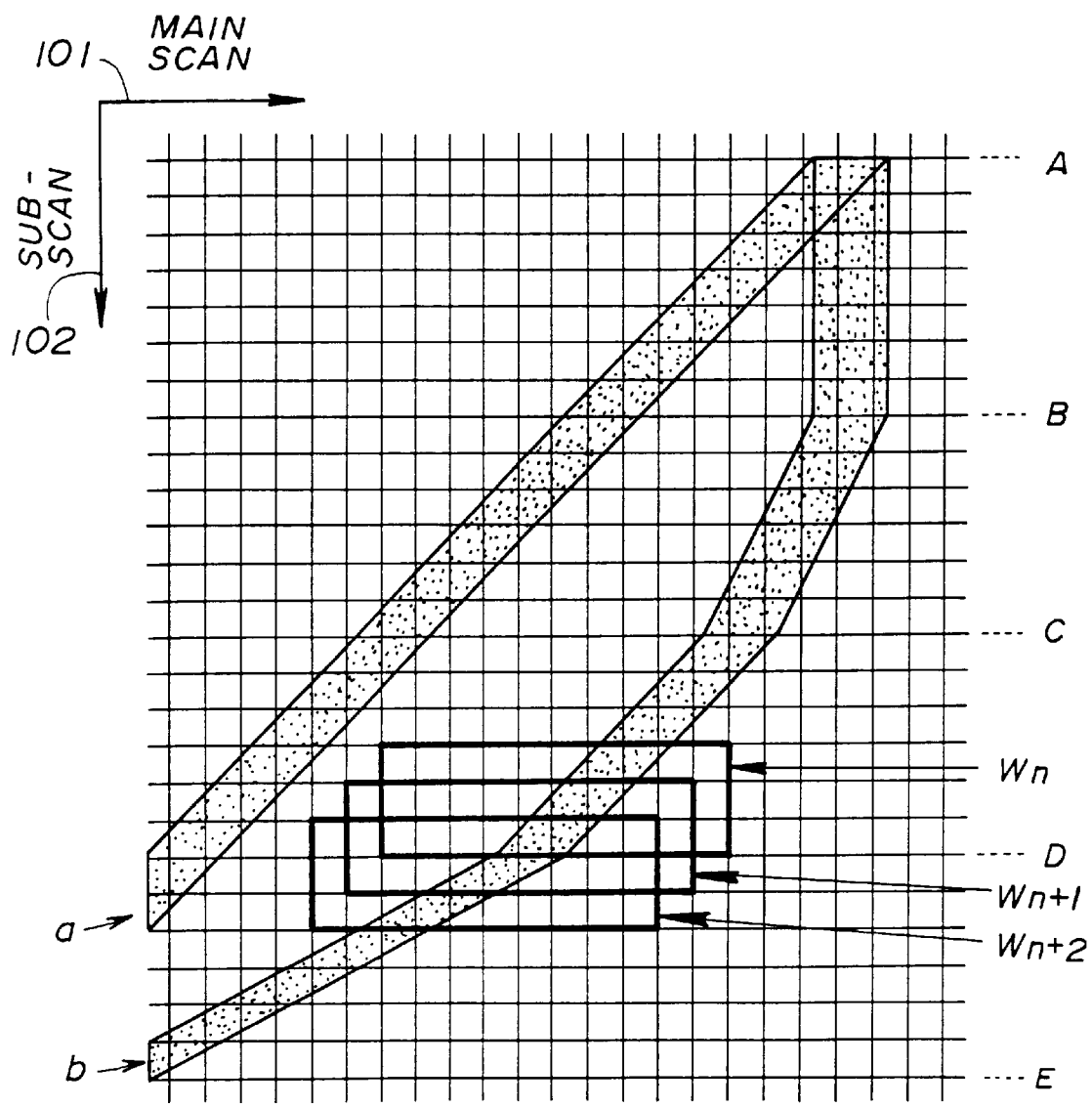
FIG. 31 illustrates a reading pixel position error measurement in an image reading apparatus in a twelfth embodiment of the present invention.
Figures 33, 34:
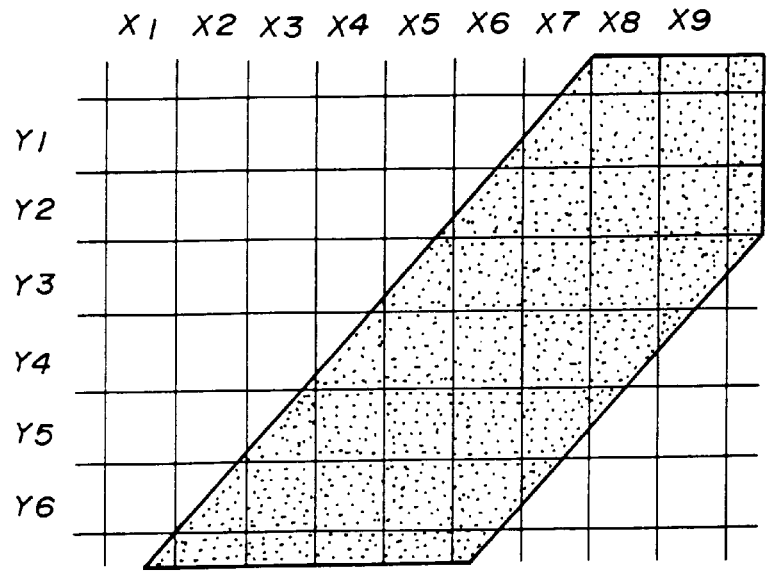
FIG. 33 illustrates a partial oblique line image formed in a bit-map formation of obtained image data.
FIG. 34 illustrates obtained image data values of pixels shown in FIG. 33.
Figure 37D:
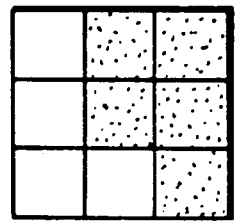
FIGS. 37A, 37B, 37C and 37D illustrate matching patterns used in an oblique line determining operation in another method performed in the image reading apparatus in the twelfth embodiment of the present invention.
Figure 37C:
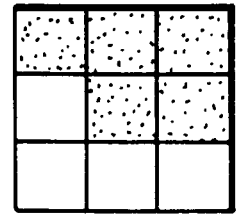
Figure 37B:
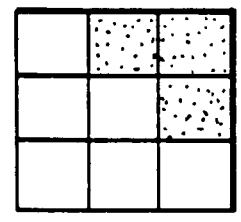
Figure 37A:
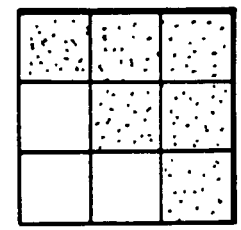

FIG. 33 shows a bit-map formation of image data representing a middle portion of an oblique line image of the measuring pattern, similar to the oblique line 'a' shown in FIG. 31, which image data is obtained from reading the oblique line image. FIG. 34 shows specific image data values of respective pixels of the image data shown in FIG. 33. Each of the image data values is expressed by 8-bit digital data (0 to 255) where white is expressed by 101 and black is expressed by '255'. In the bit-map formation shown in FIGS. 33 and 34, main scan direction coordinate values are represented by Xn and sub-scan direction coordinate values are represented by Yn. In the oblique line determination operation, a determining window is used. This determining widow is of 3 pixels (main scan direction) by 3 pixels (sub-scan direction). Each of FIGS. 35A, 35B, 35C, 35D and 35E shows a pixel group, defined by the determining window, of the image data show in FIG. 34. The pixel groups shown in FIGS. 35A to 35E are obtained by shifting the determining window by one pixel in the main scan direction on the bit-map formation of image data shown in FIG. 34.

Figures 35A, 35B, 35C, 35D, 35E:
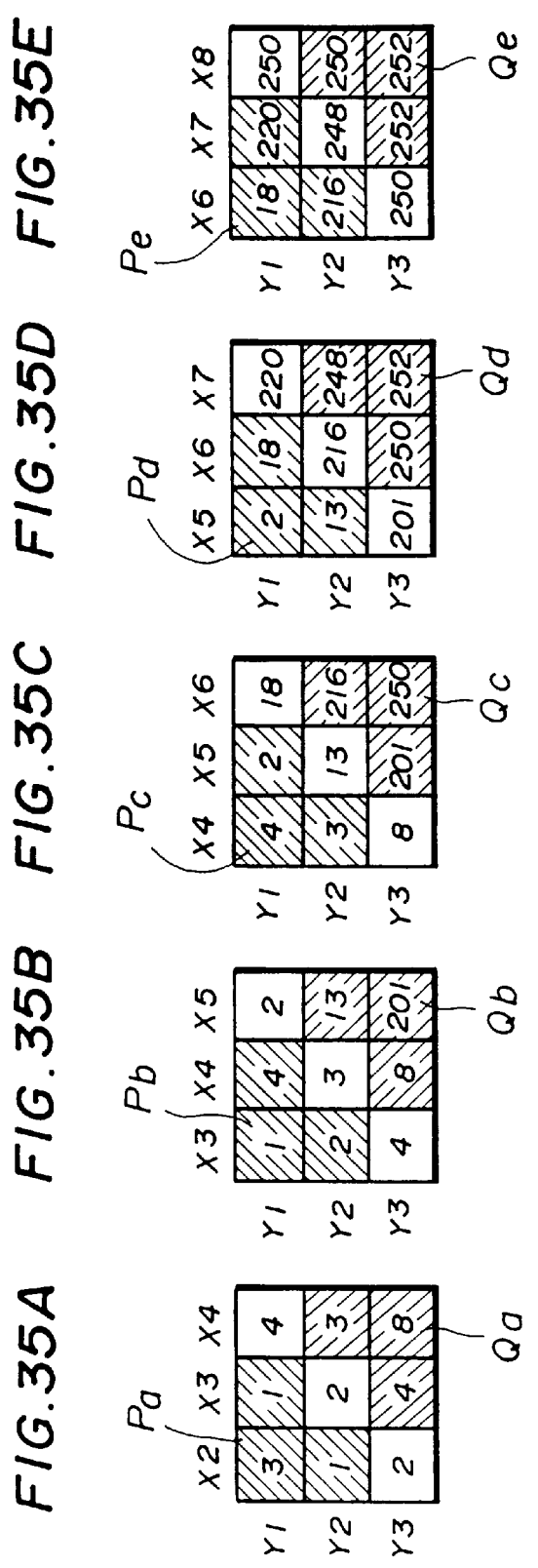

In this operation, first, for the pixel group (X2–X4, Y1–Y3) defined by the determining window shown in FIG. 35A, a total of image data values of three pixels located at a top-left corner excluding the central pixel is calculated as Pa, and a total of image data values of three pixels located at a bottom-right corner excluding the central pixel is calculated as Qa, as shown in FIG. 35A. Thus, $$Pa = (X2, Y1) + (X3, Y1) + (X2, Y2)$$
$$= 3 + 1 + 1 = 5; \text{ and}$$
$$Qa = (X4, Y2) + (X3, Y3) + (X4, Y3)$$
$$= 3 + 4 + 8 = 15.$$

Similarly, for the other four pixel groups shown in FIGS. 35B, 35C, 35D and 35E, totals of pixel values of corner pixels are obtained, respectively, as follows:

$$Pb = (X3, Y1) + (X4, Y1) + (X3, Y2)$$
$$= 1 + 4 + 2 = 7; \text{ and}$$
$$Qb = (X5, Y2) + (X4, Y3) + (X5, Y3)$$
$$= 13 + 8 + 201 = 222.$$

$$Pc = (X4, Y1) + (X5, Y1) + (X4, Y2)$$
$$= 4 + 2 + 3 = 9; \text{ and}$$
$$Qc = (X6, Y2) + (X5, Y3) + (X6, Y3)$$
$$= 216 + 201 + 250 = 667.$$

$$Pd = (X5, Y1) + (X6, Y1) + (X5, Y2)$$
$$= 2 + 18 + 13 = 33; \text{ and}$$
$$Qd = (X7, Y2) + (X6, Y3) + (X7, Y3)$$
$$= 248 + 250 + 252 = 750.$$

$$Pe = (X6, Y1) + (X7, Y1) + (X6, Y2)$$
$$= 18 + 220 + 216 = 454; \text{ and}$$
$$Qe = (X8, Y2) + (X7, Y3) + (X8, Y3)$$
$$= 250 + 252 + 252 = 754.$$

Then, a difference R (Ra, Rb, Rc, Rd, Re) between the total for the bottom-right corner pixels and the total for the top-left corner pixels is calculated for each pixel group, as follows:

Ra=Qa−Pa=15−5=10;
Rb=Qb−Pb=222−7=215;
Rc=Qc−Pc=667−9=658;
Rd=Qd−Pd=750−33=717; and
Re=Qe−Pe=754−454=300.

When such a difference R (Ra, Rb, Rc, Rd, Re) has a larger value, it is determined that the determining window comes to or starts to include pixels of an oblique line of the measuring pattern. Thereby, it is determined that the determining window includes pixels of such an oblique line. For example, if a value '500' is determined as a threshold value, it is determined-that the determining window includes pixels of an oblique line of the measuring pattern when the difference R is more than 500. According to this determination threshold value, in the case of each of the pixel groups shown in FIGS. 35C and 35D, it is determined that the determining window includes pixels of an oblique line of the measuring pattern.

With reference to FIGS. 36A, 36B, 36C, 36D and 36E, another example of the method of the oblique line determination operation will now be described. The pixel values shown in FIGS. 36A–36E are obtained as a result of converting the pixel values shown in FIGS. 35A–35E into bilevel values ('0' or '1') with a conversion threshold value of '128'. Using the pixel values shown in FIGS. 36A–36E, the above-mentioned calculation of a total of the top-left corner pixels (Pa, Pb, Pc, Pd, Pe) and a total of the botton,-right corner pixels (Qa, Qb, Qc, Qd, Qe) is performed for each pixel group, as follows:

$$Pa = (X2, Y1) + (X3, Y1) + (X2, Y2)$$
$$= 0 + 0 + 0 = 0; \text{ and}$$
$$Qa = (X4, Y2) + (X3, Y3) + (X4, Y3)$$
$$= 0 + 0 + 0 = 0.$$

$$Pb = (X3, Y1) + (X4, Y1) + (X3, Y2)$$
$$= 0 + 0 + 0 = 0; \text{ and}$$
$$Qb = (X5, Y2) + (X4, Y3) + (X5, Y3)$$
$$= 0 + 0 + 1 = 1.$$

$$Pc = (X4, Y1) + (X5, Y1) + (X4, Y2)$$
$$= 0 + 0 + 0 = 0; \text{ and}$$
$$Qc = (X6, Y2) + (X5, Y3) + (X6, Y3)$$
$$= 1 + 1 + 1 = 3.$$

$$Pd = (X5, Y1) + (X6, Y1) + (X5, Y2)$$
$$= 0 + 0 + 0 = 0; \text{ and}$$
$$Qd = (X7, Y2) + (X6, Y3) + (X7, Y3)$$
$$= 1 + 1 + 1 = 3.$$

$$Pe = (X6, Y1) + (X7, Y1) + (X6, Y2)$$
$$= 0 + 1 + 1 = 2; \text{ and}$$
$$Qe = (X8, Y2) + (X7, Y3) + (X8, Y3)$$
$$= 1 + 1 + 1 = 3.$$

Then, similarly, a difference R (Ra, Rb, Rc, Rd, Re) between the total for the bottom-right corner pixels and the total for the top-left corner pixels is calculated for each pixel group, as follows:

$$Ra = Qa - Pa = 0 - 0 = 0;$$
$$Rb = Qb - Pb = 1 - 0 = 1;$$
$$Rc = Qc - Pc = 3 - 0 = 3;$$
$$Rd = Qd - Pd = 3 - 0 = 3; \text{ and}$$
$$Re = Qe - Pe = 3 - 2 = 1;$$

Similarly, when such a difference R (Ra, Rb, Rc, Rd, Re) has a larger value, it is determined that the determining window includes pixels of an oblique line of the measuring pattern. In this case, for example, if a value '2' is determined as a threshold value, it is determined that the determining window includes pixels of an oblique line of the measuring pattern when the difference R is more than 2. According to this determination threshold value, in the case of each of the pixel groups shown in FIGS. 36C and 36D, it is determined that the determining window includes pixels of an oblique line of the measuring pattern. In this method, because each pixel value is converted into a bilevel value as mentioned above, the calculations can thus be simplified.

With reference to FIGS. 37A, 37B, 37C and 37D, another example of the method of the oblique line determination operation will now be described. In this method, pattern matching is used. FIGS. 37A–37D show matching patterns for the pattern matching. In each of FIGS. 37A–37D, each blank square represents a '0' pixel while each dotted square represents a '1' pixel. In this method, first, image data of a pixel group defined by the determining window is converted into bilevel image data values, as shown in FIGS. 36A–36E. Then, the thus-obtained image data of each pixel group is compared with each matching pattern of those shown in FIGS. 37A–37D. Then, when the image data of a pixel group defined by the determining window is coincident with any of those matching patterns, it is determined that the determining window includes pixels of an oblique line of the measuring pattern. In this example, the image data of the pixel groups shown in FIGS. 36C and 36D are coincident with the matching patterns shown in FIGS. 37B and 37A, respectively. Thereby, in the case of each of the pixel groups shown in FIGS. 36C and 36D, it is determined that the determining window includes pixels of an oblique line of the measuring pattern.

In this embodiment, the determining window has the size of 3 pixels by 3 pixels. However, it is possible to use another size of the determining window. Also in the case of using another size of the determining window, similar methods can be applied for performing the oblique line determination operation. Generally speaking, as the size of the determining window is increased, the determination accuracy becomes higher. However, a time required for the determination operation is increased, and a circuit scale required for the determination operation is increased, accordingly.

Further, in the above descriptions, only the cases where the determining window includes pixels of the left side of an oblique line of the measuring pattern are included. However, those methods can also be applied to cases where the determining window includes pixels of the right side of an oblique line of the measuring pattern. In those cases, top-left pixels have larger tone values and bottom-right pixels have smaller tone values, although the top-left pixels have smaller tone values and the bottom-right pixels have larger tone values in the above-described case of FIGS. 35C, 35D, 36C, 36D. Similarly, for the cases of the determining window including pixels of the right side of an oblique line image, matching patterns, which are obtained by inverting the dotted pixels and blank pixels of the matching patterns shown in FIGS. 37A–37D, may be used. Further, it is also possible to move the determining window in the direction reverse to the main scan direction, that is, to move the determining window leftwardly in FIG. 34, and thus to reach the condition that the determining window includes pixels of the right side of an oblique line image and the condition that the determining window includes pixels of the left side of an oblique line image.

12.4 Position Error Measuring Process 12.4.1 Summary of the Measuring Process

Figure 38:
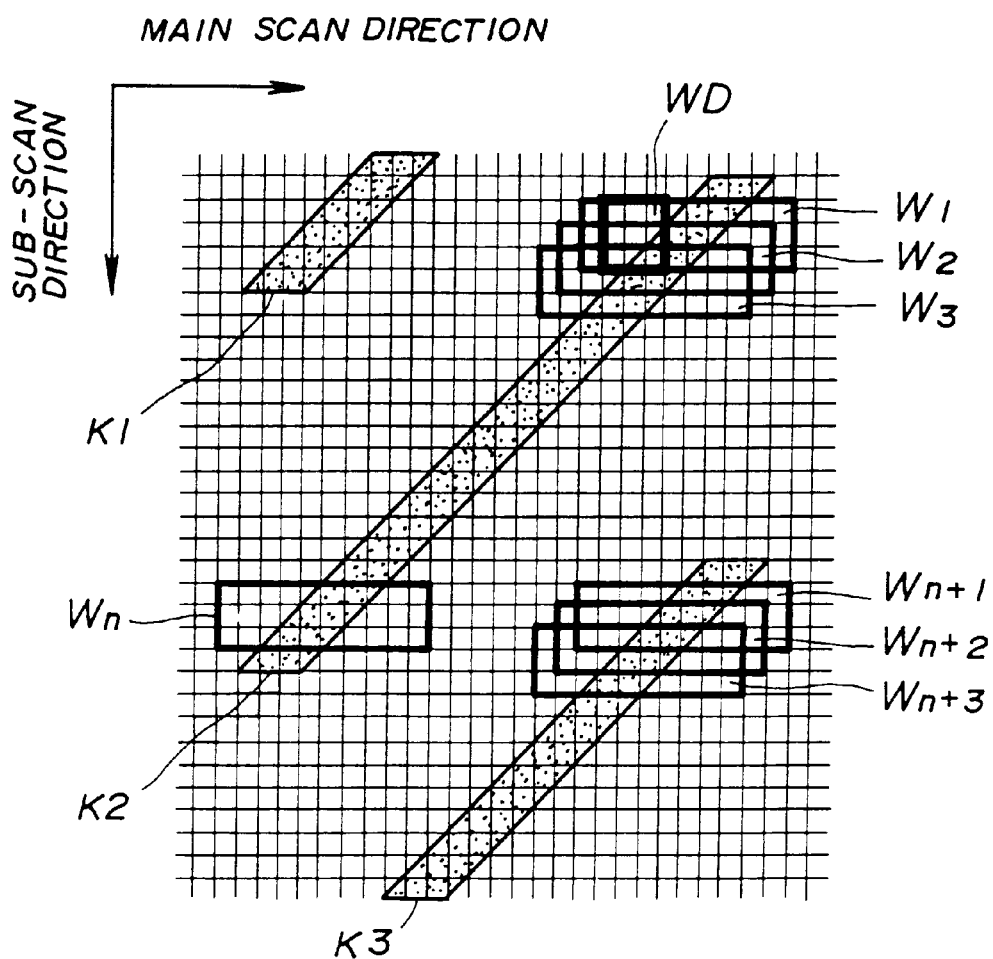
FIG. 38 illustrates a measuring window shifting operation in the reading pixel position error measurement in the twelfth embodiment when a plurality of oblique line images are formed in a bit-map formation of obtained image data.

With reference to FIG. 38, a summary of the reading pixel position error measuring process performed by the image reading apparatus in the twelfth embodiment will now be described. The arrangement shown in FIG. 38 is similar to the arrangement shown in FIG. 5, and, thus, the reading pixel position error measuring process in the twelfth embodiment is similar to the reading pixel position error measuring process in the first embodiment described above in the item 1.3, and, therefore, duplicated descriptions will be omitted. In the method of the twelfth embodiment, a plurality of oblique line images (in this example, three oblique line images K1, K2 and K3) in a bit-map formation of read image data, such as that shown in FIG. 31, are used. A measuring window W (W1, W2, W3, . . . ) has a size of 10 pixels by 3 pixels. Similar to the process of the first embodiment, the measuring window W is shifted by one pixel in the bottom-left 450 oblique direction, producing the measuring windows W1, W2, W3, . . . , as shown in FIG. 38, for the oblique line image K2. For each position of the measuring window W, the center of gravity of image data of pixels defined by the measuring window W in the main scan direction is obtained, and, thus, a position of the image data is obtained. Then, after the measuring window W reaches the last position Wn for the oblique line image K2, the measuring window W is shifted in the main scan direction, and thereby the measuring window W is positioned at a position Wn+1, for the subsequent oblique line image K3, as shown in FIG. 38.

12.4.2 Measurement of Center of Gravity

Figure 39:
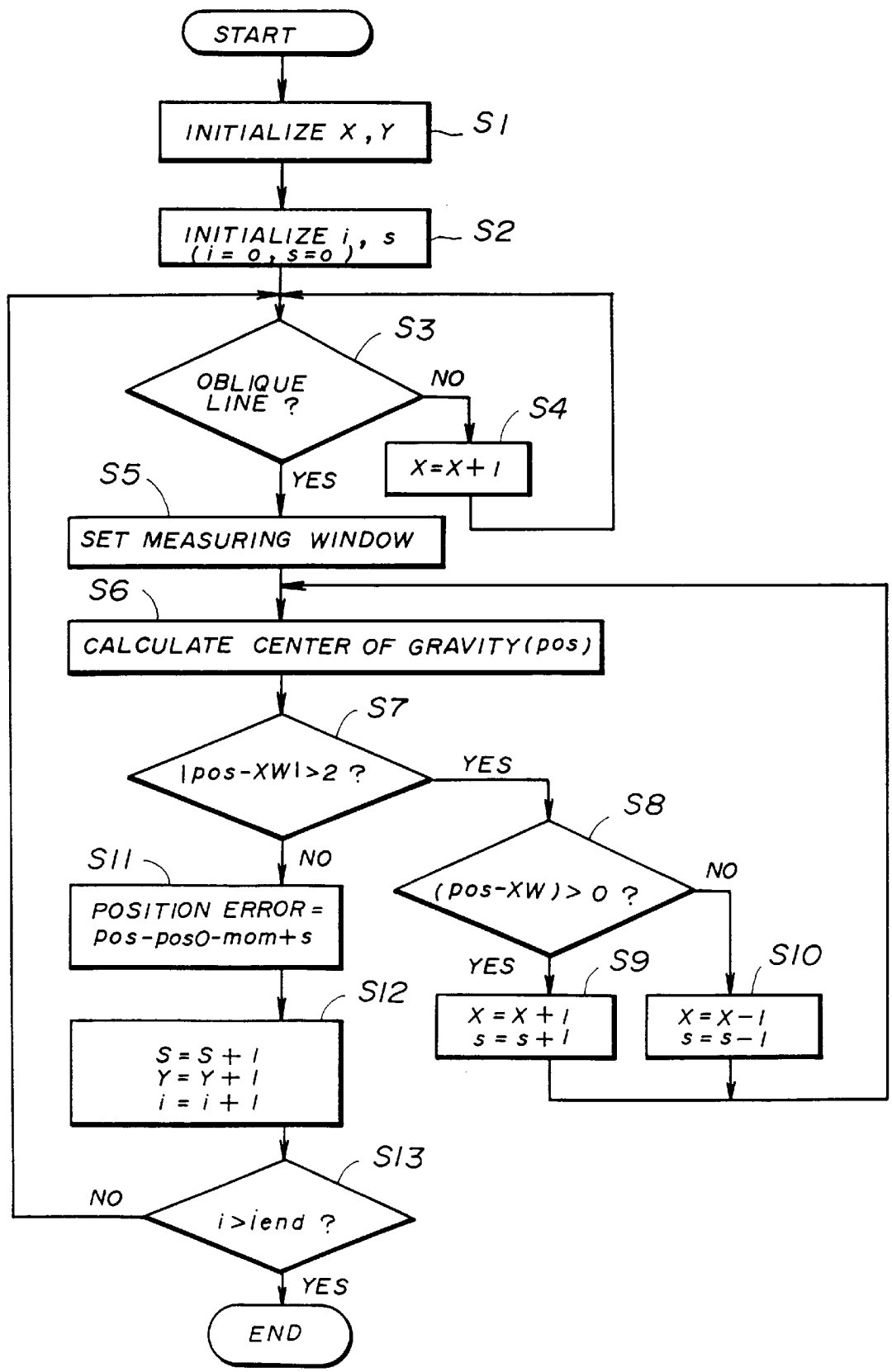
FIG. 39 shows an operation flow chart of the reading pixel position error measurement (center of gravity calculation) in the twelfth embodiment.

With reference to FIG. 39, an operation flow of measurement of the above-mentioned center of gravity for the reading pixel position error measurement will now be described. The operation starts at the same time when the measuring pattern is read by the image reading apparatus. In Si, coordinate values X, Y in the main scan direction and sub-scan direction of the bit-map formation of the image data are initialized at '0', that is, X=0 and Y=0, respectively. The above-mentioned determining window (for the oblique line determining operation) having a size of 3 pixels by 3 pixels is set so that, in this operation, for example, the above-mentioned coordinate values X, Y represent the center pixel 'i' of that determining window. Then, a number 'i' (variable) for counting of the number of measuring operations performed for one oblique line image is initialized, that is, i=0, in S2. Further, in S2, a window shift amount count variable 's' is also initialized at '0', that is, s=0.

In S3, as described above in the item 12.3, the oblique line determining unit 24 determines whether or not the determining window includes pixels of the left side of an oblique line image, or includes pixels of the right side of an oblique line image. If it is determined in S3 that the determining window does not include pixels of the left or right side of an oblique line image, the X coordinate value is incremented by 1 (X=X+1), in S4. Thus, the determining window shifts in the main scan direction by one pixel. This amount of shifting of the determining window in this step is not limited to one pixel, and may be determined depending on a size of the determining window and a thickness of an oblique line image of the measuring pattern. It is possible that that amount of shifting of the determining window in this step is a plurality of pixels. If it is determined in S3 that the determining window includes pixels of an oblique line image, the measuring window W1 is set in S5 in the bit-map formation of the image data, as shown in FIG. 38. (Note: According to this operation flow, the oblique line image K1 shown in FIG. 38 should be processed first. However, this figure shows a case where processing for the oblique line image K1 has been finished, and, -hen processing for the oblique line image K2 is started, for convenience sake.) In this step, the measuring window W1 is set in a position such that the measuring window W1 is set at a position shifted by a predetermined number of pixels from the current position (at which the presence of the oblique line is detected) of the determining window WD. For example, as shown in FIG. 38, the previously set determining window WD is located in a predetermined left position of the measuring window W1, in this operation. Thereby, when it is determined by the oblique line determining unit 24 that the determining window WD includes pixels of the oblique line image K2, the oblique line image K2 is located at a predetermined middle position of the measuring window. The thus-set spatial relation between the determining window and measuring window W is fixed, that is, the determining window shifts together with the measuring window, during the operation procedure shown in FIG. 39. In S6, the center of gravity of the image data of the pixels within the measuring window WI is calculated. Then, in S7, in order to determine whether or not the oblique line image K2 is located at the middle of the measuring window W1, the center of gravity calculated in S6 ('pos' in FIG. 39) is compared with the center position in the main scan direction of the measuring window W1 (this center position being referred to as 'XW' in FIG. 39 and hereinafter). When the difference between the center of gravity 'pos' and center of measuring window 'XW' is close to 0, it is determined that the oblique line image K2 is located at the center of the measuring window W1. When it is determined in S7, S8 that the difference is more than +2 pixels, the measuring window is shifted by +1 pixel (X=X+1) in the main scan direction, and the shift amount count variable 's' is incremented by 1 (s=s+1), in S9. When it is determined in S7, S8 that the difference is greater than –2 pixels, the measuring window is shifted by –1 pixel (X=X–1) in the main scan direction, and the shift amount count variable 's' is decremented by 1 (s=s–1), in S10.

After the above-described procedure is repeated until the above-mentioned difference is less than 2 in S7, S11 is performed. The above-mentioned threshold value '2' used in S7 and S8 does not need to be limited to the number '2'. This value may be determined depending on a size of the measuring window.

In S11, an amount of reading pixel position error $P_E$ is calculated by the following equation (4):

$$P_E = pos - pos0 - mom + s \qquad (4).$$

where 'mom' represents a correction factor of the center of gravity, which will be described later. The initial value of the 'mom' is '0'. Further, 'pos0' is the center of gravity in the first main scan line in the condition where no reading pixel position error is present. Thus, the reading pixel position error $P_E$ is obtained as a result of subtracting the value of the center of the measuring window XW and also the correction factor of the center of gravity 'mom' from the value of the center of gravity calculated in S6 'pos', and adding the shift amount count variable 's' thereto.

Then, in S12, the Y coordinate value is incremented by one pixel (Y=Y+1) and thus the measuring window is shifted in the sub-scan direction by one pixel. Simultaneously, the shift amount count variable 's' is incremented by +1, and also the above-mentioned number 'i' (variable) for counting the number of measuring operations performed for one oblique line image is incremented by 1. In this step, the measuring window is not shifted in the main scan direction. In this operation procedure, the measuring window position shifting in the main scan direction is performed in S4, S9 or S10 for correcting a position of the measuring window relative to a position of an oblique line image of the measuring pattern so as to cause the oblique line image to be positioned at the middle position of the measuring window. By repeating such an operation, the measuring window W is shifted repeatedly, so that W1, W2, W3, . . . , Wn, and the reading pixel error measurement is performed for each position of the measuring window.

Then, the above-mentioned number 'i' (variable) for counting the number of measuring operations performed for one oblique line image is compared with a predetermined value '$i_{end}$', which is the number of measuring operations to be performed for one oblique line image, in S13. In this case, $i_{end}$=n. Thus, for example, for the oblique line image K2 shown in FIG. 38, after the processing at the measuring window position of Wn has been finished, the operation for that oblique line image is terminated. Then, as shown in FIG. 38, similar processing for the subsequent oblique line image K3 is performed. Thus, the measuring window W is shifted into the position Wn+l in the main scan direction. For this purpose, the measuring window w is shifted in the main scan line direction by 'm' pixels, the number 'm' being a number less, by an integer number, than the number of pixels which correspond to the center-to-center distance in the main scan direction between adjacent oblique line images. Then, the shift amount counter variable 'i' is initialized at '0', and the oblique line determination operation performed by the oblique line determining unit 24 starts from S3 shown in FIG. 39. In this case, the correction factor of the center of gravity, 'mom', used in S11 is the difference between the value of the center of gravity calculated for the measuring window Wn+1 'mom2' and the value of the center of gravity calculated for the measuring window Wn 'mom1', that is, $$mom = mom2 - mom1 \qquad (5).$$

According to the operation procedure shown in FIG. 39, the measuring window is shifted to become Wn+1, Wn+2, Wn+3, . . . , and the reading pixel error measurement is performed for each measuring window position, similarly.

Figure 40:
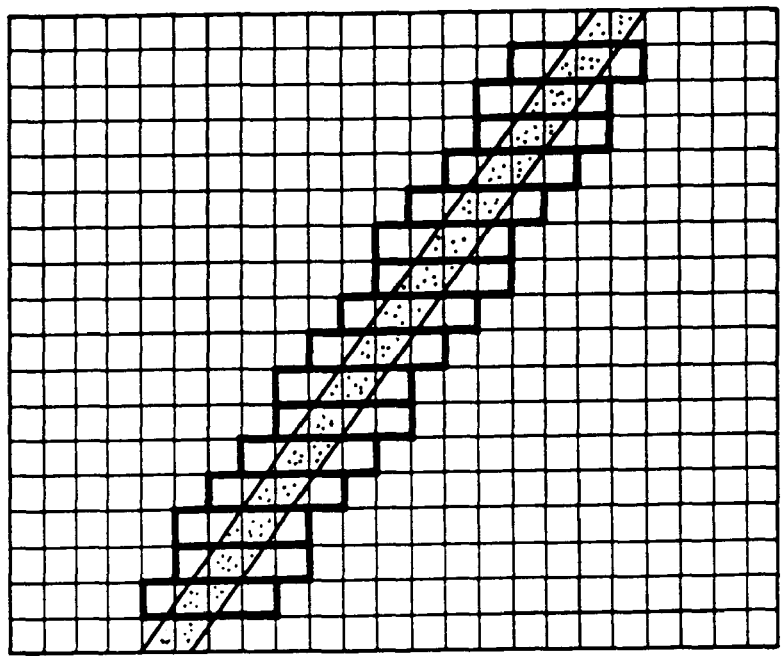
FIG. 40 illustrates spatial relationship between an oblique line image formed in a bit-map formation of obtained image data and a measuring window set therefor in the method shown in FIG. 39.

FIG. 40 shows a movement of the measuring window according to the above-described measuring window setting and shifting control operation, in a case where an amount of reading pixel position error is so large that an oblique line image formed in a bit-map formation of obtained image data is oblique more steeply than 45°. By the above-described measuring window setting and shifting control operation described with reference to FIG. 39, it is possible that the measuring window is positioned so that an oblique line image of the measuring pattern is located in the middle position of the measuring window when the reading pixel position error is measured. Thereby, it is possible to perform the reading pixel position error measurement with a high accuracy. Further, it is not necessary to provide a measuring window having a large length in the main scan direction for an oblique line image to be positioned in the middle of the measuring window. In another view point, it is not necessary to use oblique lines of the measuring pattern (L of the measuring chart 30 shown in FIG. 12, for example), each oblique line being thin. It is possible to use thick or bold oblique lines for the measuring pattern, and such thick or bold lines is not likely to be adversely affected by the MTF of the reading optical system of the image reading apparatus.

12.4.3 Calculation of the Center of Gravity from Image Data in the Window, the Width of the Oblique line, and Relationship between Shift of the Portion of the Oblique Line Image in the Measuring Window and Sub-Scan Direction Reading Pixel Position Error The calculation of the center of gravity of image data of pixels defined by the measuring window, performed in S6, the width of each of oblique lines of the measuring pattern, the relationship between shift of the portion of the oblique line image in the measuring window and sub-scan direction reading pixel position error are substantially identical to those in the first embodiment, described above in the items 1.4 and 1.5, with reference to FIG. 6. Therefore, duplicated descriptions thereof will be omitted.

Figures 41, 42:
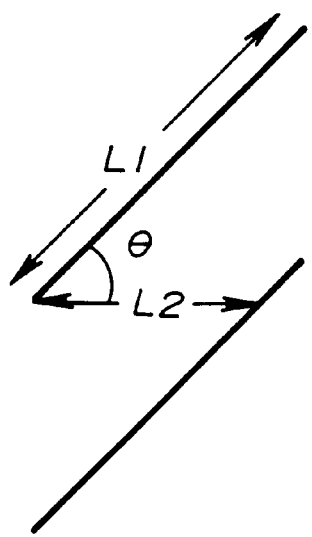
FIG. 41 illustrates obtained image data values of pixels defined by a measuring window, and illustrates a center of gravity calculation operation in the twelfth embodiment.
FIG. 42 illustrates a length and an angle of an oblique line image of a measuring pattern in the twelfth embodiment.

In this case, the measuring window has the size of 10 pixels by 3 pixels, as mentioned above, shown in FIG. 41, while the measuring window has the size of 11 pixels by 3 pixels in the first embodiment, shown in FIG. 6. In the case of FIG. 41, when calculating the center of gravity of the pixels in the measuring window, similarly, the total of the image data of pixels is obtained for each column, for those three main scan lines. The totals of the image data of pixels obtained for those columns, which columns are referred to as, from the left-hand side, X0, X1, X2, X3, X4, X5, X6, X7, X8, and X9, as shown in FIG. 41, respectively. Those totals are 18, 50, 202, 427, 590, 562, 345, 150, 37, and 14, respectively, as shown in the figure. Assuming that the main scan direction coordinate values of the centers of those pixels are, toward the right-hand side, 0 to 9, respectively, $$X0(Rm-0)+X1(Rm-1)+X2(Rm-2)+ \ldots +X9(Rm-9)=0 \qquad (6),$$

where the coordinate value of the center of gravity in the main scan direction is 'Rm', because the overall moment about the center of gravity 'Rm' is 0. Thus, the center of gravity in the main scan direction of (the image data of) the pixels in the measuring window is calculated. After applying the above-mentioned specific values of the image data column totals X0, X1, X2, . . . , X9 and solving the above-mentioned equation (6), the center of gravity:

$$Rm=4.362.$$

is obtained.

The above-mentioned correction factor of the center of gravity 'mom' will now be described. In a case where the reading pixel position error measurement is performed using the measuring pattern including a plurality of oblique lines such as that shown in FIG. 38, an operation which will be described is performed. A case will now be considered where the measuring window is shifted from an oblique line image to a subsequent oblique line image, such that the measuring window is shifted from the position Wn to the position Wn+1 shown in FIG. 38. In this case, it is assumed that the center-to-center distance in the main scan direction between the adjacent oblique lines does not correspond to an integer number of pixels. In comparison therewith, the measuring window is shifted by an integer number of pixels. In such a case, it is necessary to correct obtained reading pixel position error for a deviation of that center-to-center distance in the main scan direction between the adjacent oblique lines from an integer number of pixels, that is, a fraction portion of that distance. Thereby, it is possible to obtain the reading pixel position error without including an error due to such a fraction portion of that distance. The above-mentioned correction factor of the center of gravity 'mom' used in S11 shown in FIG. 39 is subtracted from an obtained reading pixel position error value (pos-XW), and, thus, the above-mentioned correction for such a fraction of a center-to-center distance in the main scan direction between adjacent oblique lines of the measuring pattern is performed.

For example, in the example shown in FIG. 38, it is assumed that the center of gravity of image data of pixels defined by the measuring window Wn is '4.65', that is, $R_n$=4.65. Further, the center of gravity of the measuring window Wn+1 is '4.38', that is, $R_{n+1}$=4.38. Similarly, $R_{n+2}$=

4.40, and $R_{n+3}$=4.41. In this case, according to the above-mentioned equation (5), the deviation of the calculated centers of gravity for the measuring window shifting between the adjacent oblique lines, that is, the correction factor mom, is obtained as follows:

$$\begin{aligned} mom &= mom2 - mom1 \\ &= R_{n+1} - R_n \\ &= 4.38 - 4.65 \\ &= -0.27. \end{aligned}$$

Then, according to the equation (4), thus-corrected amounts $P_En+2$ and $P_En+3$ of the reading pixel position error for the window positions Wn+2 and Wn+3 are obtained, in a case where s=0, as follows:

$P_En+2$=4.40−5.0−(−0.27)+s=−0.33; and $P_En+3$=4.41−5.0−(−0.27)+s=−0.32.

In other words, the above-mentioned values of the centers of gravity $R_{n+2}$ and $R_{n+3}$ are corrected into $Rc_{n+2}$ and $Rc_{n+3}$, respectively, as follows:

$Rc_{n+2}$=$R_{n+2}$+mom=4.40+0.27=4.67; and $Rc_{n+3}$=$R_{n+3}$+mom=4.41+0.27=4.68.

Thereby, when the measuring pattern including a plurality of oblique lines is used for the reading pixel position error measurement, it is possible to perform the measurement continuously through the plurality of oblique lines with a high accuracy. In this case, it is necessary, when the measuring window is shifted between the positions Wn and Wn+1 of the oblique lines K2 and K3, respectively, that those oblique line images K2 and K3 are present on the same main scan line.

FIG. 42 shows a spatial relationship between adjacent oblique lines of the measuring pattern. As shown in FIG. 42, in a case where each oblique line has a length of L1, an angle between each oblique line and the main scan line direction is Θ, and a starting point and ending point of each oblique line in the main scan direction are coincident with each other, respectively, the following equation (7) is satisfied:

$L2 < L1 \cdot \cos \Theta$ (7), where L2 represents a distance in the main scan direction between adjacent oblique lines. Thereby, adjacent oblique lines are present on the same scan line, that is, the bottom end of the upper oblique line of the adjacent oblique lines is lower than the top end of the lower oblique line, as shown in FIG. 42. In such a condition, it is possible to continue the reading pixel position error measurement through a plurality of oblique lines by shifting the measuring window therebetween in the main scan direction. When the difference between the left-hand term (L2) and the right-hand term (L1·cos Θ) is larger in the above-mentioned equation (7), accuracies in the length L1 of each oblique line does not need to be high.

13. Thirteenth Embodiment 13.1 General Spatial Configuration

A general spatial configuration of an image reading apparatus in a thirteenth embodiment of the present invention is substantially identical to the general spatial configuration of the image reading apparatus in the second embodiment described above in the item 2.1 with reference to FIGS. 9, 10, 11 and 12. Thus, the general spatial configuration of the fourth embodiment is such as that shown in FIGS. 9, 10, 11 and 12. Therefore, duplicated descriptions thereof will be omitted.

13.2 System Configuration

Figure 43:
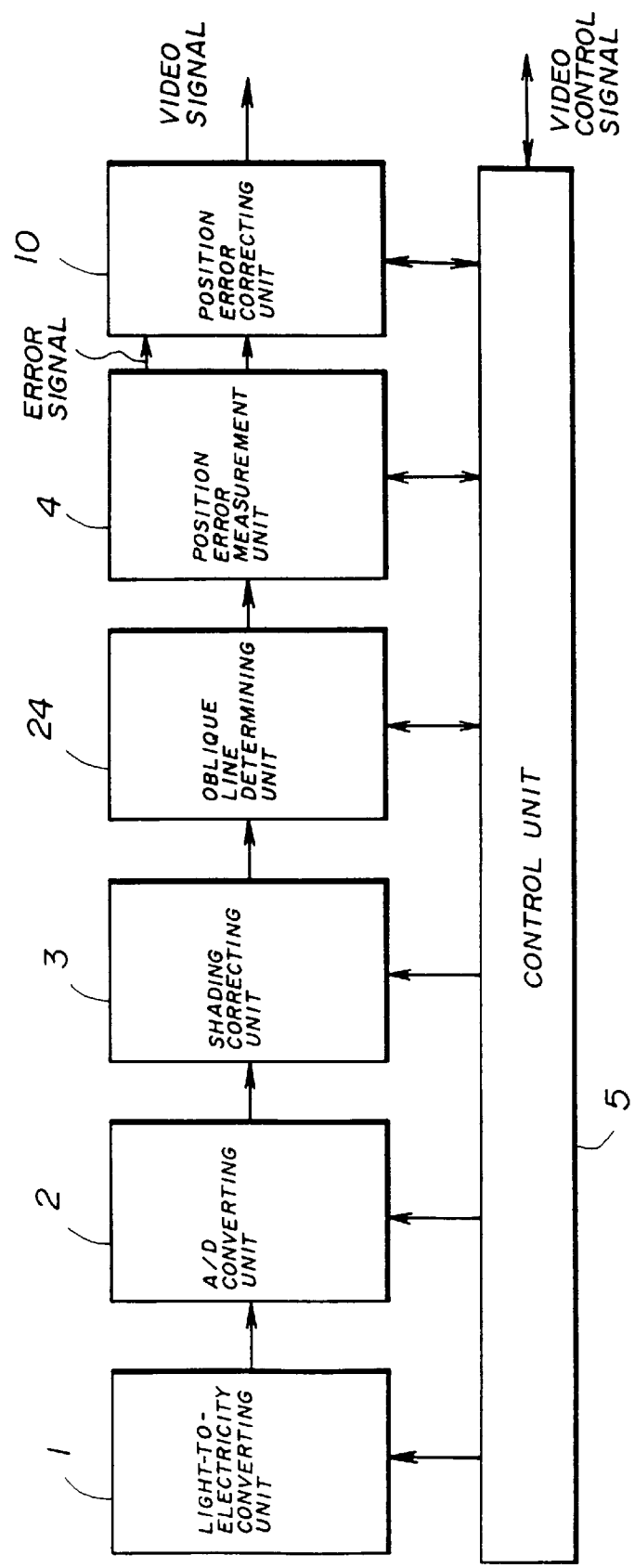
FIG. 43 shows a block diagram of a system configuration of an image reading apparatus in a thirteenth embodiment of the present invention.

FIG. 43 shows a block diagram of a basic system configuration of the image reading apparatus in the thirteenth embodiment of the present invention. This system configuration is substantially identical to the system configuration of the image reading apparatus in the twelfth embodiment described above, except that a position error correcting unit 10 is inserted after the position error measurement unit 10. Therefore, duplicated descriptions will be omitted.

In this system, the position error correcting unit 10 receives the error signal and video signal from the position error measurement unit 4. The position error correcting unit 10 uses the error signal (indicating reading pixel position errors) and video signal, and, thus, performs a reading pixel position error correction operation on the image data carried by the video signal, according to the error signal. As a result, the position error correcting unit 4 outputs a video signal carrying thus-corrected image data. Each function block, including the position error correcting unit 10, shown in FIG. 43 is controlled by the control unit 5 so that operation timings are controlled and operation conditions are set, appropriately. Thereby, those function blocks operate with an appropriate mutual operation relationship. Also in this thirteenth embodiment, it is also possible that the system configuration shown in FIG. 3A, which is the variant embodiment of the first embodiment and was described above, is used instead of the system configuration shown in FIG. 43. In this case, the general-purpose computer 4A (such as the personal computer shown in FIG. 3B) is specifically configured by software (stored in an any information storage medium such as a floppy disk shown in FIG. 3B) executed thereby to carry out not only the above-mentioned reading pixel position error measurement and the oblique line determination operation but also the reading pixel position error correction operation performed by the position error correcting unit 10 when using the system configuration shown in FIG. 43, which operation will be described later.

13.3 Measurement Principle

The measurement principle of the thirteenth embodiment is substantially identical to the measurement principle of the above-described twelfth embodiment described above. Therefore, duplicated descriptions will be omitted.

13.4 Oblique Line Determining Operation

The oblique line determining operation of the thirteenth embodiment is substantially identical to that of the twelfth embodiment described above in the item 12.3. Therefore, duplicated descriptions will be omitted.

13.5 Position Error Measuring Process 13.5.1 Summary of the Measuring Process

The summary of the reading pixel position error measuring process in the thirteen embodiment is substantially identical to that of the twelfth embodiment described above in the item 12.4.1. Therefore, duplicated descriptions will be omitted.

13.5.2. Center of Gravity Measuring Operation

Figure 44:
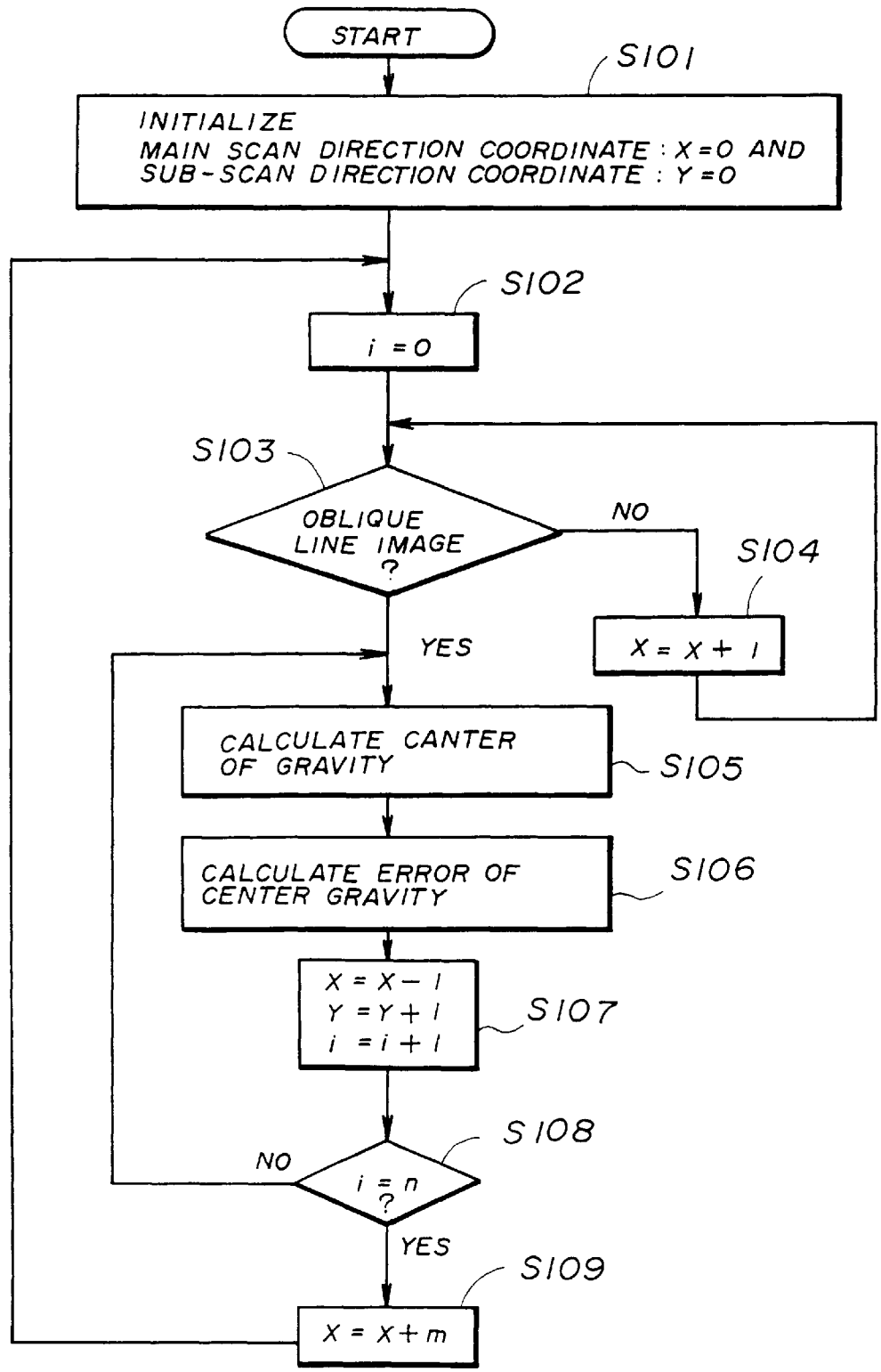
FIG. 44 shows an operation flowchart of a center of gravity calculation operation of the image reading apparatus in the thirteenth embodiment.

A center of gravity measuring (calculation) operation performed in the reading pixel position error measurement in the thirteenth embodiment will now be described with reference to FIGS. 38 and 44.

This operation starts at the same time when scanning of an original image object including the measuring pattern is started. Each of X and Y coordinate values is initialized so that X=0 and Y=0, in S101. The X, Y coordinate values represent a pixel position, which pixel is included in the above-mentioned determining window which is thus set in a bit-map formation of obtained image data. For example, the X, Y coordinate values represent a position of the center pixel of the determining window. Then, a variant 'i' which indicates a number of measuring operations which have been performed on one oblique line of the measuring pattern is initialized at '0', in S102.

Then, in S103, the oblique line determining unit 24 shown in FIG. 43 determines (in the method described above in the item of 12.3 with reference to FIGS. 33–37) whether or not the set determining window (of a size of 3 pixels by 3 pixels) includes pixels of an oblique line image of the measuring pattern. If it is determined that the determining window does not include pixels of an oblique line, the X coordinate value is incremented and, thereby, the determining window is shifted by one pixel in the main scan direction in the bit-map formation of the image data, in S104. This amount of shifting of the determining window does not need to be limited to one pixel. The amount of shifting of the determining window may be determined depending on a size of the determining window and a thickness of each oblique line image of the measuring pattern. It is possible that the amount of shifting of the determining window may correspond to a plurality of pixels instead of one pixel. If it is determined in S103 that the determining window includes pixels of an oblique line image, the measuring window W1 shown in FIG. 38 is set in the bit-map formation of the image data, and the center of gravity of the image data of pixels defined by the measuring window W1 is calculated (in the method described above in the item 12.4.3 with reference to FIG. 41), in S105. A setting position of the measuring window W1 is determined so as to have a predetermined spatial relationship with the position of the determining window. For example, the spatial relationship between the measuring window W1 and determining window WD is such as that shown in FIG. 38 as described above. That spatial relationship is fixed during the reading pixel position error measurement process. When the center of gravity is calculated, the position of the measuring window W1 may be shifted in the main scan direction or the opposite direction by an integer number of pixels so that a portion the oblique line image within the measuring window W1 may be positioned at the center of the measuring window W1 as in the operation in S7, S8, S9, S10 shown in FIG. 39 described above.

After the center of gravity is calculated in S105, an error of the center of gravity is calculated in comparison to the case where the oblique line image of the measuring pattern is read by the image reading apparatus without any reading error, in S106. For example, the error is calculated in S106 in the same way as in the operation in S11 shown in FIG. 39 described above. Then, the X coordinate value is decremented by one pixel (−1), the Y coordinate value is incremented by one pixel (+1) and the variant 'i' which indicates a number of measuring operations which have been performed on that oblique line is incremented by 1, in S107. Thereby, the position of the measuring window is shifted into the position W2 shown in FIG. 38 as a result of shifting in the sub-scan direction by one pixel and shifting in the direction opposite to the main scan direction by one pixel. The shifting amount does not need to be limited to one pixel in the sub-scan direction and the direction opposite to the main scan direction. In the above-described examples, the measuring window is moved one pixel by one pixel. However, in a case where a frequency band of causes of reading pixel position errors such as apparatus vibration is low, for example, it is possible that the measuring window is moved two (or more) pixels by two (or more) pixels in each of the main scan direction and sub-scan direction simultaneously. Thereby, it is possible to shorten a time required for the reading pixel position error measurement.

Then, before the above-mentioned variant 'i' reaches a predetermined number 'n', the operation returns to S105 from S108. After the variant 'i' reaches a predetermined number 'n', that is, after the measuring window is positioned at the position Wn shown in FIG. 38, the operation goes from S108 to S109, and thus the measuring window is shifted into the position Wn+1 for the subsequent oblique line K3, in S109. For this purpose, the coordinates of the measuring window is shifted in the main scan direction by an integer number 'm' of pixels, corresponding to a distance between the adjacent oblique line images. Then, the above-mentioned variant 'i' is initialized at '0', in S102. Then, the operation again starts from the oblique line determining operation in S103 for the oblique line image K3. Thus, the measuring window is shifted into positions Wn+1, Wn+2, Wn+3, . . . , and the reading pixel position error measurement (that is, the center of gravity error measurement) is performed for each measuring window position.

By using a plurality of parallel oblique line images such as those shown in FIG. 38 in the reading pixel position error measurement according to the present invention, it is possible to perform the measurement throughout an original image reading area of the image reading apparatus even if the original image reading area is long in the sub-scan direction and short in the main scan direction. Further, by using the plurality of parallel oblique line images in the measurement, it is possible to use in the measurement the measuring chart or pattern to be long in the sub-scan direction and short in the main scan direction. By positioning such a long and narrow measuring chart along the sub-scan direction at various different positions in the main scan direction, it is possible to perform the reading pixel position error measurement for various positions separately.

In the above-described measuring method, it is not necessary to make those oblique line images of the measuring chart be finer in order to improve the resolution of the reading pixel position error measurement. Thus, it is possible to use those oblique line images, each of which is wide, such that those line images may not be adversely affected by the MTF of the apparatus. By thus using the wide line pattern, the measuring window should be enlarged. Thereby, it is possible to improve accuracy of the E reading pixel position error measurement. In a case where the measurement is performed in a real-time manner, the width of each line of the oblique line pattern of the measuring chart may be determined in consideration of balance between the data processing rate, the data storage size of buffers, and the circuit scale of the measurement system.

In the above-described examples, the center of an oblique line image is obtained by calculating the center of gravity of the pixels in the measuring window. However, it is also possible to use a wider line image and the position of an edge of the line image is obtained in some well-known manner. Also in such a method, the reading pixel position error measurement can be performed similarly.

Further, in the above-described methods using one or a plurality of parallel oblique line images, the state of the portion of the oblique line image defined by the measuring window is always approximately fixed as shown in FIG. 38. Thereby, the above-mentioned 'moire' problem, which cannot be avoided in the method using the test chart of the even-pitch lines arranged in the sub-scan direction in the related art described above, can be avoided in the present invention. Thus, it is possible to perform a high-accuracy reading pixel position error measurement.

13.6 Position Error Correcting Operation

A reading pixel position error correcting operation, in the thirteenth embodiment, performed by the position error correcting unit 10 shown in FIG. 43 will now be described with reference to FIGS. 45, 46, 47A and 47B.

Figure 45:
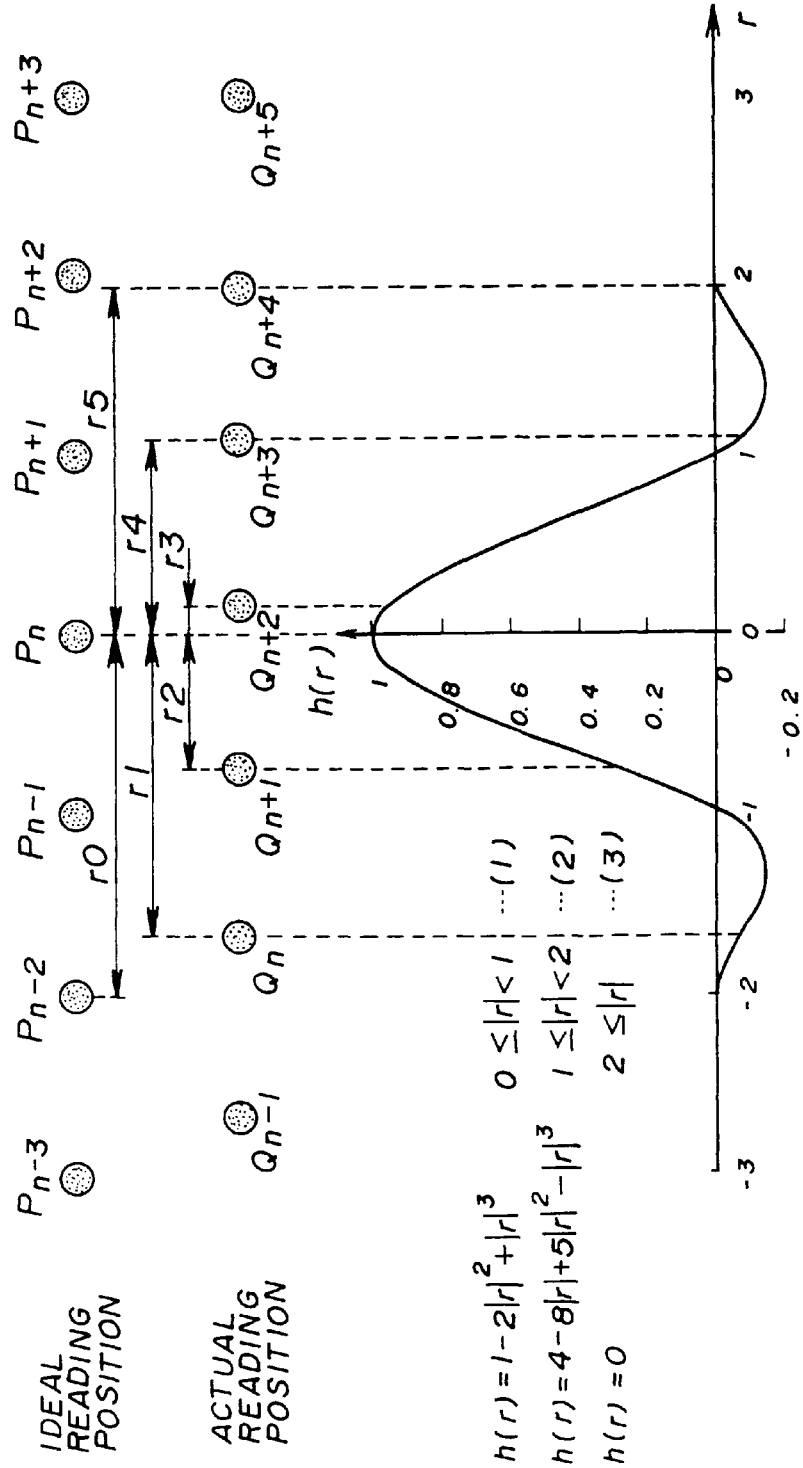
FIG. 45 illustrates a cubic function convolution method in a reading pixel position error correction in the image reading apparatus in the thirteenth embodiment.
Figure 46:
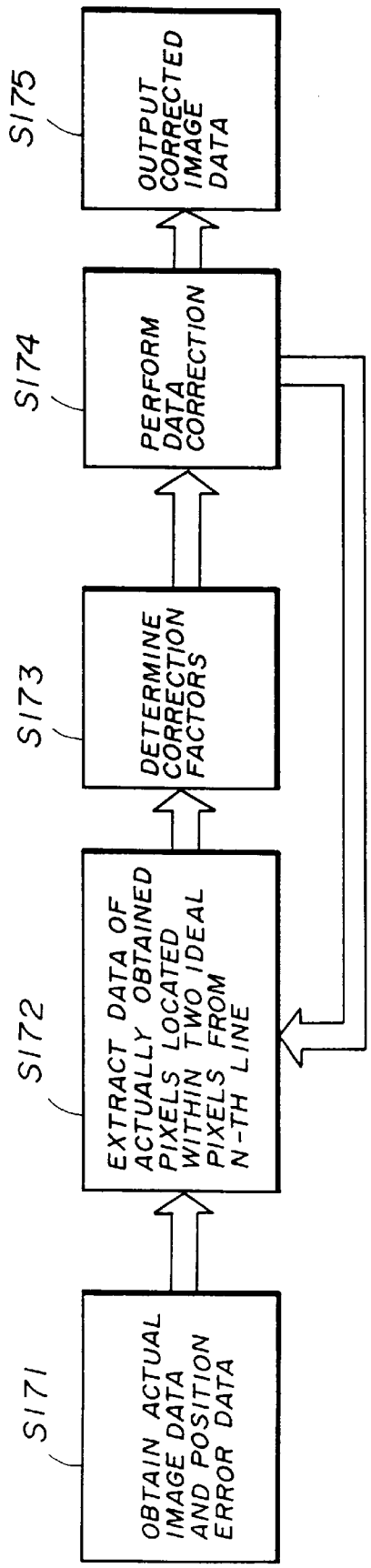
FIG. 46 illustrates an operation flowchart of the cubic function convolution method shown in FIG. 45.

The above-mentioned 'cubic function convolution method', which uses a weighting function, is also applied for the reading pixel position error correcting operation in the thirteenth embodiment. FIG. 45 illustrates that correction operation using the cubic function convolution method, and FIG. 46 shows an operation flow of the correction. Positions $P_{n-3}$, $P_{n-2}$, $P_{n-1}$, $P_n$, $P_{n+1}$, $P_{n+2}$ and $P_{n+3}$ represent ideal reading pixel positions when reading an original image object through the image reading apparatus in an ideal condition. This ideal condition is such that no scanning speed variation occurs in the reading operation performed by the light-to-electricity converting unit 1. Specifically, the reading carriage (such as the above-mentioned first carriage) of the light-to-electricity converting unit 1 for scanning the original image object so as to read it moves in a precisely fixed speed. In the ideal condition, as shown in FIG. 45, those pixel positions are arranged in an even-pitch manner or with equal adjacent distances. Positions $Q_{n-1}$, $Q_n$, $Q_{n+1}$, $Q_{n+2}$, $Q_{n+3}$, $Q_{n+4}$ and $Q_{n+5}$ represent actual reading pixel positions when reading the original image object through the image reading apparatus in an actual condition. This actual condition is such that some scanning speed variation occurs in the reading operation performed by the light-to-electricity converting unit 1. Specifically, the reading carriage of the light-to-electricity converting unit 1 moves in a varying speed. In the actual condition, as shown in FIG. 45, those pixel positions are arranged in an uneven-pitch manner or with unequal adjacent distances. Further, those pixel positions in the actual condition are deviated from the pixel positions in the ideal condition, respectively. For example, the actual reading pixel position $Q_n$ should be located at the ideal reading pixel position $P_n$.

In such a case, those position deviations in the sub-scan direction can be measured by the position error measurement unit 4. As described above with reference to FIGS. 1 and 31, from an error of the center of gravity in the main scan direction measured in the reading pixel position error measurement, such a reading pixel position error (deviation) can be obtained. In fact, when the scanning speed varies, the oblique line image in the bit-map formation of the obtained image data is deviated from the oblique line image 'a' to the oblique line image 'b' shown in FIG. 31, for example. Such a deviation is measured by obtaining an error of the center of gravity in the main scan direction of the image data of pixels defined by the measuring windows Wn, Wn+1, Wn+2.

Using the thus-obtained reading pixel position errors in the sub-scan direction, for example, correct image data (tone data) of the pixel $P_n$ which is present on a n-th main scan line is estimated from the actually obtained image data of some of the pixel positions $Q_{n-1}$, $Q_n$, $Q_{n+1}$, $Q_{n+2}$, $Q_{n+3}$, $Q_{n+4}$ and $Q_{n+5}$ according to the cubic function convolution method.

In this method, in S171, image data of actually obtained pixels and reading pixel position error data is obtained in the units 1, 2, 3, 24 and 4 of the image reading apparatus shown in FIG. 43. Then, in S172, therefrom, image data of actually obtained pixels which are located within distances of two ideal pixels (r0 and r5 shown in FIG. 45) from the position ($P_n$) of the n-th main scan line, and reading pixel position error data therefor is extracted. In the case of FIG. 45, image data and error data of the actually obtained pixels $Q_n$, $Q_{n+1}$, $Q_{n+2}$, $Q_{n+3}$ and $Q_{n+4}$ are extracted in S172. A predetermined interpolation function h(r) is used, and, a distance r from the reference (ideal) pixel position $P_n$ and an actually obtained pixel position Q is applied to the interpolation function, and thus a value h(r) is obtained, in S173. The thus-obtained value h(r) is used as a correction factor. The interpolation function h(r) is, according to divisional cubic polynomial approximation of sin x/x, as follows:

$$h(r)=1-2|r|^2+|r|^3 \qquad (8),$$

where $0 \leq |r| < 1$;

$$h(r)=4-8|r|+5|r|^2-|r|^3 \qquad (9),$$

where $1 \leq |r| < 2$; and $$h(r)=0 \qquad (10),$$

where $2 \leq |r|$.

Then, such a correction factor is obtained for the image data for each pixel of the pixels $Q_n$, $Q_{n+1}$, $Q_{n+2}$, $Q_{n+3}$ and $Q_{n+4}$ extracted in S172, by applying respective distances r (r1, r2, r3, r4 and r5) from the ideal pixel position $P_n$. Thus, the correction factors h(r1), h(r2), h(r3), h(r4) and h(r5) are obtained for the pixels $Q_n$, $Q_{n+1}$, $Q_{n+2}$, $Q_{n+3}$ and $Q_{n+4}$, in S173. Those correction factors are used as weights for the actually obtained image data of the pixels $Q_n$, $Q_{n+1}$, $Q_{n+2}$, $Q_{n+3}$ and $Q_{n+4}$. Thus, the correct image data of the pixel $P_n$ is estimated by the following equation (11):

$$P_n=\{Q_n \cdot h(r1)+Q_{n+1} \cdot h(r2)+Q_{n+2} \cdot h(r3)+Q_{n+3} \cdot h(r4)+Q_{n+4} \cdot h(r5)\}/\{h(r1)+h(r2)-h(r3)+h(r4)+h(r5)\} \qquad (11),$$

where the image data of the pixels $P_n$, $Q_{n+1}$, $Q_{n+2}$, $Q_{n+3}$ and $Q_{n+4}$ are represented by $P_n$, $Q_{n+1}$, $Q_{n+2}$, $Q_{n+3}$ and $Q_{n+4}$, respectively.

Thus, the correct image data of the pixel $P_n$ is calculated. A similar operation is performed for each pixel $P_n$ on the n-th main scan line. Then, the main scan line to be processed is shifted into the (n+1)th main scan line. Then, for the (n+1)th main scan line, a similar operation is performed. Thus, using the reading pixel position errors, which are measured by the position error measurement unit 4 as described above, the correct image data, which should be obtained when the original image object reading is performed with correct reading pixel positions without reading carriage speed variation, is estimated. Thus, the image data error due to reading pixel position error is corrected, and, thus, the reading pixel position error correction operation is performed on all the main scan lines, in S174. The thus-obtained image data is output in S175. In the above-described operation, the calculation of the correction factors h(r) and the calculations of the reciprocal of the total of the correction factors in the equation (11) need to be performed once when performing the reading pixel position error correction operation for each main scan line.

Figure 47A:
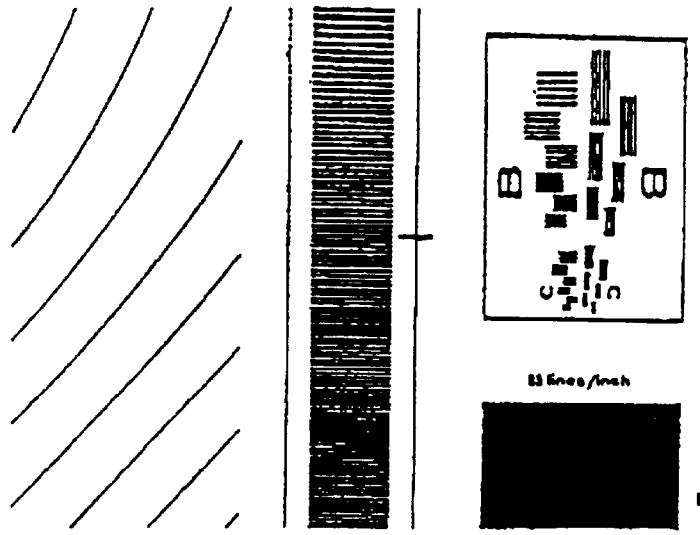
FIGS. 47A and 47B illustrate, for example, images in a bit-map formation of obtained image data, obtained before and after the reading pixel position error correction illustrated in FIGS. 45 and 46 is performed on the image data.
Figure 47B:
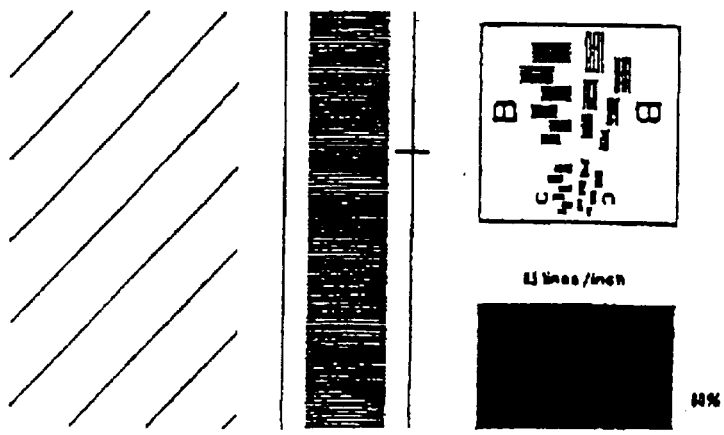

FIGS. 47A and 47B show states, as an example, of a bit-map formation of obtained image data, before and after performing such a reading pixel position error correction. Ordinarily, actual original image object reading of the image reading apparatus is performed after it is determined that the reading carriage scanning speed reaches a fixed speed. However, in this example, in order to show reading pixel position errors remarkably, the original image object reading operation starts immediately after the reading carriage starts to move. In this case, 45° oblique line images are read together with other images. In each of FIGS. 47A and 47B, a left-hand portion indicates the obtained oblique line images. Using the oblique line images, the reading pixel position errors are measured as described above, the thus-obtained error data is used and, thus, the reading pixel position error correction described above is performed. As a result, the images shown in FIG. 47B are obtained. Those images shown in FIG. 47B are, with a high accuracy, similar to those of the original images which are those of the original image object and read by the image reading apparatus first as mentioned above. In contrast thereto, in FIG. 47A, in a top area, because the reading carriage speed has not reached the fixed speed, the images are elongated vertically, and also the oblique line images are oblique more steeply. Thus, an amount of reading pixel position error is large there. Thus, even if an original image object reading is performed with a large amount of reading pixel position error, images which are, with a high accuracy, similar to the original images can be obtained as a result of performing the reading pixel position error correction according to the present invention.

Possible embodiments of the present invention are not limited to those embodiments described above. It is possible that units/functions of the above-described embodiments are appropriately combined so that the advantages thereof may be effectively, cooperatively provided. For example, it is possible to apply the noise reduction processing unit 14 shown in FIG. 23 to the image reading apparatus shown in FIG. 43. Thereby, image data undergoes the noise reduction processing, reading pixel position error measurement processing and reading pixel position error correction processing. As a result, the image data, which can reproduce, in high accuracy, images of an original image object read by the image reading apparatus, can be obtained.

Further, the present invention is not limited to the above-described embodiments, and variations and modifications may be made without departing from the scope of the present invention.

What is claimed is:

1. An image reading apparatus, comprising:

image reading means for reading an original image, one main scan line by one main scan line, in a sub-scan direction;

position error measuring means for processing image data read through said image reading means, said image data being obtained as a result of a measuring pattern being read by said image reading means, said measuring pattern comprising a white background and a plurality of even-pitch oblique lines arranged in said white background, each line being oblique from a main scan direction and also from said sub-scan direction;

shading correcting means for performing a predetermined shading correcting operation on image data obtained through said image reading means;

a measuring chart having said measuring pattern provided thereon; and a reference tone plate for said shading correcting means to perform said predetermined shading correcting operation on image data obtained as a result of a tone of said reference tone plate being read through said image reading means, wherein said reference tone plate is provided on said image reading apparatus at a position, relative to a provided position of said measuring chart, such that said predetermined shading correction operation can be performed on image data which is obtained as a result of said measuring pattern being read through said image reading means.

2. A computer-implemented image processing method, comprising steps of:

a) processing image data read through image reading means, said image reading means reading an original image, one main scan line by one main scan line, in a sub-scan direction, said image data being obtained as a result of a measuring pattern being read by said image reading means, said measuring pattern comprising a white background and a plurality of even-pitch oblique lines arranged in said white background, each line being oblique from a main scan direction and also from said sub-scan direction;

b) performing a predetermined shading correcting operation on image data obtained through said image reading means;

c) using a measuring chart having said measuring pattern provided thereon; and d) using a reference tone plate for said step b) to perform said predetermined shading correcting operation on image data obtained as a result of a tone of said reference tone plate being read through said image reading means, wherein said reference tone plate is provided on said image reading apparatus at a position, relative to a provided position of said measuring chart, such that said predetermined shading correction operation can be performed on image data which is obtained as a result of said measuring pattern being read through said image reading means.

3. A computer program product, comprising:

a computer usable medium having computer readable program code means embodied in said medium, said computer readable program code means comprising:

first program code means for processing image data read through image reading means, said image reading means reading an original image, one main scan line by one main scan line, in a sub-scan direction, said image data being obtained as a result of a measuring pattern being read by said image reading means, said measuring pattern comprising a white background and a plurality of even-pitch oblique lines arranged in said white background, each line being oblique from a main scan direction and also from said sub-scan direction;

second program code means for performing a predetermined shading correcting operation on image data obtained through said image reading means;

third program code means for using a measuring chart having said measuring pattern provided thereon; and fourth program code means for using a reference tone plate for said second program code means to perform said predetermined shading correcting operation on image data obtained as a result of a tone of said reference tone plate being read through said image reading means, wherein said reference tone plate is provided on said image reading apparatus at a position, relative to a provided position of said measuring chart, such that said predetermined shading correction operation can be performed on image data which is obtained as a result of said measuring pattern being read through said image reading means.

* * * * *